(12) United States Patent
Nakagawa et al.

(10) Patent No.: US 7,869,136 B2
(45) Date of Patent: Jan. 11, 2011

(54) IMAGE FORMING OPTICAL SYSTEM AND ELECTRONIC IMAGE PICKUP APPARATUS USING THE SAME

(75) Inventors: Akitaka Nakagawa, Kokubunji (JP); Hisashi Goto, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/660,125

(22) Filed: Feb. 19, 2010

(65) Prior Publication Data

US 2010/0238561 A1 Sep. 23, 2010

(30) Foreign Application Priority Data

Feb. 23, 2009 (JP) .............................. 2009-039521

(51) Int. Cl.
*G02B 15/14* (2006.01)

(52) U.S. Cl. ...................... 359/686; 359/687; 359/689; 359/690; 359/713; 359/714; 359/715; 359/716; 359/740; 359/785

(58) Field of Classification Search ................. 359/676, 359/686, 687, 689, 690, 713–716, 740, 785
See application file for complete search history.

(56) References Cited

U.S. PATENT DOCUMENTS 7,505,214 B2 * 3/2009 Hamano et al. ............. 359/676
7,643,228 B2 * 1/2010 Ishibashi .................... 359/687

FOREIGN PATENT DOCUMENTS

| JP | 2006-349947 | 12/2006 |
| JP | 2007-163964 | 6/2007 |
| JP | 2007-298555 | 11/2007 |

* cited by examiner

*Primary Examiner*—Evelyn A. Lester
(74) *Attorney, Agent, or Firm*—Kenyon & Kenyon LLP

(57) ABSTRACT

In a zoom lens, in which the distance between the first lens group and the second lens group changes during zooming, wherein a refractive optical element A that has a positive refracting power if its object side surface and its image side surface are interfaces with air is provided between an object side base optical element B and an image side base optical element C to constitute therewith a three-piece cemented optical element D in the first lens group, there is at least one optical element having a positive refracting power disposed closer to the object side than the three-piece cemented optical element D, and the zoom lens satisfies a certain condition.

22 Claims, 31 Drawing Sheets

IMAGE FORMING OPTICAL SYSTEM AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2009-39521 filed on Feb. 23, 2009; the entire contents of which are incorporated herein by reference.

BACKGROUND OF THE INVENTION

1. Field of the Invention

The present invention relates to an image forming optical system and an electronic image pickup apparatus equipped with the same.

2. Description of the Related Art

In recent years, image pickup apparatuses such as digital cameras have been replacing silver salt films and becoming widely used. Digital cameras are adapted to pickup an image of an object using a solid state image pickup element such as a CCD or CMOS. Taking lenses used in such image pickup apparatuses are desired to be zoom lenses (image forming lenses) having high zoom ratios.

It is desired that such image pickup lenses be satisfactorily corrected in terms of aberrations relevant to the monochromatic imaging performance (such as spherical aberration and coma). In addition, it is desired that correction of chromatic aberrations that are relevant to the resolution of images and color blur be achieved adequately.

On the other hand, the entire length of the lens (i.e. the entire optical length) is desired to be made shorter. However, the shorter the entire lens length is made in order to reduce the size of the entire optical system, the more aberrations, in particular chromatic aberrations, tend to be generated, and the lower the imaging performance tends to become. In particular, in the case of zoom lenses having a high zoom ratio and a long focal length at the telephoto end, a reduction of secondary spectrum is required in addition to first-order achromatization when correcting chromatic aberrations.

As a method of reducing such chromatic aberrations, use of optical materials having extraordinary partial dispersion have been kNextn (Japanese Patent Application Laid-Open No. 2007-163964, Japanese Patent Application Laid-Open No. 2006-349947, and Japanese Patent Application Laid-Open No. 2007-298555).

Furthermore, zoom lenses used in image pickup apparatuses are desired to have a certain zoom ratio, a wide angle of view at the wide angle end, high speed, and high performance. To improve the performance of a zoom lens, it is necessary to correct chromatic aberrations satisfactorily throughout the entire zoom range.

SUMMARY OF THE INVENTION

An image forming optical system according to a first aspect of the present invention comprises, in order from the object side to the image side, a first lens group having a positive refracting power, a second lens group having a negative refracting power, and an image side lens group having a positive refracting power, wherein the distance between the first lens group and the second lens group changes during zooming, characterized in that:

a cemented optical element D is provided in the first lens group, the cemented optical element D is made up of an optical element B disposed on the object side, an optical element C disposed on the image side, and a refractive optical element A having a positive refracting power disposed between the optical element B and the optical element C, there is at least one optical element having a positive refracting power located closer to the object side than the cemented optical element D, and the image forming optical system satisfies the following conditional expressions (4-1), (4-2), and (4-3):

$$\nu d_A < 30 \quad (4\text{-}1)$$

$$0.54 < \theta gF_A < 0.9 \quad (4\text{-}2)$$

$$0.4 < \theta gFn < 0.9 \quad (4\text{-}3)$$

where $nd_A$, $nC_A$, $nF_A$, and $ng_A$ are the refractive indices of the refractive optical element A for the d-line, the C-line, the F-line, and the g-line respectively, $nd_B$, $nC_B$, $nF_B$, and $ng_B$ are the refractive indices of the optical element B for the d-line, the C-line, the F-line, and the g-line respectively, $nd_C$, $nC_C$, $nF_C$, and $ng_C$ are the refractive indices of the optical element C for the d-line, the C-line, the F-line, and the g-line respectively, $\nu d_A$ is the Abbe number $(nd_A-1)/(nF_A-nC_A)$ of the refractive optical element A, $\nu d_B$ is the Abbe number $(nd_B-1)/(nF_B-nC_B)$ of the optical element B, $\nu d_C$ is the Abbe number $(nd_C-1)/(nF_C-nC_C)$ of the optical element C, $\nu d_{BA}$ is the Abbe number of the refractive optical element A and the optical element B regarded as a single optical element, $\theta gF_A$ is the relative partial dispersion $(ng_A-nF_A)/(nF_A-nC_A)$ of the refractive optical element A, $\theta gF_B$ is the relative partial dispersion $(ng_B-nF_B)/(nF_B-C_B)$ of the refractive optical element B, $\theta gF_C$ is the relative partial dispersion $(ng_C-nF_C)/(nF_C-nC_C)$ of the refractive optical element C, $\theta gF_{BA}$ is the effective relative partial dispersion of the refractive optical element A and the optical element B regarded as a single optical element, $f_A$ is the focal length of the refractive optical element A, $f_B$ is the focal length of the optical element B, $f_C$ is the focal length of the optical element C, $f_{BA}$ is the composite focal length of the optical element B and the refractive optical element A, $f_t$ is the composite focal length of the refractive optical element A, the optical element B, and the optical element C, and $\theta gFn$ is the effective relative partial dispersion $f_t \times \nu efn \times (\theta gF_{BA} \times \phi_{BA}/\nu_{BA} + \theta gF_C \times \phi_C/\nu_c)$ of the cemented optical element D, wherein $$\nu efn = 1/(f_t \times (\phi_{BA}/\nu_{BA} + \phi_C/\nu_c))$$

$$\theta gF_{BA} = f_{BA} \times \nu_{BA} \times (\theta gF_A \times \phi_A/\nu d_A + \theta gF_B \times \phi_B/\nu_B),$$

$$\nu_{BA} = 1/(f_{BA} \times (\phi_A/\nu d_A \phi_B/\nu_B),$$

$$1/f_{BA} = 1/f_A + 1/f_B,$$

$$\phi_A = 1/f_A,$$

$$\phi_B = 1/f_B,$$

$$\phi_C = 1/f_C, \text{ and}$$

$$\phi_{BA} = 1/f_{BA}.$$

An image forming optical system according to a second aspect of the present invention comprises, in order from the object side to the image side, a first lens group having a positive refracting power, a second lens group having a negative refracting power, and an image side lens group having a positive refracting power, wherein the distance between the first lens group and the second lens group changes during zooming, characterized in that:

a refractive optical element A having a positive refracting power is provided in the first lens group, and the image forming optical system satisfies the following conditional expressions (4-1), (4-2), and (2):

$$vd_A < 30 \tag{4-1}$$

$$0.54 < \theta gF_A < 0.9 \tag{4-2}$$

$$|G1/G2| > 6.4 \tag{2}$$

where $nd_A$, $nC_A$, $nF_A$, and $ng_A$ are the refractive indices of the refractive optical element A for the d-line, the C-line, the F-line, and the g-line respectively, $vd_A$ is the Abbe number $(nd_A-1)/(nF_A-nC_A)$ of the refractive optical element A, $\theta gF_A$ is the relative partial dispersion $(ng_A-nF_A)/(nF_A-nC_A)$ of the refractive optical element A, G1 is the focal length of the first lens group, and G2 is the focal length of the second lens group.

An image pickup apparatus according to another aspect of the present invention comprises an image forming optical system and an image pickup element, characterized in that the image forming optical system comprises, in order from the object side to the image side, a first lens group having a positive refracting power, a second lens group having a negative refracting power, and an image side lens group having a positive refracting power, the distance between the first lens group and the second lens group changes during zooming, a refractive optical element A having a positive refracting power is provided in the first lens group, and the refractive optical element A satisfies the following conditional expression (3-2):

$$0 < (Zb(3.3a) - Za(3.3a))/(Zb(2.5a) - Za(2.5a)) < 0.895 \tag{3-2},$$

where fw is the focal length of the image forming optical system at the wide angle end, ft is the focal length of the image forming optical system at the telephoto end, IH is the maximum image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = (IH^2 \times \log_{10}(ft/fw))/fw \tag{3-1}.$$

An image pickup apparatus according to still another aspect of the present invention comprises an image forming optical system and an image pickup element, characterized in that the image forming optical system is one of the above-described image forming optical system, and the apparatus satisfies the following conditional expression (3-2):

$$0 < (Zb(3.3a) - Za(3.3a))/(Zb(2.5a) - Za(2.5a)) < 0.895 \tag{3-2},$$

where fw is the focal length of the image forming optical system at the wide angle end, ft is the focal length of the image forming optical system at the telephoto end, IH is the maximum image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = (IH^2 \times \log_{10}(ft/fw))/fw \tag{3-1}.$$

DETAILED DESCRIPTION OF THE INVENTION

Figure 1A:
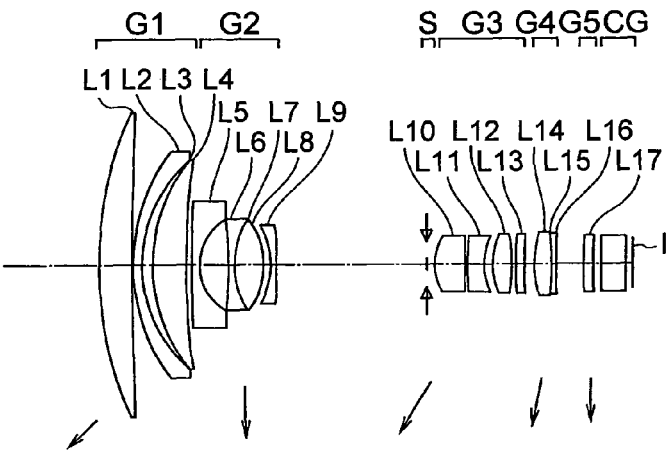
FIG. 1A is a cross sectional view along the optical axis, showing the optical configuration of a zoom lens according to embodiment 1 in the state in which the zoom lens is focused on an object point at infinity at the wide angle end.

Prior to the description of embodiments, the operation and effect of the image forming optical system according to this mode will be described.

<Explanation of Effective Relative Partial Dispersion>

First, the Abbe number and the relative partial dispersion of an optical element are defined as follows:

$$\theta d = (nd-1)/(nF-nC),$$

$$\theta gF = (ng-nF)/(nF-nC)$$

$$\theta hg = (nh-ng)/(nF-nC)$$

where, nd, nC, nF, ng, and nh are the refractive indices of each optical element for a wavelength of 587.6 nm (d-line), for a wavelength of 656.3 nm (C-line), for a wavelength of 486.1 nm (F-line), for a wavelength of 435.8 (g-line), and for a wavelength of 404.7 nm (h-line), vd is the Abbe number of the optical element, $\theta gF$ is the relative partial dispersion of the optical element for the g-line and the F-line, and $\theta hg$ is the relative partial dispersion of the optical element for the h-line and the g-line.

Secondly, a description will be made of a cemented optical element in which two optical elements are cemented together. When the cemented optical element (in which two optical elements are cemented) is regarded as a single optical element, its effective relative partial dispersion $\theta g_{21}$ can be obtained by the following equation:

$$\theta gF_{21} = f_{21} \times v_{21} \times (\theta gF_1 \times \phi_1 / v d_1 + \theta gF_2 \times \phi_2 / v_2) \qquad (A),$$

where $f_{21}$ is the composite focal length of the two optical elements, $v_{21}$ is the Abbe number of the two optical elements regarded as a single optical element, $\theta gF_1$ is the relative partial dispersion of one optical element, $\phi_1$ is the refracting power of the one optical element, $vd_1$ is the Abbe number of the one optical element, $\theta gF_2$ is the relative partial dispersion of the other optical element, $\phi_2$ is the refracting power of the other optical element, and $v_2$ is the Abbe number of the other optical element. In addition, $f_{21}$, $v_{21}$, $\phi_1$, and $\phi_2$ are represented by the following equations respectively:

$$1/f_{21} = 1/f_1 + 1/f_2$$

$$v_{21} = 1/(f_{21} \times (\phi_1 / v d_1 + \phi_2 / v_2))$$

$$\phi_1 = 1/f_1$$

$$\phi_2 = 1/f_2$$

where $f_1$ is the focal length of the one optical element, and $f_2$ is the focal length of the other optical element.

In the case of a cemented optical element in which three optical elements are cemented together, one optical element may be regarded as an optical element in which two optical elements are cemented together, and the other optical element may be regarded as the remaining one optical element. In this case, the effective relative partial dispersion $\theta g_{321}$ of the cemented optical element (in which three elements are cemented together) regarded as a single optical element is as follows:

$$\theta gF_{321} = f_{321} \times v_{321} \times (\theta gF_{21} \times \phi_{21} / v d_{21} + \theta gF_3 \times \phi_3 / v_3) \qquad (B),$$

where $f_{321}$ is the composite focal length of the three optical elements, $v_{321}$ is the Abbe number of the three optical elements regarded as a single optical element, $\theta gF_{21}$ is the relative partial dispersion of one optical element (i.e. the cemented optical element made up of two elements), $\phi_{21}$ is the refracting power of the one optical element (i.e. the cemented optical element made up of two elements), $vd_{21}$ is the Abbe number of the one optical element (i.e. the cemented optical element made up of two elements), $\theta gF_3$ is the relative partial dispersion of the other optical element, $\phi_3$ is the refracting power of the other optical element, and $v_3$ is the Abbe number of the other optical element.

In the following description, the relative partial dispersion will refer to the relative partial dispersion for the g-line and the F-line, unless otherwise specified.

An image forming optical system according to a first mode comprises, in order from the object side to the image side, a first lens group having a positive refracting power, a second lens group having a negative refracting power, and an image side lens group having a positive refracting power, wherein the distance between the first lens group and the second lens group changes during zooming, a cemented optical element D is provided in the first lens group, the cemented optical element being made up of an optical element B disposed on the object side, an optical element C disposed on the image side, and a refractive optical element A having a positive refracting power disposed between the optical element B and the optical element C, and there is at least one optical element having a positive refracting power located closer to the object side than the cemented optical element D, the optical system satisfying the following conditional expressions (4-1), (4-2), and (4-3):

$$vd_A < 30 \qquad (4-1)$$

$$0.54 < \theta gF_A < 0.9 \qquad (4-2)$$

$$0.4 < \theta gFn < 0.9 \qquad (4-3)$$

where $nd_A$, $nC_A$, $nF_A$, and $ng_A$ are the refractive indices of the refractive optical element A for the d-line, the C-line, the F-line, and the g-line respectively, $nd_B$, $nC_B$, $nF_B$, and $ng_B$ are the refractive indices of the optical element B for the d-line, the C-line, the F-line, and the g-line respectively, $nd_C$, $nC_C$, $nF_C$, and $ng_C$ are the refractive indices of the optical element C for the d-line, the C-line, the F-line, and the g-line respectively, $vd_A$ is the Abbe number $(nd_A-1)/(nF_A-nC_A)$ of the refractive optical element A, $vd_B$ is the Abbe number $(nd_B-1)/(nF_B-nC_B)$ of the optical element B, $vd_C$ is the Abbe number $(nd_C-1)/(nF_C-nC_C)$ of the optical element C, $vd_{BA}$ is the Abbe number of the refractive optical element A and the optical element B regarded as a single optical element, $\theta gF_A$ is the relative partial dispersion $(ng_A-nF_A)/(nF_A-nC_A)$ of the refractive optical element A, $\theta gF_B$ is the relative partial dispersion $(ng_B-nF_B)/(nF_B-nC_B)$ of the refractive optical element B, $\theta gF_C$ is the relative partial dispersion $(ng_C-nF_C)/(nF_C-nC_C)$ of the refractive optical element C, $\theta gF_{BA}$ is the effective relative partial dispersion of the refractive optical element A and the optical element B regarded as a single optical element, $f_A$ is the focal length of the refractive optical element A, $f_B$ is the focal length of the optical element B, $f_C$ is the focal length of the optical element C, $f_{BA}$ is the composite focal length of the optical element B and the refractive optical element A, $f_t$ is the composite focal length of the refractive optical element A, the optical element B, and the optical element C, and $\theta gFn$ is the effective relative partial dispersion $f_t \times vefn \times (\theta gF_{BA} \times \phi_{BA}/v_{BA} + \theta gF_C \times \phi_C/v_c)$ of the cemented optical element D, wherein $$vefn = 1/(f_t \times (\phi_{BA}/v_{BA} + \phi_C/v_c))$$

$$\theta gF_{BA} = f_{BA} \times v_{BA} \times (\theta gF_A \times \phi_A/vd_A \theta gF_B \times \phi_B/v_B),$$

$$v_{BA} = 1/(f_{BA} \times (\phi_A/vd_A \phi_B/v_B)),$$

$$1/f_{BA} = 1/f_A + 1/f_B,$$

$$\phi_A = 1/f_A,$$

$$\phi_B = 1/f_B,$$

$$\phi_C = 1/f_C, \text{ and}$$

$$\phi_{BA} = 1/f_{BA}.$$

In the image forming optical system in which the first lens group has a positive refracting power, aberrations generated in the first lens group is enlarged by the second and subsequent lens groups. This will deteriorate the optical performance of the entire optical system. In particular, chromatic aberrations will be deteriorated at the telephoto end. Therefore, in order to maintain high optical performance or to improve the optical performance, it is important that chromatic aberrations be corrected excellently in the first lens group. In view of this, in the image forming optical system according to this mode, the refractive optical element A having a positive refracting power is provided in the first lens group, and the image forming optical system is designed to satisfy conditional expressions (4-1) and (4-2), whereby chromatic aberrations generated in the first lens group, especially second order spectrum, are made small.

In addition, the refractive optical element A is located between the optical element B located on the object side and the optical element C located on the image side, and they are cemented together to constitute the cemented optical element D. Furthermore, the cemented optical element D is arranged to be located closer to the image side than at least one optical element having a positive refracting power. Still further, conditional expression (4-3) is satisfied. Thus, excellent correction of second order spectrum using the cemented optical element D is achieved. In consequence, chromatic aberrations are improved, and an enhancement of the optical performance is achieved accordingly. The cemented optical element D has a positive refracting power.

If the optical element A and the optical element B are cemented together, a cemented optical element made up of two elements (or two-piece cemented optical element) is formed. The two-piece cemented optical element can be regarded as a single optical element. In this case, the relative partial dispersion (or effective relative partial dispersion) of the two-piece cemented optical element, or the relative partial dispersion of the two-piece cemented optical element regarded as a single optical element is different from the relative partial dispersion of the refractive optical element A alone or the relative partial dispersion of the optical element B alone. In order for conditional expression (4-3) to be satisfied, it is necessary that the relative partial dispersion of the two-piece cemented optical element be made smaller than the relative partial dispersion of the optical element B alone.

If the upper limit of conditional expression (4-1) is exceeded, it will become difficult to achieve first-order achromatization in the first lens group. Consequently, the resolution at the wide angle end and the telephoto end will become lower, and the performance will be deteriorated. This is not desirable. If the upper limit of conditional expression (4-2) is exceeded, second order spectrum will be overcorrected in the first lens group, and consequently axial chromatic aberration and chromatic aberration of magnification at the telephoto end will become worse. This consequently leads to generation of color blur due to second order spectrum and deterioration of the performance, which is not desirable.

On the other hand, if the lower limit of conditional expression (4-1) or (4-2) is exceeded, the refracting power of the refractive optical element A will become strong. This will make spherical aberration at the telephoto end and the chromatic aberration of magnification at the wide angle end worse. Consequently, the resolution will become lower and color blur will occur to deteriorate the performance. This is not desirable.

If the upper limit of conditional expression (4-3) is exceeded, the positive refracting power of the refractive optical element A will become lower, or the refractive optical element A will have a negative refracting power. If the positive refracting power of the refractive optical element A becomes lower, the difference between the relative partial dispersion of the two-piece cemented optical element and the relative partial dispersion of the optical element B alone will become small. Then, the effect of the cemented optical element D in correcting second order spectrum will become small. This is not desirable.

If the refractive optical element A has a negative refracting power, the relative partial dispersion of the two-piece cemented optical element will be larger than the relative partial dispersion of the optical element B alone. Therefore, the cemented optical element D will not achieve the effect of correcting second order spectrum. This rather will lead to the generation of second order spectrum in the cemented optical element D. This consequently will cause an increase in color blur. This is not desirable.

If the lower limit of conditional expression (4-3) is exceeded, the positive refracting power of the refractive optical element A will become large. Consequently, the decrease in the relative partial dispersion of the two-piece cemented optical element relative to the relative partial dispersion of the optical element B alone will become large. In this case, the effect of the cemented optical element D in correcting second order spectrum will become excessively large. This rather will lead to the generation of second order spectrum in the cemented optical element D. This consequently will cause an increase in color blur. This is not desirable.

An image forming optical system according to a second mode comprises, in order from the object side to the image side, a first lens group having a positive refracting power, a second lens group having a negative refracting power, and an image side lens group having a positive refracting power, wherein the distance between the first lens group and the second lens group changes during zooming, a refractive optical element A having a positive refracting power is provided in the first lens group, and the optical system satisfies the following conditional expressions (4-1), (4-2), and (2):

$$vd<30 \quad (4\text{-}1)$$

$$0.54<\theta gF<0.9 \quad (4\text{-}2)$$

$$|G1/G2|>6.4 \quad (2),$$

where $nd_A$, $nC_A$, $nF_A$, and $ng_A$ are the refractive indices of the refractive optical element A for the d-line, the C-line, the F-line, and the g-line respectively, $vd_A$ is the Abbe number $(nd_A-1)/(nF_A-nC_A)$ of the refractive optical element A, $\theta gF_A$ is the relative partial dispersion $(ng_A-nF_A)/(nF_A-nC_A)$ of the refractive optical element A, G1 is the focal length of the first lens group, and G2 is the focal length of the second lens group.

In order to achieve a high magnification in the image forming optical system in which the first lens group has a positive refracting power, it is necessary that the negative refracting power of the second lens group be strong. On the other hand, when the negative refracting power of the second lens group is strong, aberrations generated in the first lens group is enlarged by the second and subsequent lens groups. This will deteriorate the optical performance of the entire optical system. In particular, chromatic aberrations will be deteriorated at the telephoto end. Therefore, in order to increase the zoom ratio while maintaining high optical performance or improving the optical performance, it is important that chromatic aberrations be corrected excellently in the first lens group.

In view of the above, in the image forming optical system according to this mode, the refractive optical element A having a positive refracting power is provided in the first lens group, and the image forming optical system is designed to satisfy conditional expressions (4-1) and (4-2), whereby chromatic aberrations generated in the first lens group can be made small. In addition, as conditional expression (2) is further satisfied in addition to conditional expressions (4-1) and (4-2), it is possible to realize an image forming optical system having high performance and high zoom ratio in which chromatic aberrations are corrected.

If the upper limit of conditional expression (4-1) is exceeded, it will become difficult to achieve first-order achromatization in the first lens group. Consequently, the resolution at the wide angle end and the telephoto end will become lower, and the performance will be deteriorated. Therefore, an image forming optical system having a high zoom ratio cannot be realized.

If the upper limit of conditional expression (4-2) is exceeded, second order spectrum will be overcorrected in the first lens group, and consequently axial chromatic aberration and chromatic aberration of magnification at the telephoto end will become worse. This consequently leads to generation of color blur due to second order spectrum and deterioration of the performance. Therefore, an image forming optical system having a high zoom ratio cannot be realized.

On the other hand, if the lower limit of conditional expression (4-1) or (4-2) is exceeded, the refracting power of the refractive optical element A will become strong. This will make spherical aberration at the telephoto end and the chromatic aberration of magnification at the wide angle end worse. Consequently, the resolution will become lower and color blur will occur to deteriorate the performance. Therefore, an image forming optical system having a high zoom ratio cannot be realized.

If the lower limit of conditional expression (2) is exceeded, the ratio of the refracting powers of the first lens group and the second lens group, which have the function of changing the magnification in the image forming optical system, will become small. Then, the zoom ratio will become small, because the first lens group and the second lens group are lens groups having the magnification changing function. Therefore, it will become difficult to realize an image forming optical system having a high zoom ratio. Furthermore, if the ratio of the refracting powers of the first lens group and the second lens group becomes small, the contribution of the second lens group to the entire image forming optical system in terms of the negative refracting power will become small. Then, the entire image forming optical system will have a positive Petzval sum. Therefore, curvature of field will be generated, and the performance will be deteriorated. This is not desirable.

The image forming optical system according to the second mode is an optical system that also satisfies the following conditional expression (2):

$$|G1/G2|>6.4 \quad (2),$$

where G1 is the focal length of the first lens group, and G2 is the focal length of the second lens group.

The effect of conditional expression (2) is as described above.

It is preferred that the image forming optical systems according to the above-described modes satisfy conditional expression (6):

$$0.4<\theta hg_A<1.2 \quad (6),$$

where $\theta hg_A$ is the relative partial dispersion $(nh_A-ng_A)/(nF_A-nC_A)$ of the refractive optical element A for the h-line, and $nh_A$ is the refractive index of the refractive optical element A for the h-line.

To improve the imaging performance, it is necessary to correct chromatic aberrations. The Abbe number affects the first order achromatization, and the relative partial dispersion affects the second order spectrum. In particular, the relative partial dispersion has bearing on the generation of color blur, among the factors of imaging performance. The color blur is a phenomenon in which a color(s) that is not contained in the object appears at the boundary of a bright portion and a dark portion having a large brightness difference.

There would be an optical material(s) having an optimum Abbe number and a relative partial dispersion in terms of first order achromatization and improvement in color blur. It is possible to improve the imaging performance by using such an optical material in the refractive optical element. However, satisfactory correction of color blur cannot be achieved by selecting the refractive optical element taking only the relative partial dispersion into consideration. Color blur cannot be corrected satisfactorily unless a refractive optical element is selected taking into consideration correction with respect to the h-line (404 nm) in addition to the Abbe number and the relative partial dispersion.

Therefore, in the image forming optical system according to this mode, it is preferred that conditional expression (6) be satisfied.

If conditional expression (6) is satisfied, color blur can further be reduced, and therefore an improvement in the imaging performance can be achieved. If the upper limit of conditional expression (6) is exceeded, correction with respect to the h-line will become excessive. If this is the case, color blur will become rather conspicuous. This is not desirable. On the other hand, if the lower limit is exceeded, correction with respect to the h-line will become insufficient. If this is the case, color blur will become conspicuous. This is not desirable.

It is preferred in the image forming optical systems according to the above-described modes that the systems have a stop that is arranged between the second lens group and the third lens group, a fourth lens group having a positive refracting power and a fifth lens group having a positive refracting power that are arranged subsequently to the third lens group, and zooming is performed by changing the distances between adjacent lens groups in such a way that, among the distances between the lens groups, the distance between the first lens group and the second lens group is larger, the distance between the second lens group and the third lens group is smaller, the distance between the third lens group and the fourth lens group is larger, and the distance between the fourth lens group and the fifth lens group is smaller, at the telephoto end than at the wide angle end.

As described above, in the image forming optical system according to this mode, the optical system is composed of five lens groups, and the lens groups are moved during zooming. With this configuration, changes in the brightness among zoom positions can be made small. Furthermore, as chromatic aberrations are corrected mainly by the first lens group, and a high zoom ratio is achieved by the second lens group, the third and subsequent lens groups can serve mainly for correction of monochromatic aberrations.

It is also preferred that the image forming optical systems according to the above-described modes satisfy conditional expression (7):

$$|f_B/f_A| > 0.15 \tag{7}$$

where $f_A$ is the focal length of the refractive optical element A, and $f_B$ is the focal length of the optical element B.

If conditional expression (7) is satisfied, second order spectrum can be corrected better as compared to the case where the optical element B is used alone. Therefore, an improvement will be achieve with respect to chromatic aberrations, and an improvement in the optical performance of the optical system will be achieved accordingly.

If the lower limit of conditional expression (7) is exceeded, the positive refracting power of the refractive optical element A will decrease, and therefore the decrease in the relative partial dispersion of the two-piece cemented optical element relative to the relative partial dispersion of the optical element B will become small. If this is the case, the difference between the relative partial dispersion of the optical element B and the relative partial dispersion of the two-piece cemented optical element will become small. Consequently, although the three-piece cemented element D is formed using the two-piece cemented optical element, the effect of the three-piece cemented element D in correcting second order spectrum will become small. This is not desirable.

It is also preferred that the image forming optical system according to the above-described modes satisfy conditional expression (8):

$$0 < \theta gF_B - \theta gF_{BA} < 0.15 \tag{8}$$

where $\theta gF_B$ is the relative partial dispersion $(ng_B - nF_B)/(nF_B - nC_B)$ of the optical element B, $\theta gF_{BA}$ is the effective relative partial dispersion of the two-piece cemented optical element made up of the refractive optical element A and the optical element B cemented together, $\theta gF_{BA}$ being represented by the following equation:

$$\theta gF_{BA} = f_{BA} \times \nu_{BA} \times (\theta gF \times \phi_A/\nu d + \theta gF_B \times \phi_B/\nu_B),$$

where $F_{BA}$ is represented by $1/f_{BA} = 1/f_A + 1/f_B$, $\nu_{BA}$ is the Abbe number of the two-piece cemented optical element virtually regarded as a single optical element, $\nu_{BA}$ being represented by $\nu_{BA} = 1/(f_{BA} \times (\phi_A/\nu d + (\phi_B/\nu_B))$, where $f_A$ is the focal length of the refractive optical element A, $\phi_A$ is the refracting power of the refractive optical element A, $f_B$ is the focal length of the optical element B, $\phi_B$ is the refracting power of the optical element B, $\nu_B$ is the Abbe number $(nd_B - 1)/(nF_B - nC_B)$ of the optical element B, $\theta gF$ is the relative partial dispersion $(ng_A - nF_A)/(nF_A - nC_A)$ of the refractive optical element A, $\nu_d$ is the Abbe number $(nd_A - 1)/(nF_A - nC_A)$ of the refractive optical element A, $nd_A$, $nC_A$, $nF_A$, and $ng_A$ are refractive indices of the refractive optical element A for the d-line, the C-line, the F-line, and the g-line respectively, and $nd_B$, $nC_B$, $nF_B$, and $ng_B$ are refractive indices of the optical element B for the d-line, the C-line, the F-line, and the g-line respectively.

As described above, it is more preferable that the optical element B be used in the two-piece cemented optical element than that the optical element B is used alone. This provides further correction of second order spectrum. Consequently, an improvement in the performance is achieved by an improvement with respect to color blur.

If the upper limit of conditional expression (8) is exceeded, color blur will be caused due to overcorrection of second order spectrum. This is not desirable. If the lower limit of conditional expression (8) is exceeded, the relative partial dispersion ($\theta gF_{BA}$) of the two-piece cemented optical element will become larger than the relative partial dispersion ($\theta gF_B$) of the optical element B alone. This means that the refractive optical element A generates second order spectrum. In consequence, color blur becomes larger than that before the cementing. This is not desirable.

It is also preferred that the image forming optical system according to the above-described modes satisfy conditional expression (9):

$$2.0 < f_A/G1 < 7.0 \tag{9}$$

where $f_A$ is the focal length of the refractive optical element A, and G1 is the focal length of the first lens group.

In order to maintain high performance or to improve the performance, it is important that chromatic aberrations be corrected in the first lens group. If conditional expression (9) is satisfied, correction can be excellently achieved especially in terms of second spectrum. Therefore, an improvement with respect to color blur can be achieved.

If the upper limit of conditional expression (9) is exceeded, the refracting power of the refractive optical element A will become weak. Then, it is difficult make the relative partial dispersion of the two-piece cemented optical element smaller than the relative partial dispersion of the optical element B alone. In consequence, color blur will be caused due to undercorrection of second order spectrum. This is not desirable.

On the other hand, if the lower limit of conditional expression (9) is exceeded, the refracting power of the refractive optical element A will become strong. Then, it is possible to make the relative partial dispersion of the two-piece cemented optical element smaller than the relative partial dispersion of the optical element B alone. However, second spectrum will be overcorrected. This means that the refractive optical element A generates second order spectrum. In consequence, color blur becomes larger. This is not desirable.

It is also preferred that the image forming optical system according to the above-described modes satisfy conditional expression (10):

$$-26 < (Ra+Rb)/(Ra-Rb) < -0.5 \quad (10),$$

where Ra is the radius of curvature on the object side surface of the refractive optical element A, and Rb is the radius of curvature on the image plane side surface of the refractive optical element A.

If the upper limit of conditional expression (10) is exceeded, spherical aberration will become larger in the negative direction at the telephoto end. If the lower limit of conditional expression (10) is exceeded, spherical aberration will become larger in the positive direction. In both cases, the imaging performance is deteriorated. This is not desirable.

An image pickup apparatus according to a first mode comprises an image forming optical system and an image pickup element, wherein the image forming optical system comprises, in order from the object side to the image side, a first lens group having a positive refracting power, a second lens group having a negative refracting power, and an image side lens group having a positive refracting power, the distance between the first lens group and the second lens group changes during zooming, a refractive optical element A having a positive refracting power is provided in the first lens group, and the refractive optical element A satisfies the following conditional expression (3-2):

$$0 < (Zb(3.3a) - Za(3.3a))/(Zb(2.5a) - Za(2.5a)) < 0.895 \quad (3-2),$$

where fw is the focal length of the image forming optical system at the wide angle end, ft is the focal length of the image forming optical system at the telephoto end, IH is the maximum image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = (IH^2 \times \log_{10}(ft/fw))/fw \quad (3-1).$$

In the image pickup apparatus according to this mode, the refractive optical element A having a positive refracting power is provided in the first lens group. The distance over which a ray transmitted through the refractive optical element A travels inside the refractive optical element A and the position at which the ray passes through the refractive optical element A vary depending on the angle of view and the zoom position. In consequence, even if the shape of the refractive optical element A is constant, the aberration correction effect of the refractive optical element A varies depending on the angle of view and the zoom position.

Therefore, in order to achieve a good aberration state throughout the entire zoom range, it is necessary to design the shape of the refractive optical element A taking into consideration the zoom ratio and the image height.

Let a be the ray height of a principal ray that is incident on a maximum image height point, at distance L from the stop. Then, a is represented as follows:

$$a = L \times IH/fw.$$

Here, the following relationships hold:

$$\tan(\text{angle of view}) = IH/fw, \text{ and}$$

$$L \propto IH \times \log_{10}(ft/fw).$$

Thus, by introducing a proportionality factor m, equation (3-1) is obtained.

The ray height, the angle of view, the zoom ratio, and the image height have the relationship represented by equation (3-1). It is desirable that the image forming optical system according to this mode satisfy conditional expression (3-2).

Here, the first lens group having a positive refracting power is required to achieve a good aberration condition with respect to chromatic aberration of magnification at the wide angle end and with respect to axial chromatic aberration and spherical aberration at the telephoto end. This enables good imaging performance of the image forming optical system.

If the upper limit of conditional expression (3-2) is exceeded, a change in the ratio of the thickness (or thickness ratio) of the refractive optical element A on the optical axis and that in the peripheral portion will be small. Then, chromatic aberration of magnification at the wide angle end will be overcorrected. In addition, correction of axial chromatic aberration and spherical aberration at the telephoto end will be unsatisfactory. Consequently, it will be difficult to achieve good imaging performance. This is not desirable. On the other hand, if the lower limit of conditional expression (3-2) is exceeded, the numerator in conditional expression (3-2) turns into negative. This means that the physical shape of the refractive optical element A cannot be realized as an optical element.

In the image pickup apparatus having an image forming optical system and an image pickup element, if the image pickup optical system is the image pickup system according to the above-described mode, it is preferred that the following conditional expression (3-2) be satisfied:

$$0 < (Zb(3.3a) - Za(3.3a))/(Zb(2.5a) - Za(2.5a)) < 0.895 \quad (3-2),$$

where fw is the focal length of the image forming optical system at the wide angle end, ft is the focal length of the image forming optical system at the telephoto end, IH is the maximum image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = (IH^2 \times \log_{10}(ft/fw))/fw \quad (3-1).$$

The effect of satisfying conditional expression (3-2) is as described above.

In the image pickup apparatus according to the above-described mode, it is also preferred that the following conditional expression (5a) or (5b) be satisfied:

$$0.20 < (Tnglw(0.7)/Tbasw(0.7))/(Tngl(0)/Tbas(0)) < 0.65 \quad (5a),$$

$$0.10 < (Tnglw(0.9)/Tbasw(0.9))/(Tngl(0)/Tbas(0)) < 0.45 \quad (5b),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, Tnglw(0.9) is the distance over which a principal ray having a ray height of 90% of the maximum image height on the image pickup element at the wide angle end travels inside the refractive optical element A, Tbas (0) is the thickness of the optical element B on the optical axis, Tbasw(0.7) is the distance over which a principal ray having a ray height of 70% of the maximum image height on the image pickup element at the wide angle end travels inside the optical element B, and Tbasw(0.9) is the distance over which a principal ray having a ray height of 90% of the maximum image height on the image pickup element at the wide angle end travels inside the optical element B.

$$0.20 < (Tnglw(0.7)/Tbasw(0.7))/(Tngl(0)/Tbas(0)) < 0.65 \quad (5a),$$

$$0.10 < (Tnglw(0.9)/Tbasw(0.9))/(Tngl(0)/Tbas(0)) < 0.45 \quad (5b),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, Tnglw(0.9) is the distance over which a principal ray having a ray height of 90% of the maximum image height on the image pickup element at the wide angle end travels inside the refractive optical element A, Tbas (0) is the thickness of the optical element B on the optical axis, Tbasw(0.7) is the distance over which a principal ray having a ray height of 70% of the maximum image height on the image pickup element at the wide angle end travels inside the optical element B, and Tbasw(0.9) is the distance over which a principal ray having a ray height of 90% of the maximum image height on the image pickup element at the wide angle end travels inside the optical element B.

If conditional expression (5a) or (5b) is satisfied, axial chromatic aberration and chromatic aberration of magnification can be favorably corrected at the wide angle end, and well-balanced correction of axial chromatic aberration and chromatic aberration of magnification can be achieved.

If the upper limits of conditional expressions (5a) and (5b) are exceeded, the amount of correction of chromatic aberration of magnification will become larger than the amount of correction of axial chromatic aberration. If this is the case, when the amount of correction of chromatic aberration of magnification is appropriate, the amount of correction of axial chromatic aberration will be insufficient, leading to deterioration of the performance in the axial region. This is not desirable.

If the lower limits of conditional expressions (5a) and (5b) are exceeded, the amount of correction of chromatic aberration of magnification will become smaller than the amount of correction of axial chromatic aberration. If this is the case, when the amount of correction of axial chromatic aberration is appropriate, the amount of correction of chromatic aberration of magnification will be insufficient, leading to deterioration of the performance in the off-axis region. This is not desirable.

The lowest value of conditional expressions (5a) and (5b) will not be negative, because the value of the denominator and the value of the numerator are both positive.

In the image pickup apparatus according to the above-described mode, it is preferred that any one of the following conditional expressions (11-1a), (11-1b), (11-1c), (11-2a), and (11-2b) be satisfied:

$$0.4 < Tngl(0)/Tbas(0) < 2.4 \quad (11\text{-}1a),$$

$$0.2 < Tnglt(0.7)/Tbast(0.7) < 1.5 \quad (11\text{-}1b),$$

$$0.1 < Tnglt(0.9)/Tbast(0.9) < 1.1 \quad (11\text{-}1c),$$

$$0.2 < (Tnglt(0.7)/Tbast(0.7))/(Tngl(0)/Tbas(0)) < 0.85 \quad (11\text{-}2a),$$

$$0.2 < (Tnglt(0.9)/Tbast(0.9))/(Tngl(0)/Tbas(0)) < 0.75 \quad (11\text{-}2b),$$

where Tngl(0) is the thickness of the refractive optical element A on the optical axis, Tnglt(0.7) is the distance over which a principal ray having a ray height of 70% of the maximum image height on the image pickup element at the telephoto end travels inside the refractive optical element A, Tnglt(0.9) is the distance over which a principal ray having a ray height of 90% of the maximum image height on the image pickup element at the telephoto end travels inside the refractive optical element A, Tbas (0) is the thickness of the optical element B on the optical axis, Tbast(0.7) is the distance over which a principal ray having a ray height of 70% of the maximum image height on the image pickup element at the telephoto end travels inside the optical element B, and Tbast (0.9) is the distance over which a principal ray having a ray height of 90% of the maximum image height on the image pickup element at the telephoto end travels inside the optical element B.

If any one of conditional expressions (11-1a), (11-1b), (11-1c), (11-2a), and (11-2b) is satisfied, axial chromatic aberration and chromatic aberration of magnification can be favorably corrected at the telephoto end, and well-balanced correction of axial chromatic aberration and chromatic aberration of magnification can be achieved.

If the upper limits of conditional expressions (11-1a), (11-1b), and (11-1c) are exceeded, axial chromatic aberration will be overcorrected in the axial region, and chromatic aberration of magnification will be overcorrected in the off-axis region, at the telephoto end. Consequently, the imaging performance of the overall optical system will be deteriorated. This is not desirable.

If the lower limits of conditional expressions (11-1a), (11-1b), and (11-1c) are exceeded, undercorrection of axial chromatic aberration will occur in the axial region, and undercorrection of chromatic aberration of magnification will occur in the off-axis region, at the telephoto end. Furthermore, the smallness of the edge thickness at the outermost portion will make the manufacturing difficult. This is not desirable.

If the upper limits of conditional expressions (11-2a) and (11-2b) are exceeded, the amount of correction of chromatic aberration of magnification will become larger than the amount of correction of axial chromatic aberration. If this is the case, when the amount of correction of chromatic aberration of magnification is appropriate, the amount of correction of axial chromatic aberration will be insufficient. Consequently, the performance in the axial region will be deteriorated. This is not desirable.

If the lower limits of conditional expressions (11-2a) and (11-2b) are exceeded, the amount of correction of chromatic aberration of magnification will become smaller than the amount of correction of axial chromatic aberration. If this is the case, when the amount of correction of axial chromatic aberration is appropriate, the amount of correction of chromatic aberration of magnification will be insufficient. Consequently, the performance in the off-axis region will be deteriorated. This is not desirable. The lowest values of conditional expressions (11-2a) and (11-2b) will not be negative, because the value of the denominator and the value of the numerator are both positive.

In the image pickup apparatus according to the above-described mode, it is preferred that the following conditional expression (12a) or conditional expression (12b) be satisfied:

$$0.5 < Tnglw(0.7)/Tngl(0) < 0.9 \quad (12a),$$

$$0.3 < Tnglw(0.9)/Tngl(0) < 0.8 \quad (12b),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, and Tnglw(0.9) is the distance over which a principal ray having a ray height of 90% of the maximum image height on the image pickup element at the wide angle end travels inside the refractive optical element A.

It is preferred that conditional expression (12a) or (12b) be satisfied, axial chromatic aberration and chromatic aberration of magnification can be favorably corrected at the wide angle end. Furthermore, well-balanced correction of axial chromatic aberration and chromatic aberration of magnification can be achieved.

If the upper limits of conditional expressions (12a) and (12b) are exceeded, the difference in the thickness of the refractive optical element A between the on-axis portion and the off-axis portion will become little. If this is the case, the amount of correction of chromatic aberration of magnification will become excessively large as compared to the amount of correction of axial chromatic aberration. Consequently, the imaging performance of the overall optical system will be deteriorated. This is not desirable. On the other hand, if the lower limits of conditional expressions (12a) and (12b) are exceeded, the amount of correction of chromatic aberration of magnification will become insufficient as compared to the amount of correction of axial chromatic aberration. In this case also, the imaging performance of the overall optical system will be deteriorated. This is not desirable.

In the image pickup apparatus according to the above-described mode, it is preferred that the following conditional expression (13a) or conditional expression (13b) be satisfied:

$$0.5 < (Tnglt(0.7)/Tngl(0)) < 0.95 \quad (13a),$$

$$0.4 < (Tnglt(0.9)/Tngl(0)) < 0.93 \quad (13b),$$

where Tngl(0) is the thickness of the refractive optical element A on the optical axis, Tnglt(0.7) is the distance over which a principal ray having a ray height of 70% of the maximum image height on the image pickup element at the telephoto end travels inside the refractive optical element A, and Tnglt(0.9) is the distance over which a principal ray having a ray height of 90% of the maximum image height on the image pickup element at the telephoto end travels inside the refractive optical element A.

If conditional expression (13a) or (13b) is satisfied, axial chromatic aberration and chromatic aberration of magnification can be favorably corrected at the telephoto end. Furthermore, well-balanced correction of axial chromatic aberration and chromatic aberration of magnification can be achieved.

If the upper limits of conditional expressions (13a) and (13b) are exceeded, the difference in the thickness of the refractive optical element A between the on-axis portion and the off-axis portion will become little. If this is the case, the amount of correction of chromatic aberration of magnification will become insufficient as compared to the amount of correction of axial chromatic aberration. This is not desirable. On the other hand, if the lower limits of conditional expressions (13a) and (13b) are exceeded, the amount of correction of chromatic aberration of magnification will become excessively large as compared to the amount of correction of axial chromatic aberration. Consequently, the imaging performance of the overall optical system will be deteriorated. This is not desirable.

In the image pickup apparatus according to the above-described mode, it is preferred that any one of the following conditional expressions (14-1a), (14-1b), and (14-1c) be satisfied:

$$0.4 < Tngl(0)/Tbas(0) < 2.4 \quad (14\text{-}1a),$$

$$0.2 < Tnglw(0.7)/Tbasw(0.7) < 0.9 \quad (14\text{-}1b),$$

$$0.1 < Tnglw(0.9)/Tbasw(0.9) < 0.65 \quad (14\text{-}1c),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, Tnglw(0.9) is the distance over which a principal ray having a ray height of 90% of the maximum image height on the image pickup element at the wide angle end travels inside the refractive optical element A, Tbas (0) is the thickness of the optical element B on the optical axis, Tbasw(0.7) is the distance over which a principal ray having a ray height of 70% of the maximum image height on the image pickup element at the wide angle end travels inside the optical element B, and Tbasw(0.9) is the distance over which a principal ray having a ray height of 90% of the maximum image height on the image pickup element at the wide angle end travels inside the optical element B.

If conditional expression (14-1a), (14-1b), or (14-1c) is satisfied, axial chromatic aberration and chromatic aberration of magnification can be favorably corrected at the wide angle end. Furthermore, well-balanced correction of axial chromatic aberration and chromatic aberration of magnification can be achieved.

If the upper limits of conditional expressions (14-1a), (14-1b), and (14-1c) are exceeded, axial chromatic aberration will be overcorrected in the axial region, and chromatic aberration of magnification will be overcorrected in the off-axis region, at the wide angle end. Consequently, the imaging performance of the overall optical system will be deteriorated. This is not desirable.

If the lower limits of conditional expressions (14-1a), (14-1b), and (14-1c) are exceeded, undercorrection of axial chromatic aberration will occur in the axial region, and undercorrection of chromatic aberration of magnification will occur in the off-axis region, at the wide angle end. Furthermore, the smallness of the edge thickness at the outermost portion will make the manufacturing difficult. This is not desirable.

EMBODIMENTS

In the following, embodiments of the image forming optical system and the electronic image pickup apparatus according to the present invention will be described in detail with reference to the drawings. The embodiments are not intended to limit the present invention. In the following description, the optical element B will be referred to as the object side base optical element B, and the optical element C will be referred to as the image side base optical element C.

Each embodiment is composed, in order from the object side, of a first lens group having a positive refracting power, a second lens group having a negative refracting power, a stop, a third lens group having a positive refracting power, a fourth lens group having a positive refracting power, and a fifth lens group having a positive refracting power. The first lens group includes a positive lens, a negative lens (or the object side base optical element B), the aforementioned refractive optical element A having a positive refracting power, and one positive lens (or the image side base optical element C). With the configuration of the first lens group and the refractive optical element A, correction of chromatic aberrations is effectively achieved at the telephoto end.

The second lens group includes a negative lens, a negative lens, a positive lens, and a negative lens. With the configuration of the second lens group, a high zoom ratio is achieved.

Zooming is performed by changing the distances between adjacent lens groups in such a way that the distance between the first lens group and the second lens group is larger, the distance between the second lens group and the third lens group is smaller, the distance between the third lens group and the fourth lens group is larger, and the distance between the fourth lens group and the fifth lens group is smaller, at the telephoto end than at the wide angle end.

The fourth lens group moves along a locus that is convex toward the object side to correct a shift of the image plane upon changing the magnification.

The zoom lens according to each embodiment is a taking lens system that is to be used in an image pickup apparatus such as a video camera, a digital camera, or a silver halide film camera.

In the following embodiments, the "wide angle end" and the "telephoto end" refers to the zoom positions at the time when the magnification changing lens group is located at the ends of the range over which it can move mechanically along the optical axis.

All the embodiments are zoom lenses each including, in order from the object side to the image side thereof, a first lens group having a positive refracting power, a second lens group having a negative refracting power, and an image side lens group.

In the present invention, the number of lens groups that constitute the image side lens group is arbitrary, and the image side lens group may include at least one lens group. In other words, the zoom lens according to the present invention may include three or more lens groups.

Figure 1B:
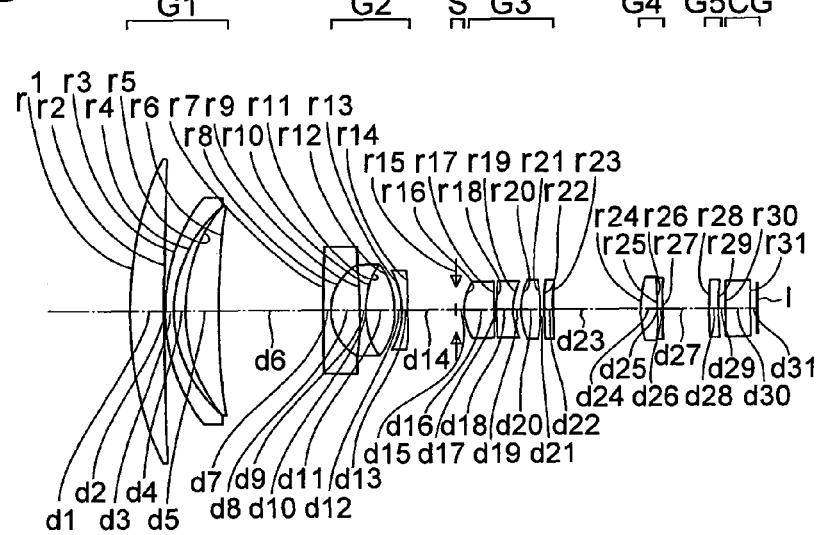
FIG. 1B is a cross sectional view along the optical axis, showing the optical configuration of the zoom lens according to embodiment 1 in the state in which the zoom lens is focused on an object point at infinity at an intermediate position.
Figure 1C:
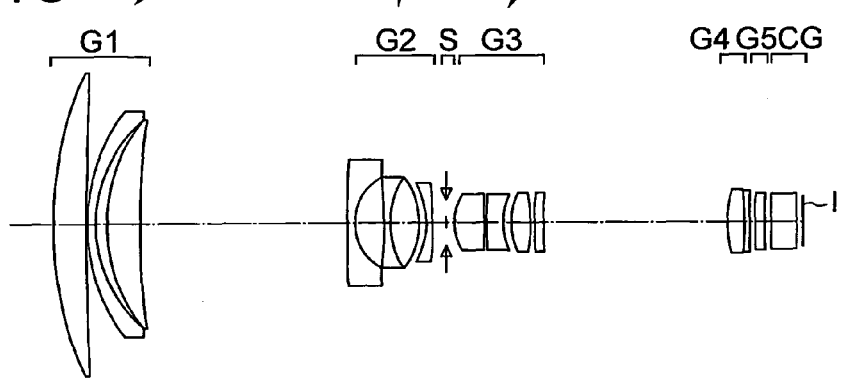
FIG. 1C is a cross sectional view along the optical axis, showing the optical configuration of the zoom lens according to embodiment 1 in the state in which the zoom lens is focused on an object point at infinity at the telephoto end.

Now, a zoom lens according to embodiment 1 of the present invention will be described. FIGS. 1A, 1B and 1C are cross sectional views along the optical axis, showing the optical configuration of the zoom lens according to embodiment 1 in the state in which the zoom lens is focused on an object point at infinity, where FIG. 1A is a cross sectional view at the wide angle end, FIG. 1B is a cross sectional view in an intermediate focal length state, and FIG. 1C is a cross sectional view at the telephoto end.

Figure 2A:
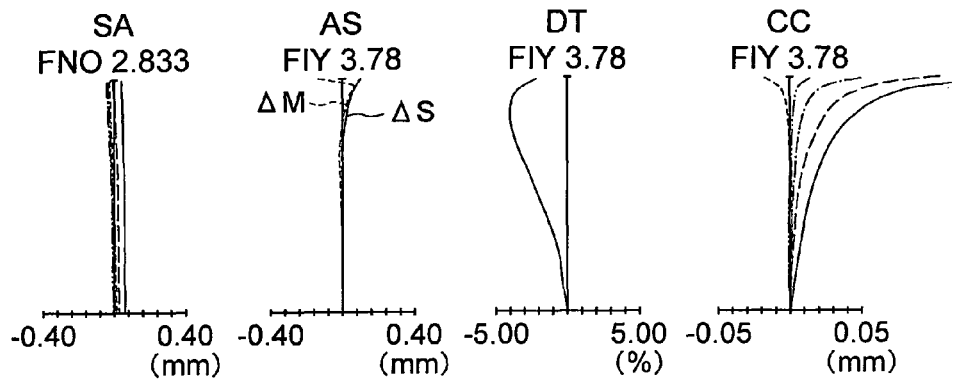
FIG. 2A is a diagram showing spherical aberration, astigmatism, distortion, and chromatic aberration of magnification of the zoom lens according to embodiment 1 in the state in which the zoom lens is focused on an object point at infinity at the wide angle end.
Figure 2B:
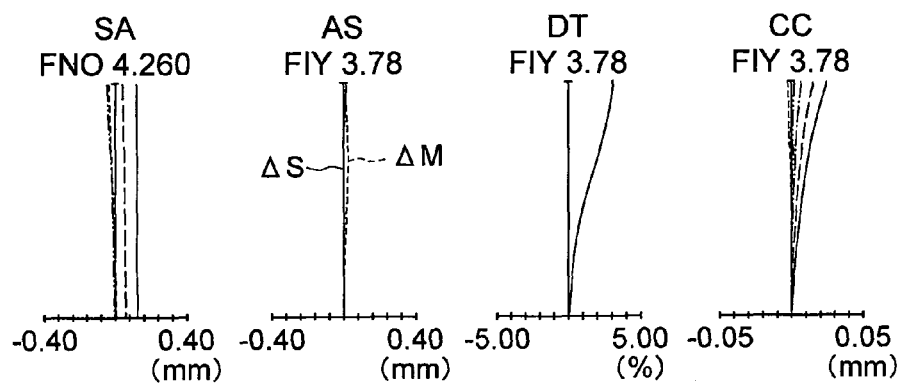
FIG. 2B is a diagram showing spherical aberration, astigmatism, distortion, and chromatic aberration of magnification of the zoom lens according to embodiment 1 in the state in which the zoom lens is focused on an object point at infinity at the intermediate position.
Figure 2C:
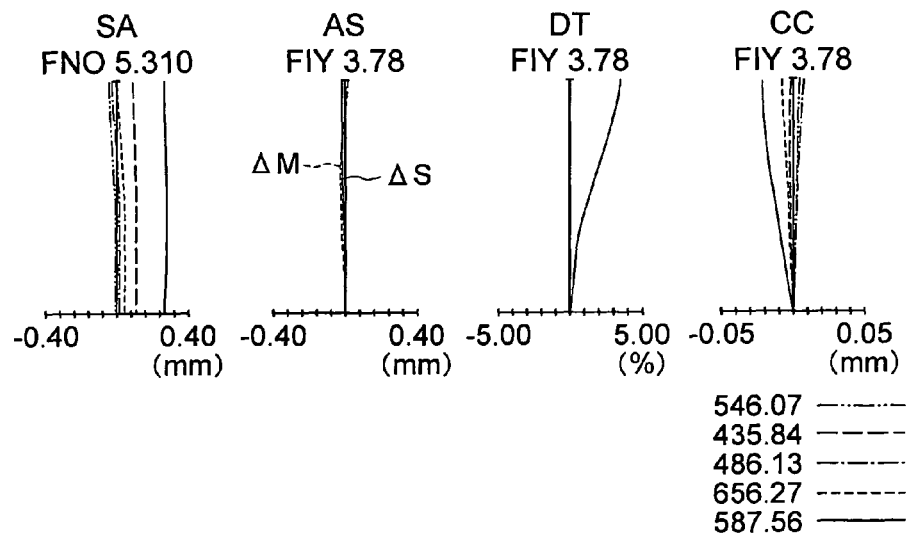
FIG. 2C is a diagram showing spherical aberration, astigmatism, distortion, and chromatic aberration of magnification of the zoom lens according to embodiment 1 in the state in which the zoom lens is focused on an object point at infinity at the telephoto end.

FIGS. 2A, 2B and 2C are diagrams showing spherical aberration (SA), astigmatism (AS), distortion (DT), and chromatic aberration of magnification (CC) of the zoom lens according to embodiment 1 in the state in which the zoom lens is focused on an object point at infinity, where FIG. 2A shows those at the wide angle end, FIG. 2B shows those in the intermediate focal length state, and FIG. 2C shows those at the telephoto end. FIY denotes the image height. The same signs will be used in the aberration diagrams for the embodiments described subsequently.

As shown in FIGS. 1A, 1B, and 1C, the zoom lens according to embodiment 1 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power. In the cross sectional views of the zoom lenses according to all the embodiments, LPF denotes a low pass filter, CG denotes a cover glass, and I denotes the image plane of an electronic image pickup element.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.668.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power. In all the following embodiments, L7 denotes a cementing layer.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power. In all the following embodiments, L15 denotes a cementing layer.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side and thereafter toward the object side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 3A:
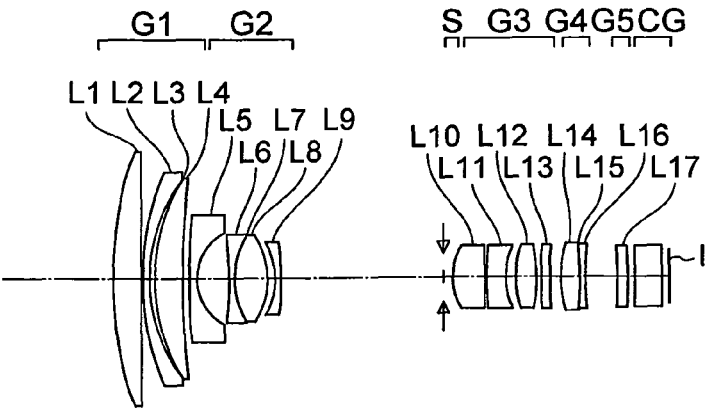
FIG. 3A is a cross sectional view along the optical axis, showing the optical configuration of a zoom lens according to embodiment 2 in the state in which the zoom lens is focused on an object point at infinity at the wide angle end.
Figure 3B:
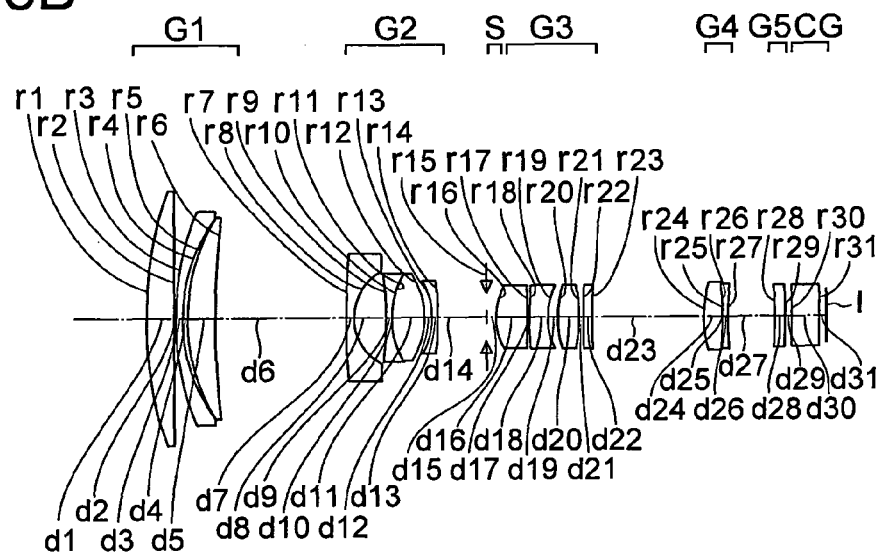
FIG. 3B is a cross sectional view along the optical axis, showing the optical configuration of the zoom lens according to embodiment 2 in the state in which the zoom lens is focused on an object point at infinity at an intermediate position.
Figure 3C:
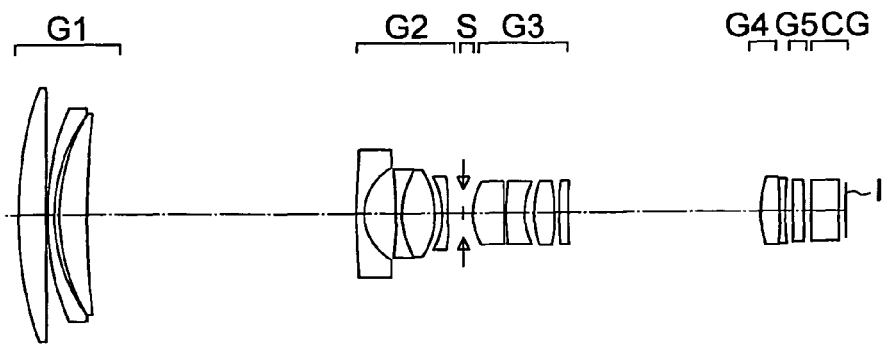
FIG. 3C is a cross sectional view along the optical axis, showing the optical configuration of the zoom lens according to embodiment 2 in the state in which the zoom lens is focused on an object point at infinity at the telephoto end.

Next, a zoom lens according to embodiment 2 of the present invention will be described. FIGS. 3A, 3B and 3C are cross sectional views along the optical axis, showing the optical configuration of the zoom lens according to embodiment 1 in the state in which the zoom lens is focused on an object point at infinity, where FIG. 3A is a cross sectional view at the wide angle end, FIG. 3B is a cross sectional view in an intermediate focal length state, and FIG. 3C is a cross sectional view at the telephoto end.

Figure 4A:
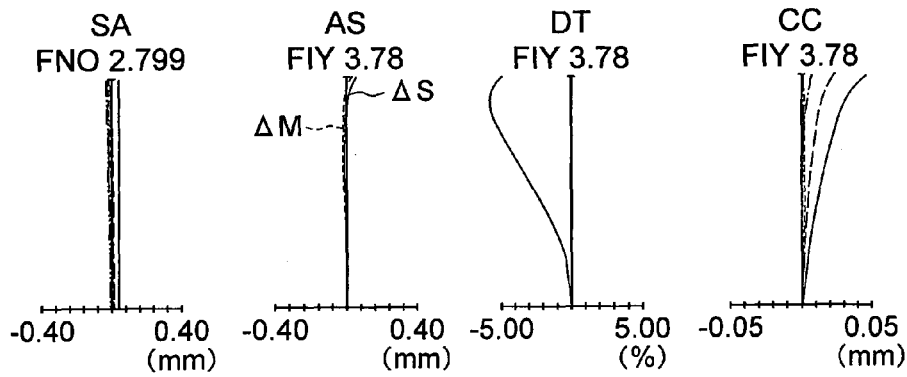
FIG. 4A is a diagram showing spherical aberration, astigmatism, distortion, and chromatic aberration of magnification of the zoom lens according to embodiment 2 in the state in which the zoom lens is focused on an object point at infinity at the wide angle end.
Figure 4B:
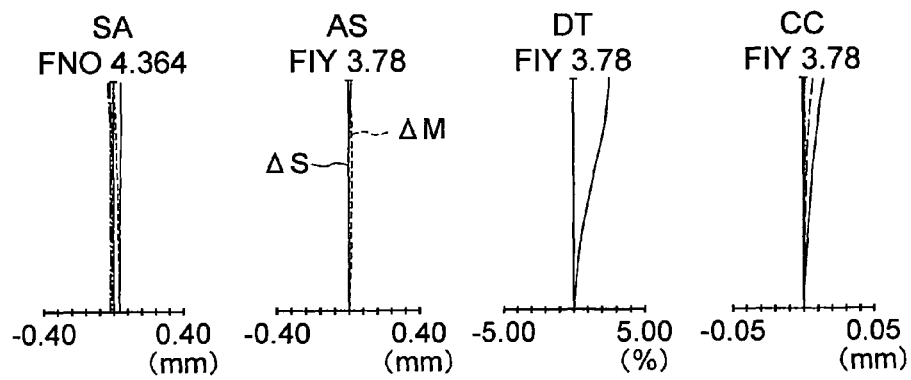
FIG. 4B is a diagram showing spherical aberration, astigmatism, distortion, and chromatic aberration of magnification of the zoom lens according to embodiment 2 in the state in which the zoom lens is focused on an object point at infinity at the intermediate position.
Figure 4C:
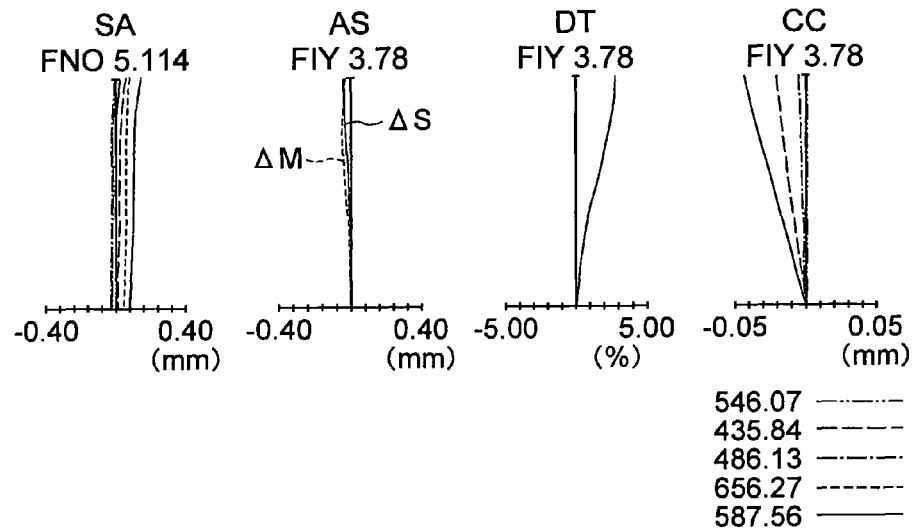
FIG. 4C is a diagram showing spherical aberration, astigmatism, distortion, and chromatic aberration of magnification of the zoom lens according to embodiment 2 in the state in which the zoom lens is focused on an object point at infinity at the telephoto end.

FIGS. 4A, 4B and 4C are diagrams showing spherical aberration, astigmatism, distortion, and chromatic aberration of magnification of the zoom lens according to embodiment 2 in the state in which the zoom lens is focused on an object point at infinity, where FIG. 4A shows those at the wide angle end, FIG. 4B shows those in the intermediate focal length state, and FIG. 4C shows those at the telephoto end.

As shown in FIGS. 3A, 3B, and 3C, the zoom lens according to embodiment 2 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.668.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the object side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 5A:
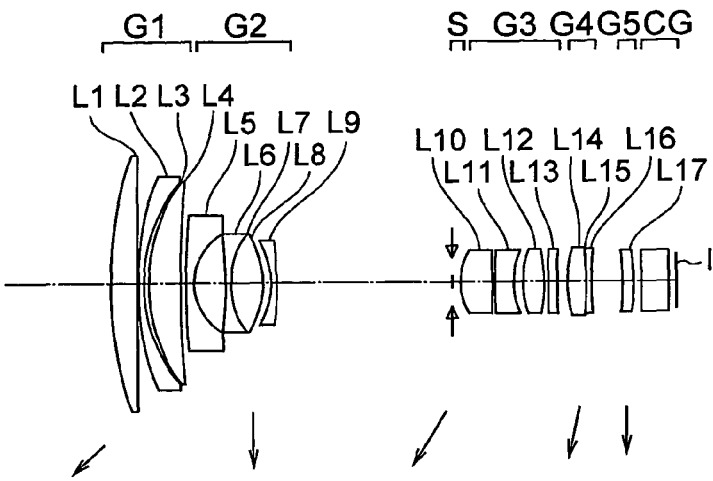
FIG. 5A is a cross sectional view along the optical axis, showing the optical configuration of a zoom lens according to embodiment 3 in the state in which the zoom lens is focused on an object point at infinity at the wide angle end.
Figure 5B:
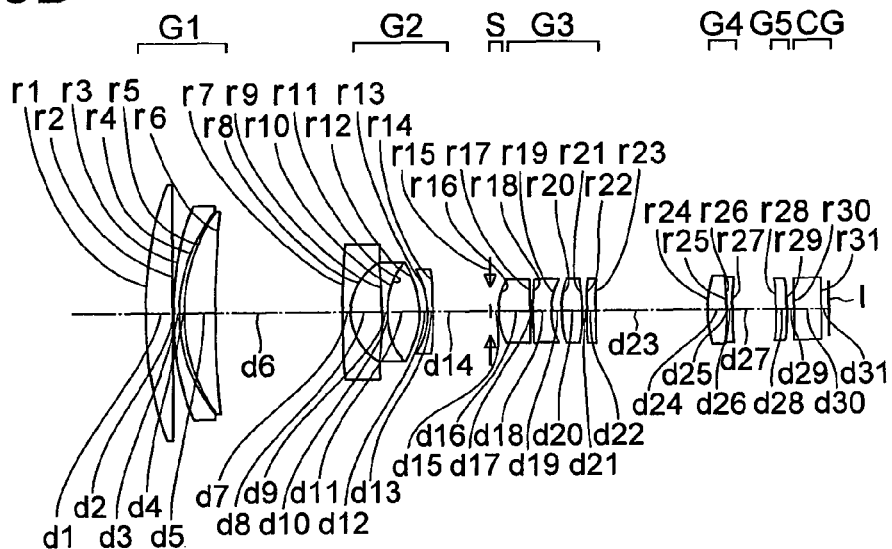
FIG. 5B is a cross sectional view along the optical axis, showing the optical configuration of the zoom lens according to embodiment 3 in the state in which the zoom lens is focused on an object point at infinity at an intermediate position.
Figure 5C:
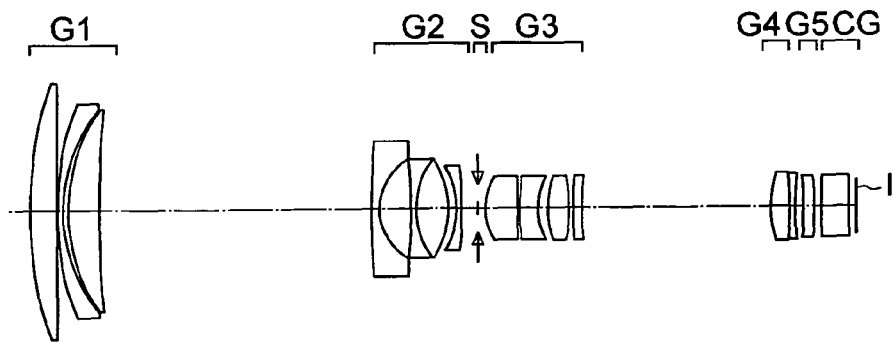
FIG. 5C is a cross sectional view along the optical axis, showing the optical configuration of the zoom lens according to embodiment 3 in the state in which the zoom lens is focused on an object point at infinity at the telephoto end.

Next, a zoom lens according to embodiment 3 of the present invention will be described. FIGS. 5A, 5B and 5C are cross sectional views along the optical axis, showing the optical configuration of the zoom lens according to embodiment 3 in the state in which the zoom lens is focused on an object point at infinity, where FIG. 5A is a cross sectional view at the wide angle end, FIG. 5B is a cross sectional view in an intermediate focal length state, and FIG. 5C is a cross sectional view at the telephoto end.

Figure 6A:
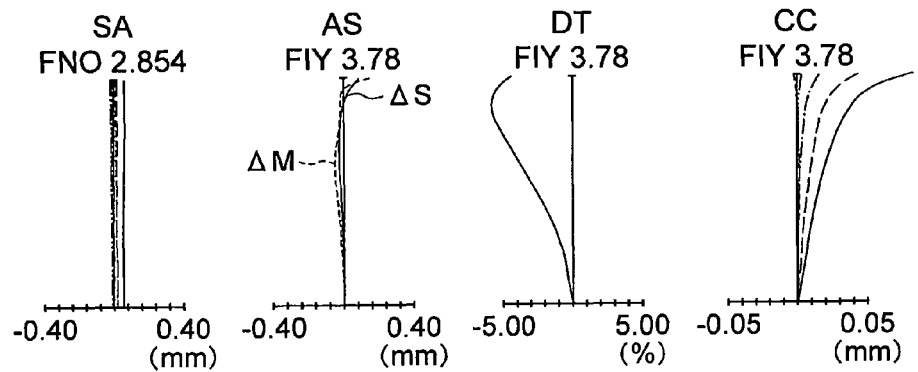
FIG. 6A is a diagram showing spherical aberration, astigmatism, distortion, and chromatic aberration of magnification of the zoom lens according to embodiment 3 in the state in which the zoom lens is focused on an object point at infinity at the wide angle end.
Figure 6B:
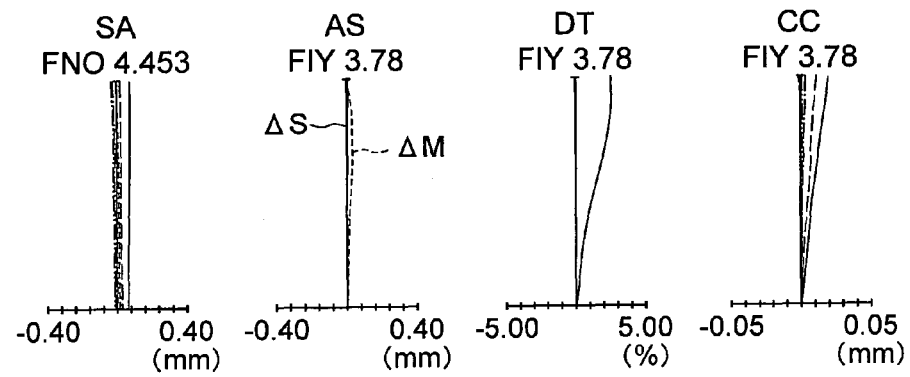
FIG. 6B is a diagram showing spherical aberration, astigmatism, distortion, and chromatic aberration of magnification of the zoom lens according to embodiment 3 in the state in which the zoom lens is focused on an object point at infinity at the intermediate position.
Figure 6C:
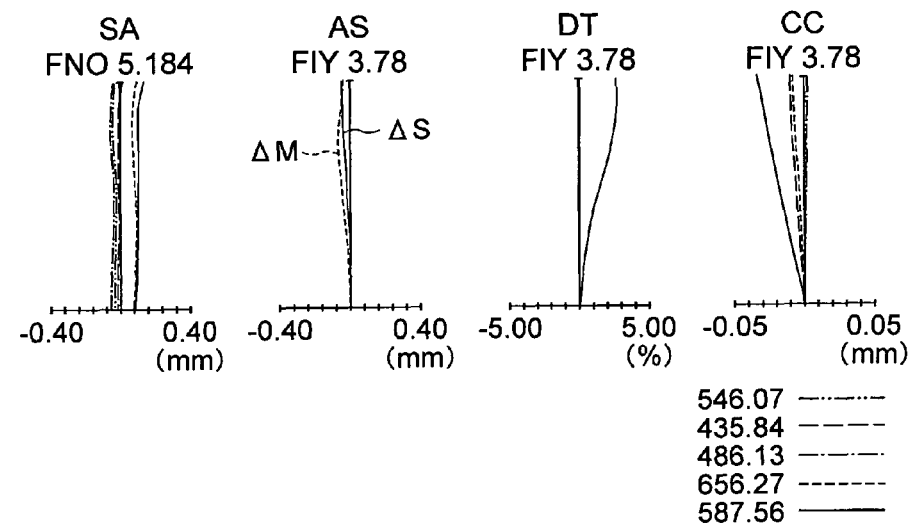
FIG. 6C is a diagram showing spherical aberration, astigmatism, distortion, and chromatic aberration of magnification of the zoom lens according to embodiment 3 in the state in which the zoom lens is focused on an object point at infinity at the telephoto end.

FIGS. 6A, 6B and 6C are diagrams showing spherical aberration, astigmatism, distortion, and chromatic aberration of magnification of the zoom lens according to embodiment 1 in the state in which the zoom lens is focused on an object point at infinity, where FIG. 6A shows those at the wide angle end, FIG. 6B shows those in the intermediate focal length state, and FIG. 6C shows those at the telephoto end.

As shown in FIGS. 5A, 5B, and 5C, the zoom lens according to embodiment 3 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.689.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side, the third lens group G3 moves toward the object side, the aperture stop S moves together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 7A:
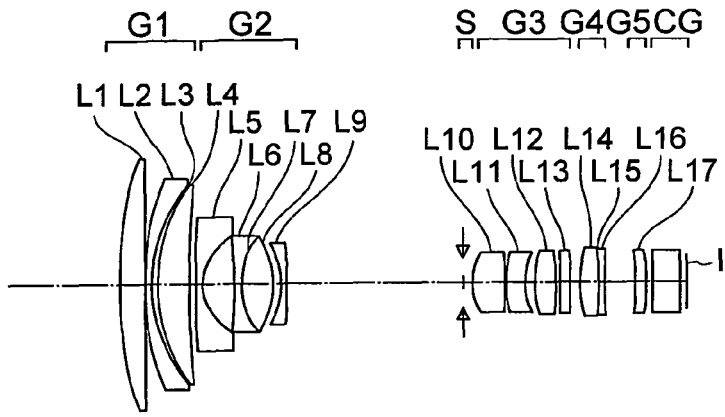
FIG. 7A is a cross sectional view along the optical axis, showing the optical configuration of a zoom lens according to embodiment 4 in the state in which the zoom lens is focused on an object point at infinity at the wide angle end.
Figure 7B:
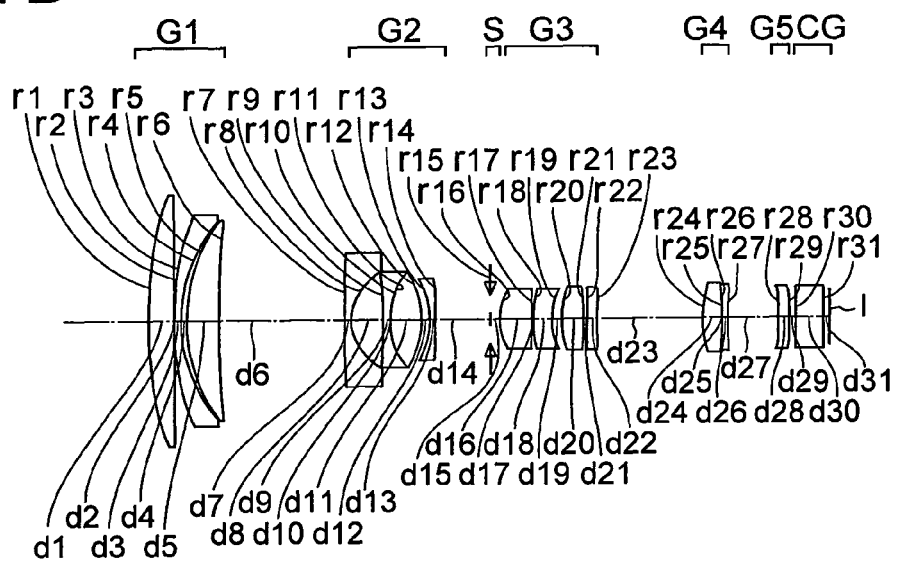
FIG. 7B is a cross sectional view along the optical axis, showing the optical configuration of the zoom lens according to embodiment 4 in the state in which the zoom lens is focused on an object point at infinity at an intermediate position.
Figure 7C:
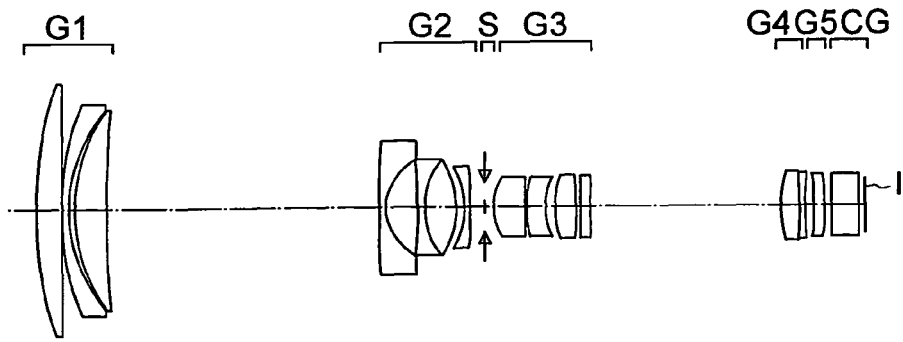
FIG. 7C is a cross sectional view along the optical axis, showing the optical configuration of the zoom lens according to embodiment 4 in the state in which the zoom lens is focused on an object point at infinity at the telephoto end.

Next, a zoom lens according to embodiment 4 of the present invention will be described. FIGS. 7A, 7B and 7C are cross sectional views along the optical axis, showing the optical configuration of the zoom lens according to embodiment 4 in the state in which the zoom lens is focused on an object point at infinity, where FIG. 7A is a cross sectional view at the wide angle end, FIG. 7B is a cross sectional view in an intermediate focal length state, and FIG. 7C is a cross sectional view at the telephoto end.

Figure 8A:
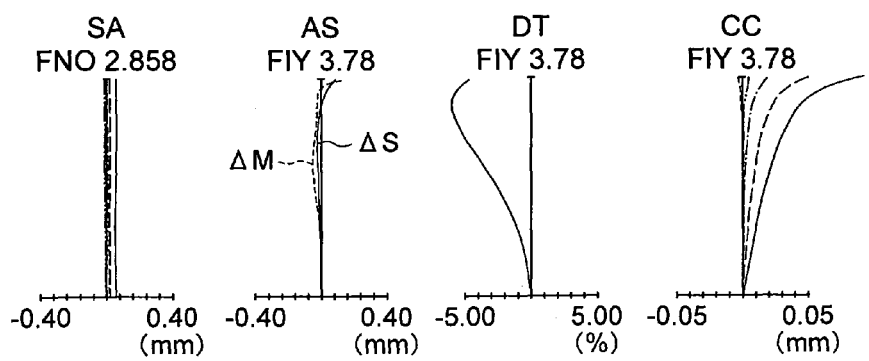
FIG. 8A is a diagram showing spherical aberration, astigmatism, distortion, and chromatic aberration of magnification of the zoom lens according to embodiment 4 in the state in which the zoom lens is focused on an object point at infinity at the wide angle end.
Figure 8B:
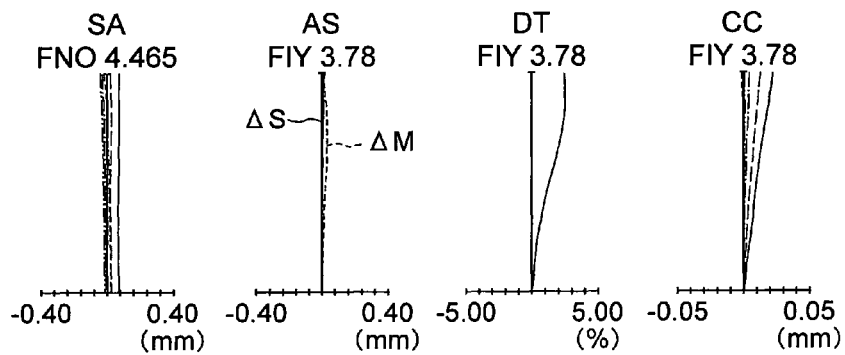
FIG. 8B is a diagram showing spherical aberration, astigmatism, distortion, and chromatic aberration of magnification of the zoom lens according to embodiment 4 in the state in which the zoom lens is focused on an object point at infinity at the intermediate position.
Figure 8C:
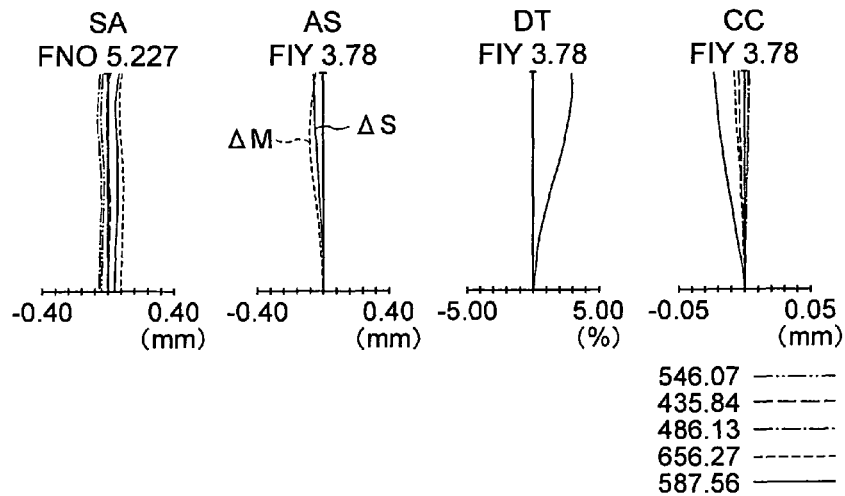
FIG. 8C is a diagram showing spherical aberration, astigmatism, distortion, and chromatic aberration of magnification of the zoom lens according to embodiment 4 in the state in which the zoom lens is focused on an object point at infinity at the telephoto end.

FIGS. 8A, 8B and 8C are diagrams showing spherical aberration, astigmatism, distortion, and chromatic aberration of magnification of the zoom lens according to embodiment 4 in the state in which the zoom lens is focused on an object point at infinity, where FIG. 8A shows those at the wide angle end, FIG. 8B shows those in the intermediate focal length state, and FIG. 8C shows those at the telephoto end.

As shown in FIGS. 7A, 7B, and 7C, the zoom lens according to embodiment 4 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.718.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side and thereafter toward the object side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 9A:
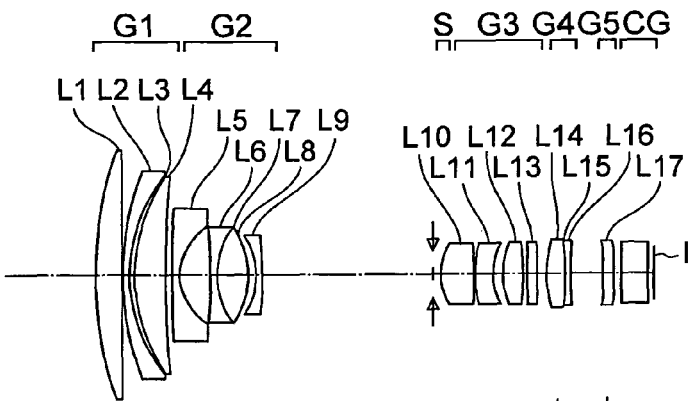
FIG. 9A is a cross sectional view along the optical axis, showing the optical configuration of a zoom lens according to embodiment 5 in the state in which the zoom lens is focused on an object point at infinity at the wide angle end.
Figure 9B:
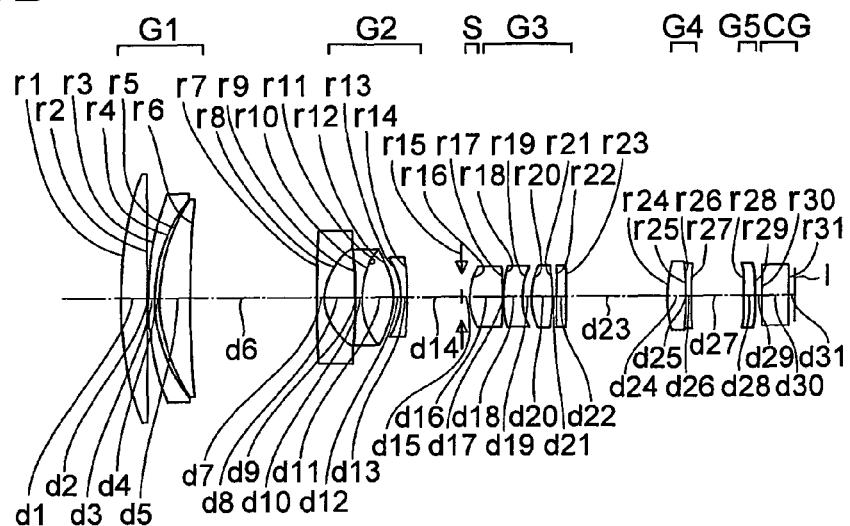
FIG. 9B is a cross sectional view along the optical axis, showing the optical configuration of the zoom lens according to embodiment 5 in the state in which the zoom lens is focused on an object point at infinity at an intermediate position.
Figure 9C:
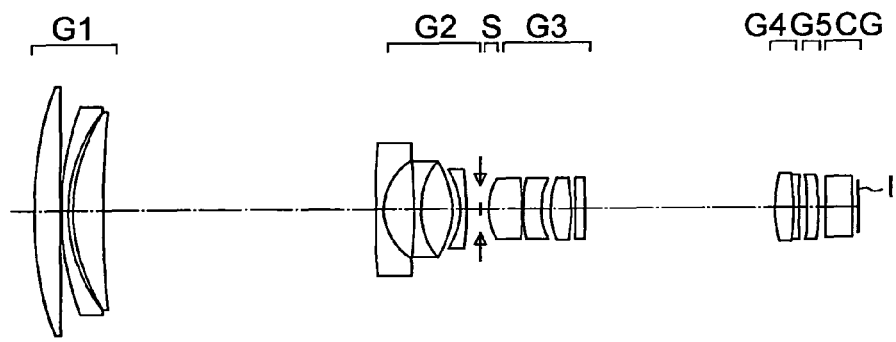
FIG. 9C is a cross sectional view along the optical axis, showing the optical configuration of the zoom lens according to embodiment 5 in the state in which the zoom lens is focused on an object point at infinity at the telephoto end.

Next, a zoom lens according to embodiment 5 of the present invention will be described. FIGS. 9A, 9B and 9C are cross sectional views along the optical axis, showing the optical configuration of the zoom lens according to embodiment 5 in the state in which the zoom lens is focused on an object point at infinity, where FIG. 9A is a cross sectional view at the wide angle end, FIG. 9B is a cross sectional view in an intermediate focal length state, and FIG. 9C is a cross sectional view at the telephoto end.

Figure 10A:
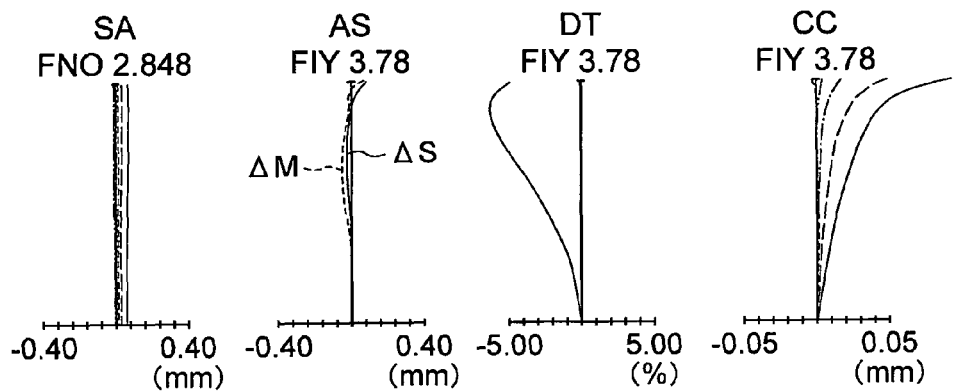
FIG. 10A is a diagram showing spherical aberration, astigmatism, distortion, and chromatic aberration of magnification of the zoom lens according to embodiment 5 in the state in which the zoom lens is focused on an object point at infinity at the wide angle end.
Figure 10B:
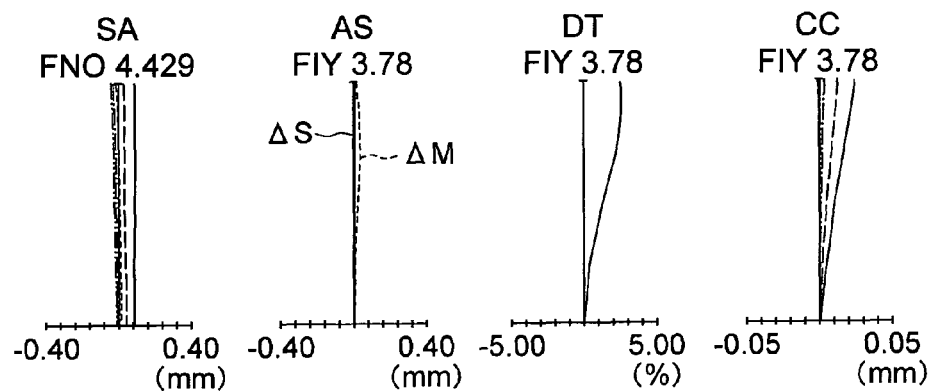
FIG. 10B is a diagram showing spherical aberration, astigmatism, distortion, and chromatic aberration of magnification of the zoom lens according to embodiment 5 in the state in which the zoom lens is focused on an object point at infinity at the intermediate position.
Figure 10C:
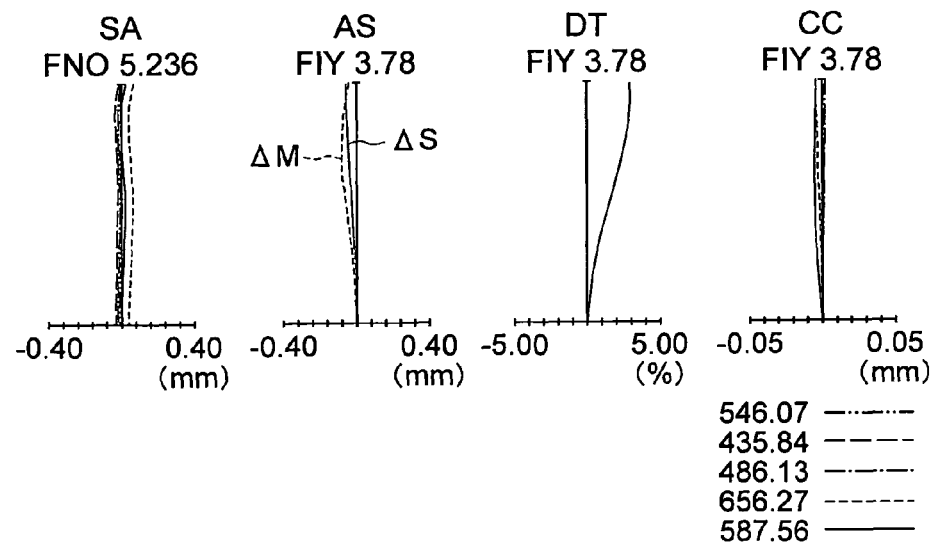
FIG. 10C is a diagram showing spherical aberration, astigmatism, distortion, and chromatic aberration of magnification of the zoom lens according to embodiment 5 in the state in which the zoom lens is focused on an object point at infinity at the telephoto end.

FIGS. 10A, 10B and 10C are diagrams showing spherical aberration, astigmatism, distortion, and chromatic aberration of magnification of the zoom lens according to embodiment 5 in the state in which the zoom lens is focused on an object point at infinity, where FIG. 10A shows those at the wide angle end, FIG. 10B shows those in the intermediate focal length state, and FIG. 10C shows those at the telephoto end.

As shown in FIGS. 9A, 9B, and 9C, the zoom lens according to embodiment 5 includes, in order from the object side thereof, a first lens group G1, a second lens group G2, an aperture stop S, a third lens group G3, a fourth lens group G4, and a fifth lens group G5.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.718.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side and thereafter toward the object side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 11A:
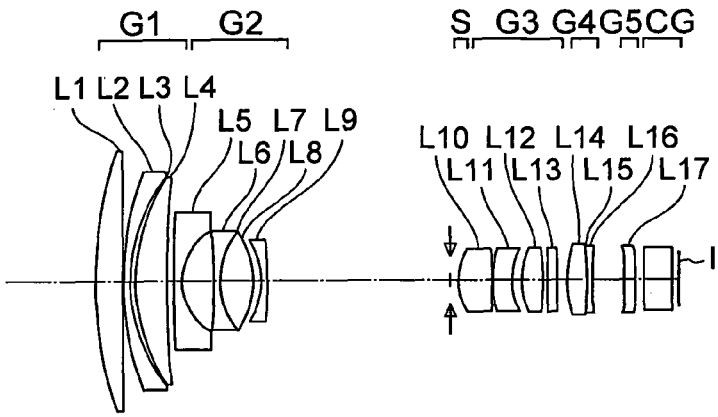
FIG. 11A is a cross sectional view along the optical axis, showing the optical configuration of a zoom lens according to embodiment 6 in the state in which the zoom lens is focused on an object point at infinity at the wide angle end.
Figure 11B:
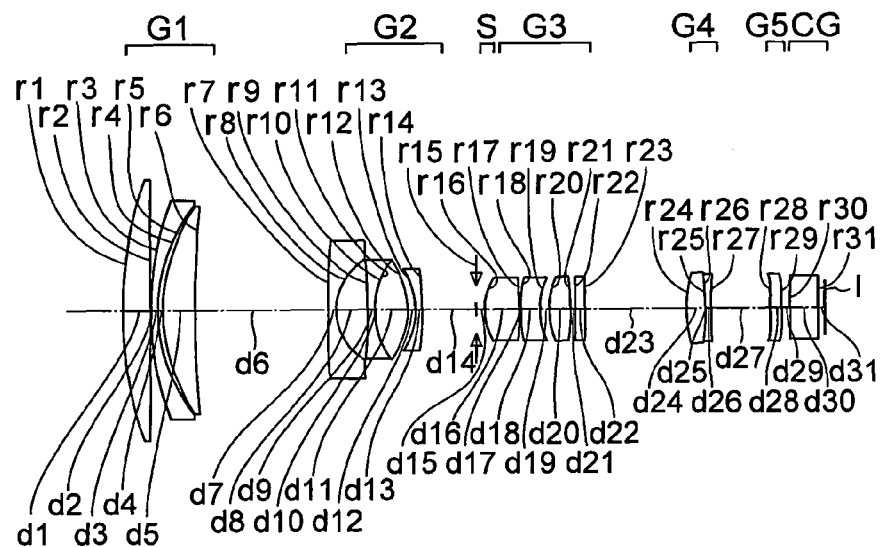
FIG. 11B is a cross sectional view along the optical axis, showing the optical configuration of the zoom lens according to embodiment 6 in the state in which the zoom lens is focused on an object point at infinity at an intermediate position.
Figure 11C:
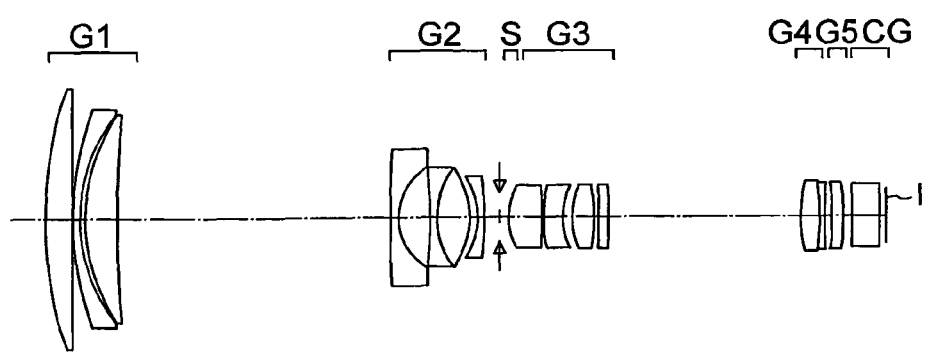
FIG. 11C is a cross sectional view along the optical axis, showing the optical configuration of the zoom lens according to embodiment 6 in the state in which the zoom lens is focused on an object point at infinity at the telephoto end.

Next, a zoom lens according to embodiment 6 of the present invention will be described. FIGS. 11A, 11B and 11C are cross sectional views along the optical axis, showing the optical configuration of the zoom lens according to embodiment 6 in the state in which the zoom lens is focused on an object point at infinity, where FIG. 11A is a cross sectional view at the wide angle end, FIG. 11B is a cross sectional view in an intermediate focal length state, and FIG. 11C is a cross sectional view at the telephoto end.

Figure 12A:
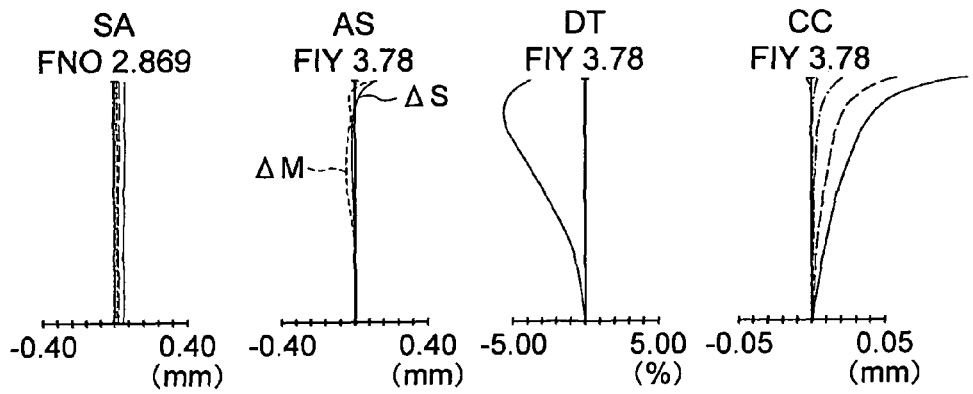
FIG. 12A is a diagram showing spherical aberration, astigmatism, distortion, and chromatic aberration of magnification of the zoom lens according to embodiment 6 in the state in which the zoom lens is focused on an object point at infinity at the wide angle end.
Figure 12B:
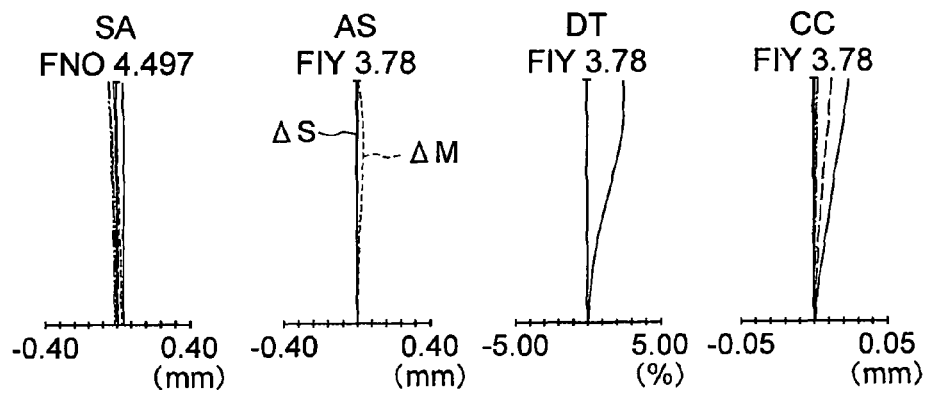
FIG. 12B is a diagram showing spherical aberration, astigmatism, distortion, and chromatic aberration of magnification of the zoom lens according to embodiment 6 in the state in which the zoom lens is focused on an object point at infinity at the intermediate position.
Figure 12C:
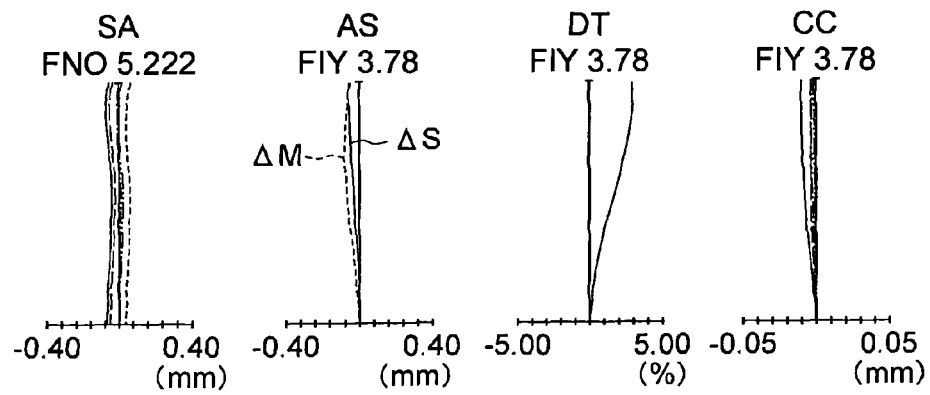
FIG. 12C is a diagram showing spherical aberration, astigmatism, distortion, and chromatic aberration of magnification of the zoom lens according to embodiment 6 in the state in which the zoom lens is focused on an object point at infinity at the telephoto end.

FIGS. 12A, 12B and 12C are diagrams showing spherical aberration, astigmatism, distortion, and chromatic aberration of magnification of the zoom lens according to embodiment 6 in the state in which the zoom lens is focused on an object point at infinity, where FIG. 12A shows those at the wide angle end, FIG. 12B shows those in the intermediate focal length state, and FIG. 12C shows those at the telephoto end.

As shown in FIGS. 11A, 11B, and 11C, the zoom lens according to embodiment 6 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.738.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 13A:
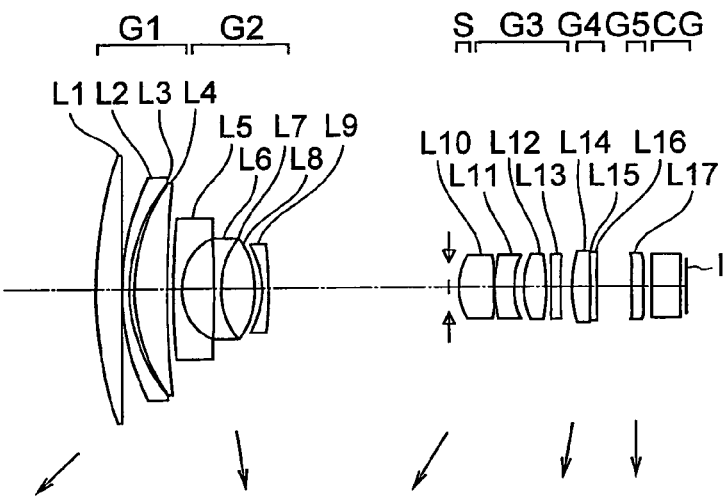
FIG. 13A is a cross sectional view along the optical axis, showing the optical configuration of a zoom lens according to embodiment 7 in the state in which the zoom lens is focused on an object point at infinity at the wide angle end.
Figure 13B:
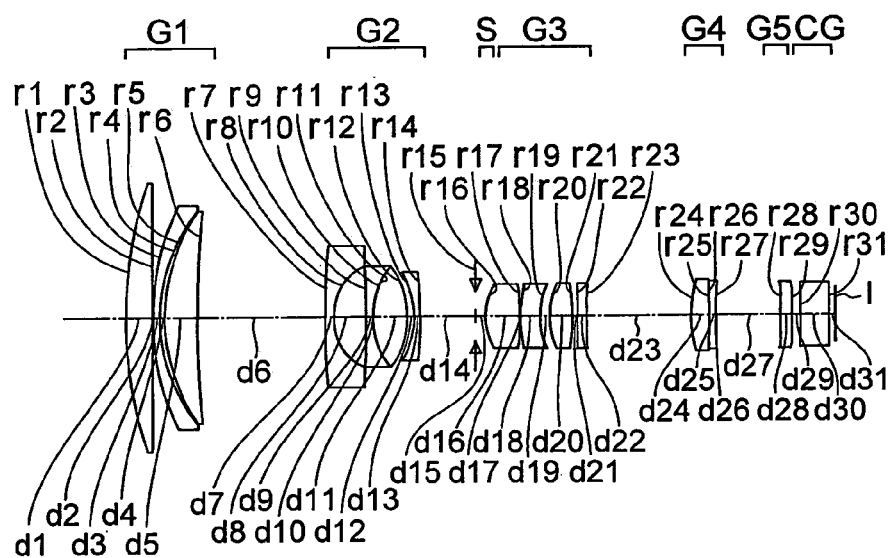
FIG. 13B is a cross sectional view along the optical axis, showing the optical configuration of the zoom lens according to embodiment 7 in the state in which the zoom lens is focused on an object point at infinity at an intermediate position.
Figure 13C:
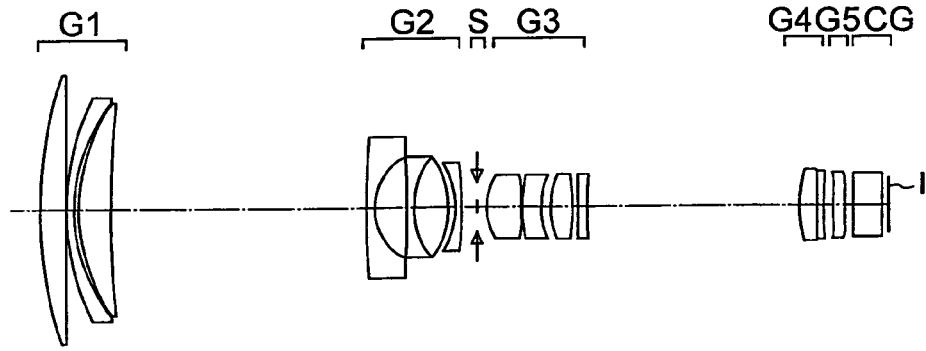
FIG. 13C is a cross sectional view along the optical axis, showing the optical configuration of the zoom lens according to embodiment 7 in the state in which the zoom lens is focused on an object point at infinity at the telephoto end.

Next, a zoom lens according to embodiment 7 of the present invention will be described. FIGS. 13A, 13B and 13C are cross sectional views along the optical axis, showing the optical configuration of the zoom lens according to embodiment 7 in the state in which the zoom lens is focused on an object point at infinity, where FIG. 13A is a cross sectional view at the wide angle end, FIG. 13B is a cross sectional view in an intermediate focal length state, and FIG. 13C is a cross sectional view at the telephoto end.

Figure 14A:
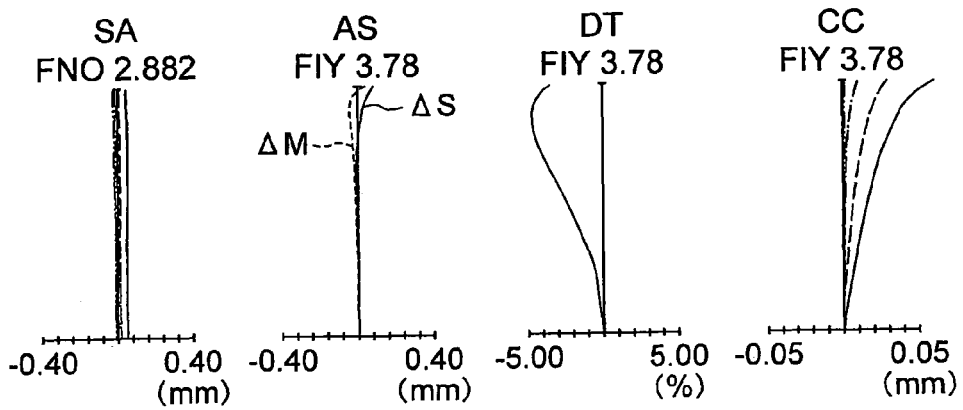
FIG. 14A is a diagram showing spherical aberration, astigmatism, distortion, and chromatic aberration of magnification of the zoom lens according to embodiment 7 in the state in which the zoom lens is focused on an object point at infinity at the wide angle end.
Figure 14B:
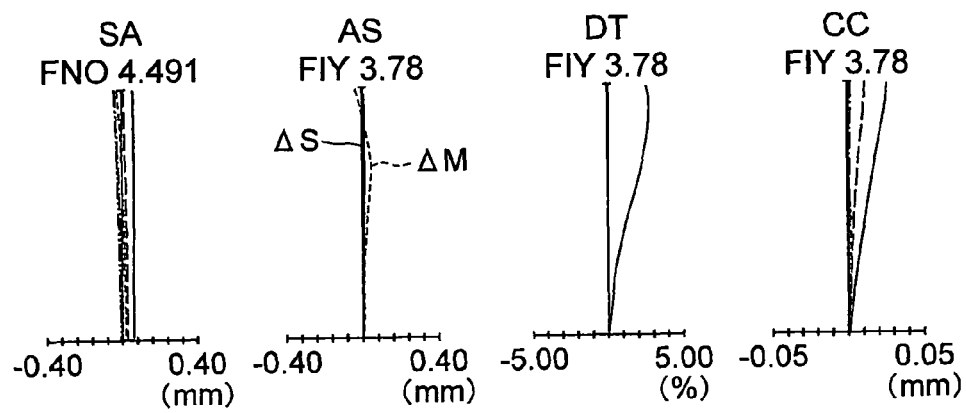
FIG. 14B is a diagram showing spherical aberration, astigmatism, distortion, and chromatic aberration of magnification of the zoom lens according to embodiment 7 in the state in which the zoom lens is focused on an object point at infinity at the intermediate position.
Figure 14C:
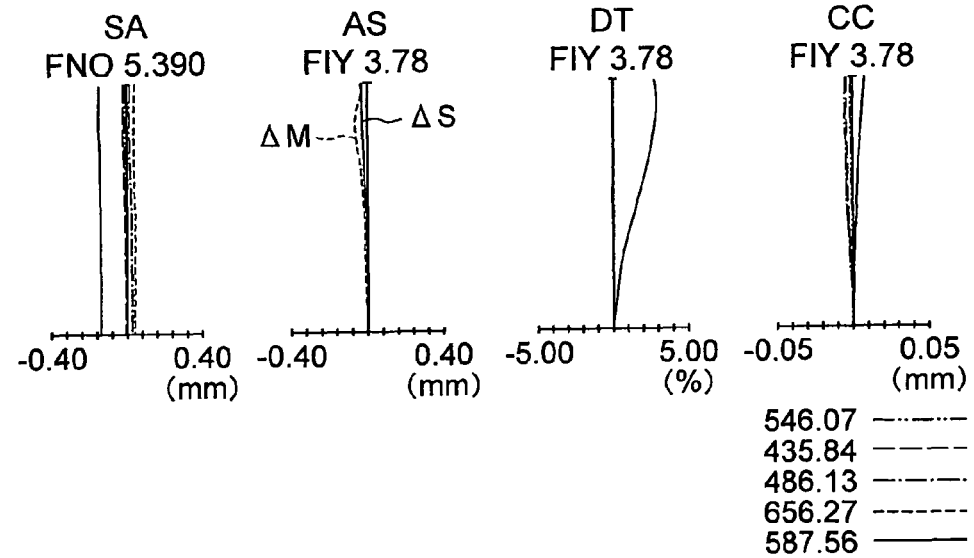
FIG. 14C is a diagram showing spherical aberration, astigmatism, distortion, and chromatic aberration of magnification of the zoom lens according to embodiment 7 in the state in which the zoom lens is focused on an object point at infinity at the telephoto end.

FIGS. 14A, 14B and 14C are diagrams showing spherical aberration, astigmatism, distortion, and chromatic aberration of magnification of the zoom lens according to embodiment 7 in the state in which the zoom lens is focused on an object point at infinity, where FIG. 14A shows those at the wide angle end, FIG. 14B shows those in the intermediate focal length state, and FIG. 14C shows those at the telephoto end.

As shown in FIGS. 13A, 13B, and 13C, the zoom lens according to embodiment 7 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.761.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side and thereafter toward the object side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 15A:
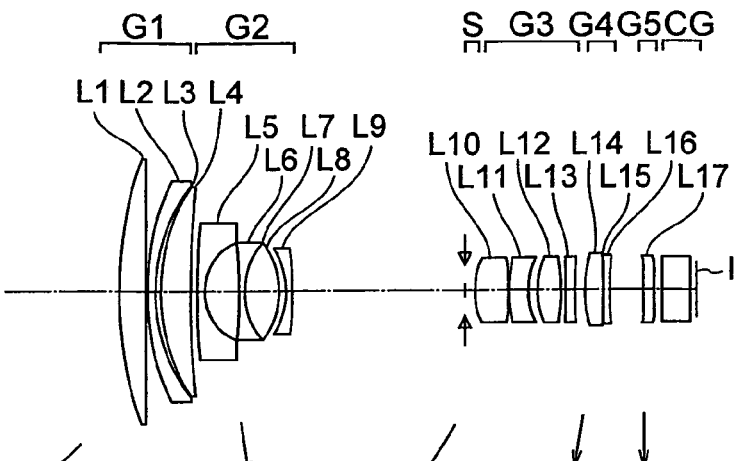
FIG. 15A is a cross sectional view along the optical axis, showing the optical configuration of a zoom lens according to embodiment 8 in the state in which the zoom lens is focused on an object point at infinity at the wide angle end.
Figure 15B:
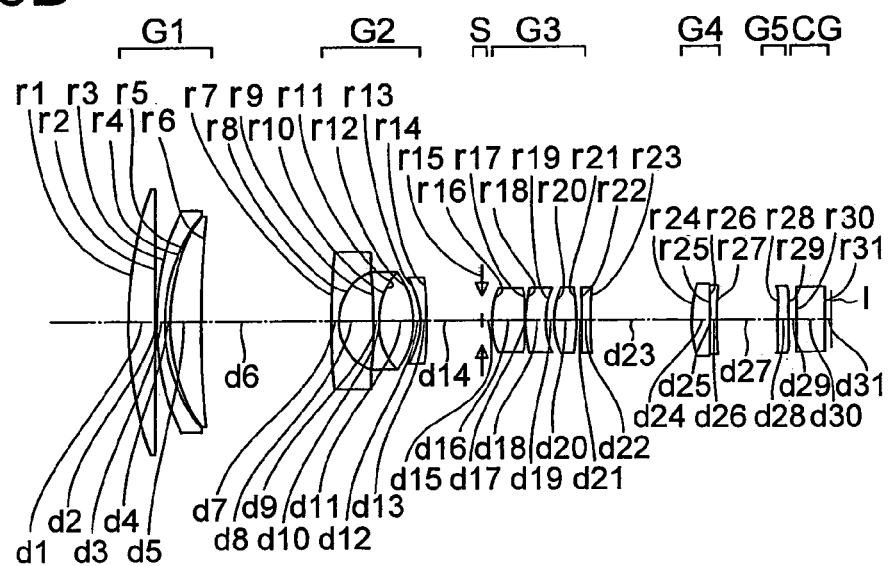
FIG. 15B is a cross sectional view along the optical axis, showing the optical configuration of the zoom lens according to embodiment 8 in the state in which the zoom lens is focused on an object point at infinity at an intermediate position.
Figure 15C:
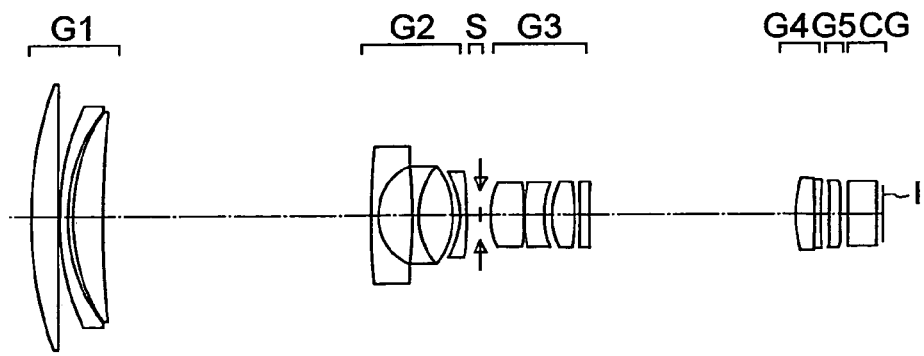
FIG. 15C is a cross sectional view along the optical axis, showing the optical configuration of the zoom lens according to embodiment 8 in the state in which the zoom lens is focused on an object point at infinity at the telephoto end.

Next, a zoom lens according to embodiment 8 of the present invention will be described. FIGS. 15A, 15B and 15C are cross sectional views along the optical axis, showing the optical configuration of the zoom lens according to embodiment 8 in the state in which the zoom lens is focused on an object point at infinity, where FIG. 15A is a cross sectional view at the wide angle end, FIG. 15B is a cross sectional view in an intermediate focal length state, and FIG. 15C is a cross sectional view at the telephoto end.

Figure 16A:
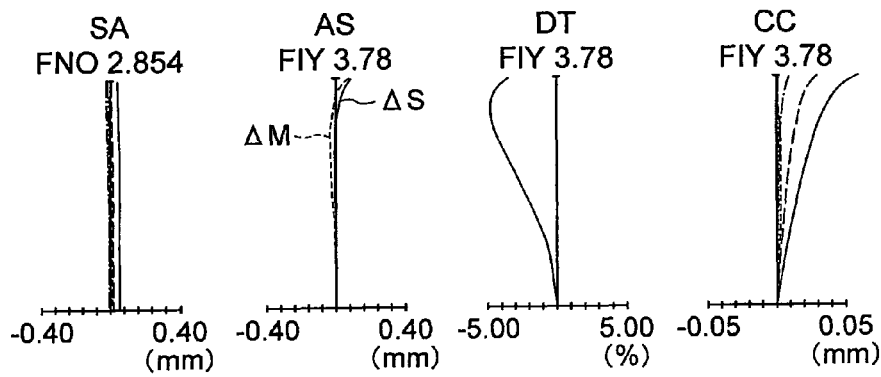
FIG. 16A is a diagram showing spherical aberration, astigmatism, distortion, and chromatic aberration of magnification of the zoom lens according to embodiment 8 in the state in which the zoom lens is focused on an object point at infinity at the wide angle end.
Figure 16B:
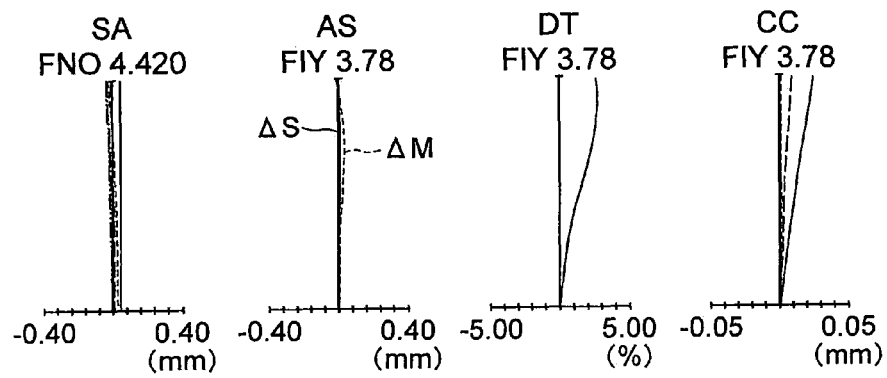
FIG. 16B is a diagram showing spherical aberration, astigmatism, distortion, and chromatic aberration of magnification of the zoom lens according to embodiment 8 in the state in which the zoom lens is focused on an object point at infinity at the intermediate position.
Figure 16C:
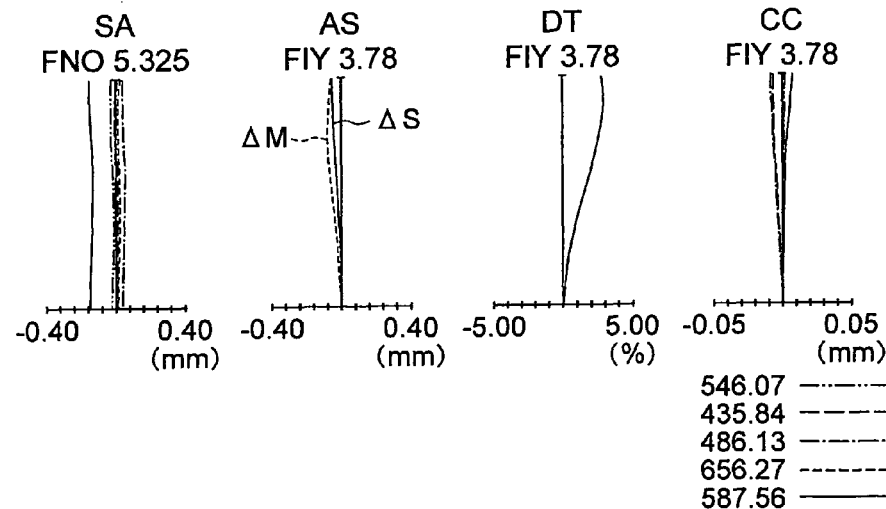
FIG. 16C is a diagram showing spherical aberration, astigmatism, distortion, and chromatic aberration of magnification of the zoom lens according to embodiment 8 in the state in which the zoom lens is focused on an object point at infinity at the telephoto end.

FIGS. 16A, 16B and 16C are diagrams showing spherical aberration, astigmatism, distortion, and chromatic aberration of magnification of the zoom lens according to embodiment 8 in the state in which the zoom lens is focused on an object point at infinity, where FIG. 16A shows those at the wide angle end, FIG. 16B shows those in the intermediate focal length state, and FIG. 16C shows those at the telephoto end.

As shown in FIGS. 15A, 15B, and 15C, the zoom lens according to embodiment 8 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.817.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side and thereafter toward the object side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 17A:
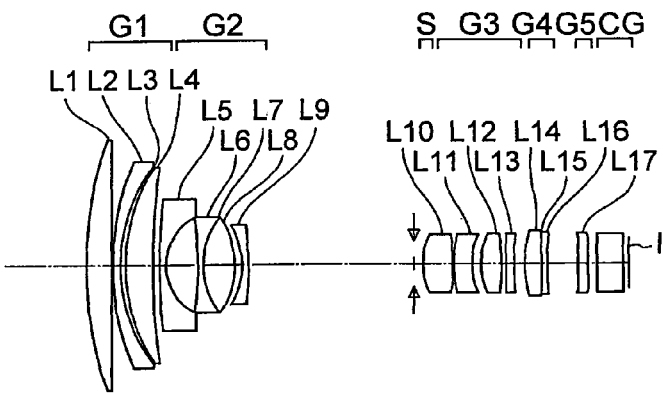
FIG. 17A is a cross sectional view along the optical axis, showing the optical configuration of a zoom lens according to embodiment 9 in the state in which the zoom lens is focused on an object point at infinity at the wide angle end.
Figure 17B:
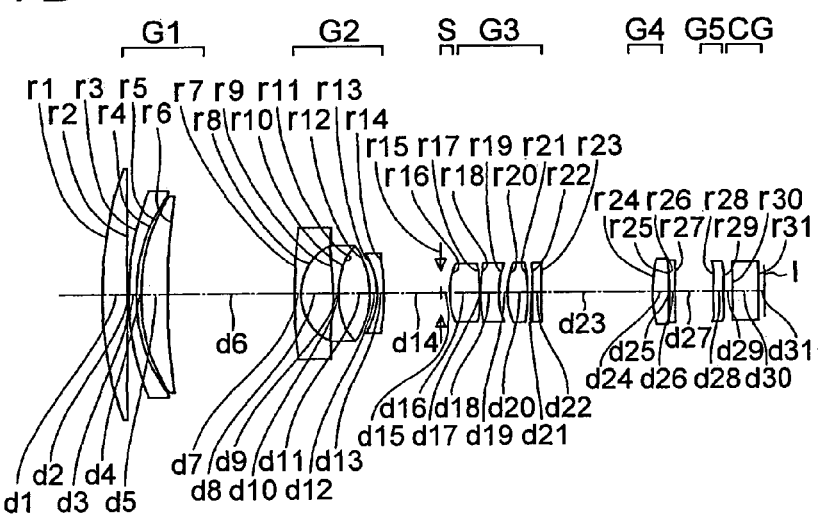
FIG. 17B is a cross sectional view along the optical axis, showing the optical configuration of the zoom lens according to embodiment 9 in the state in which the zoom lens is focused on an object point at infinity at an intermediate position.
Figure 17C:
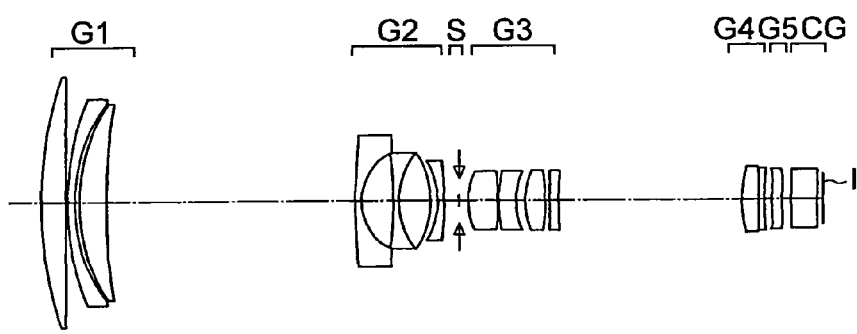
FIG. 17C is a cross sectional view along the optical axis, showing the optical configuration of the zoom lens according to embodiment 9 in the state in which the zoom lens is focused on an object point at infinity at the telephoto end.

Next, a zoom lens according to embodiment 9 of the present invention will be described. FIGS. 17A, 17B and 17C are cross sectional views along the optical axis, showing the optical configuration of the zoom lens according to embodiment 9 in the state in which the zoom lens is focused on an object point at infinity, where FIG. 17A is a cross sectional view at the wide angle end, FIG. 17B is a cross sectional view in an intermediate focal length state, and FIG. 17C is a cross sectional view at the telephoto end.

Figure 18A:
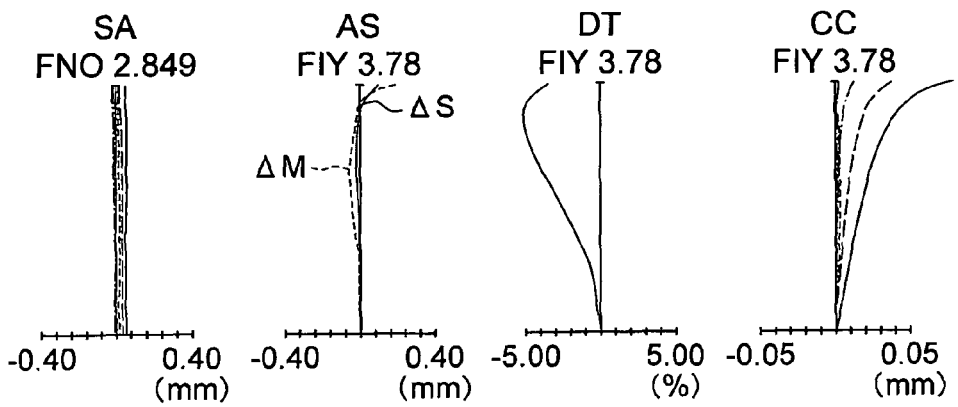
FIG. 18A is a diagram showing spherical aberration, astigmatism, distortion, and chromatic aberration of magnification of the zoom lens according to embodiment 9 in the state in which the zoom lens is focused on an object point at infinity at the wide angle end.
Figure 18B:
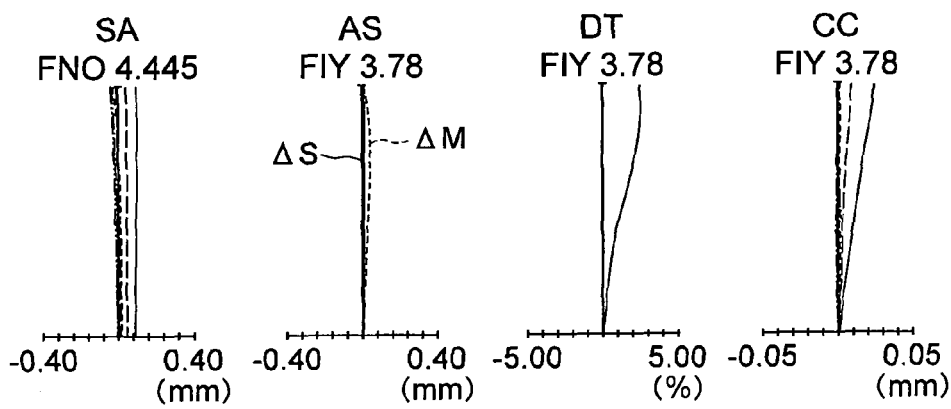
FIG. 18B is a diagram showing spherical aberration, astigmatism, distortion, and chromatic aberration of magnification of the zoom lens according to embodiment 9 in the state in which the zoom lens is focused on an object point at infinity at the intermediate position.
Figure 18C:
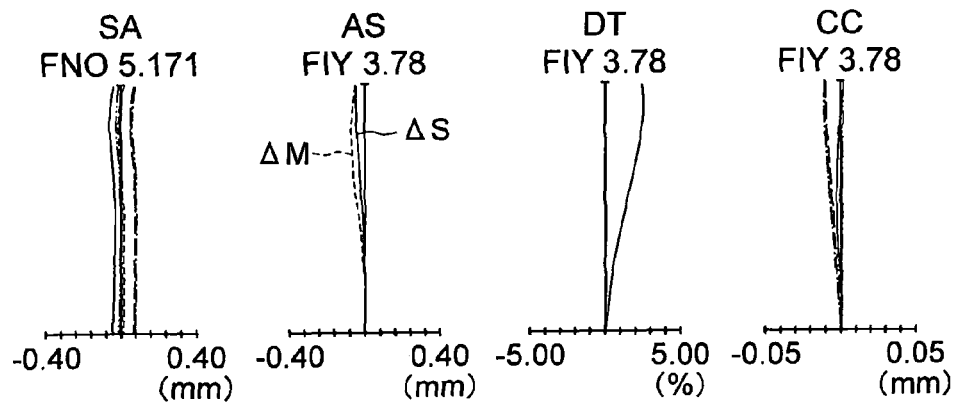
FIG. 18C is a diagram showing spherical aberration, astigmatism, distortion, and chromatic aberration of magnification of the zoom lens according to embodiment 9 in the state in which the zoom lens is focused on an object point at infinity at the telephoto end.

FIGS. 18A, 18B and 18C are diagrams showing spherical aberration, astigmatism, distortion, and chromatic aberration of magnification of the zoom lens according to embodiment 9 in the state in which the zoom lens is focused on an object point at infinity, where FIG. 18A shows those at the wide angle end, FIG. 18B shows those in the intermediate focal length state, and FIG. 18C shows those at the telephoto end.

As shown in FIGS. 17A, 17B, and 17C, the zoom lens according to embodiment 9 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.817.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side, the third lens group G3 moves toward the object side, the aperture stop S moves together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 19A:
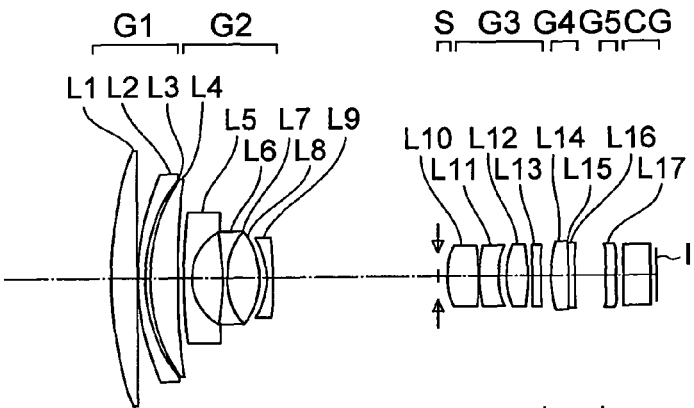
FIG. 19A is a cross sectional view along the optical axis, showing the optical configuration of a zoom lens according to embodiment 10 in the state in which the zoom lens is focused on an object point at infinity at the wide angle end.
Figure 19B:
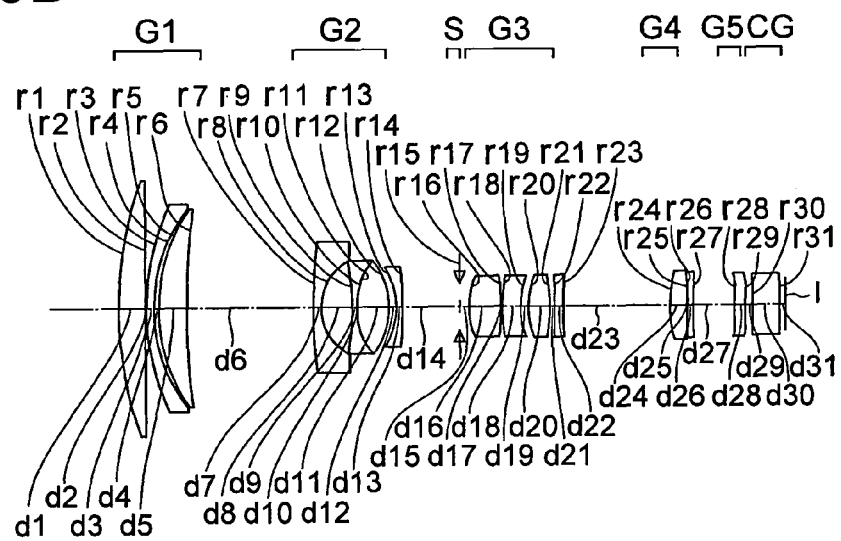
FIG. 19B is a cross sectional view along the optical axis, showing the optical configuration of the zoom lens according to embodiment 10 in the state in which the zoom lens is focused on an object point at infinity at an intermediate position.
Figure 19C:
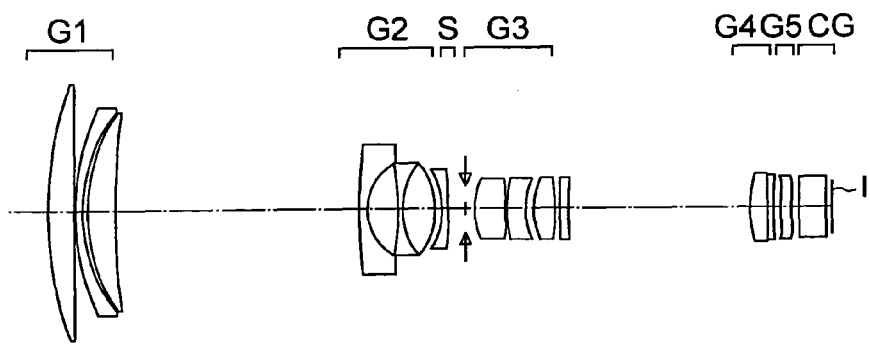
FIG. 19C is a cross sectional view along the optical axis, showing the optical configuration of the zoom lens according to embodiment 10 in the state in which the zoom lens is focused on an object point at infinity at the telephoto end.

Next, a zoom lens according to embodiment 10 of the present invention will be described. FIGS. 19A, 19B and 19C are cross sectional views along the optical axis, showing the optical configuration of the zoom lens according to embodiment 10 in the state in which the zoom lens is focused on an object point at infinity, where FIG. 19A is a cross sectional view at the wide angle end, FIG. 19B is a cross sectional view in an intermediate focal length state, and FIG. 19C is a cross sectional view at the telephoto end.

Figure 20A:
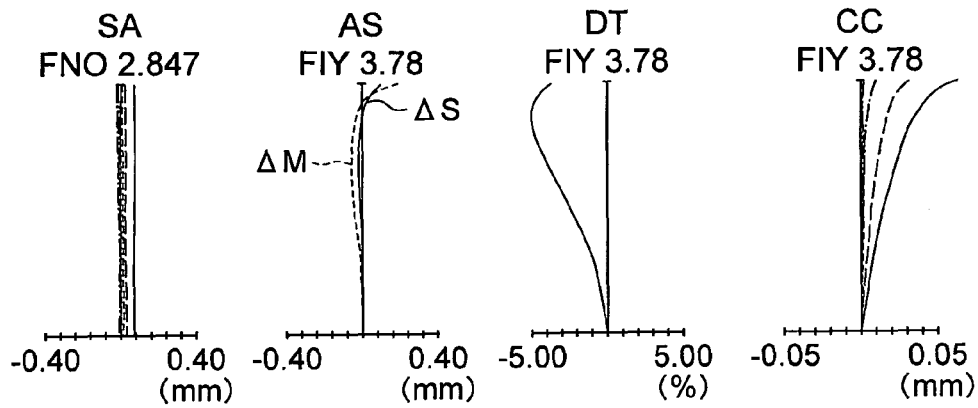
FIG. 20A is a diagram showing spherical aberration, astigmatism, distortion, and chromatic aberration of magnification of the zoom lens according to embodiment 10 in the state in which the zoom lens is focused on an object point at infinity at the wide angle end.
Figure 20B:
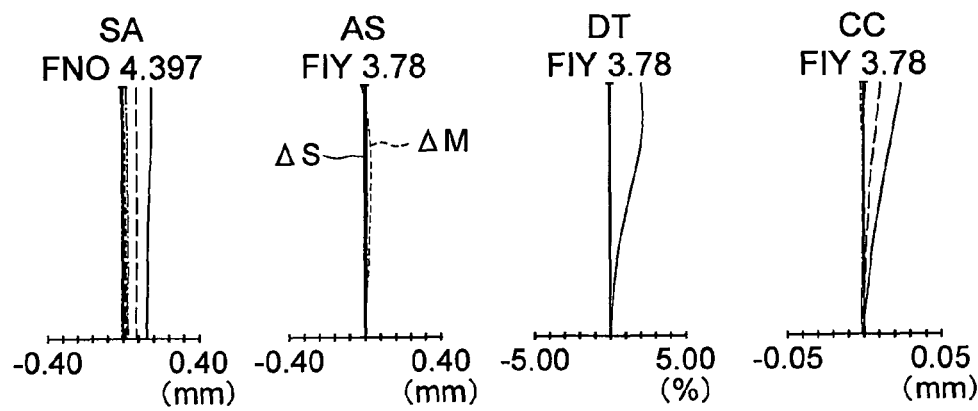
FIG. 20B is a diagram showing spherical aberration, astigmatism, distortion, and chromatic aberration of magnification of the zoom lens according to embodiment 10 in the state in which the zoom lens is focused on an object point at infinity at the intermediate position.
Figure 20C:
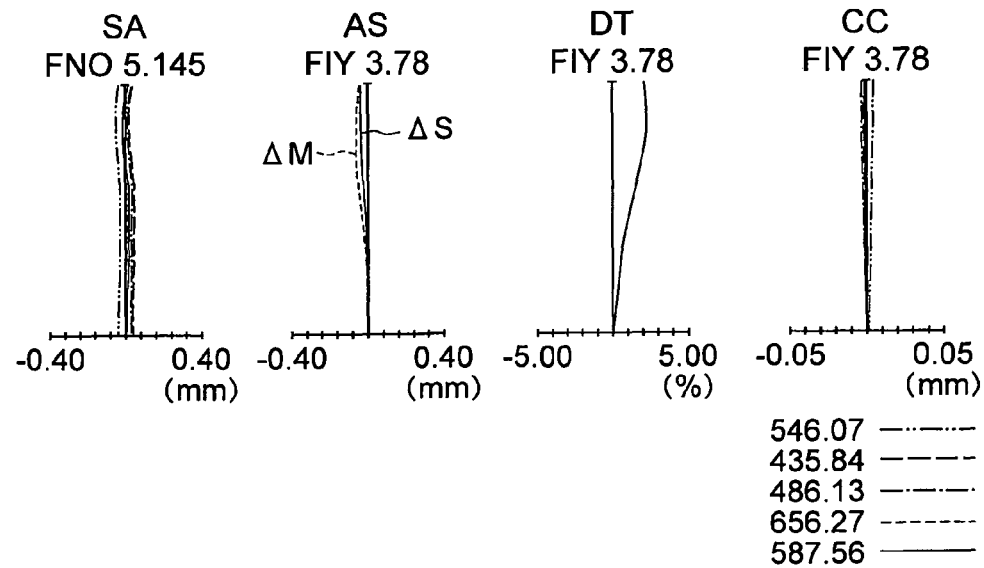
FIG. 20C is a diagram showing spherical aberration, astigmatism, distortion, and chromatic aberration of magnification of the zoom lens according to embodiment 10 in the state in which the zoom lens is focused on an object point at infinity at the telephoto end.

FIGS. 20A, 20B and 20C are diagrams showing spherical aberration, astigmatism, distortion, and chromatic aberration of magnification of the zoom lens according to embodiment 10 in the state in which the zoom lens is focused on an object point at infinity, where FIG. 20A shows those at the wide angle end, FIG. 20B shows those in the intermediate focal length state, and FIG. 20C shows those at the telephoto end.

As shown in FIGS. 19A, 19B, and 19C, the zoom lens according to embodiment 10 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion $\theta gF$ of the refractive optical element A in the cemented lens in the first lens group G1 is 0.817.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 21A:
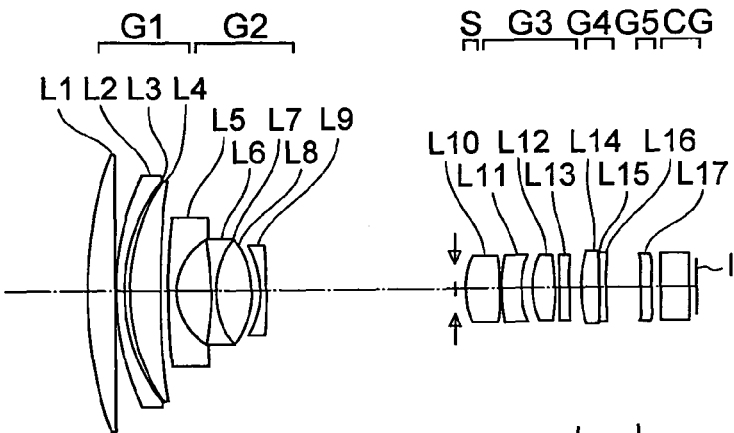
FIG. 21A is a cross sectional view along the optical axis, showing the optical configuration of a zoom lens according to embodiment 11 in the state in which the zoom lens is focused on an object point at infinity at the wide angle end.
Figure 21B:
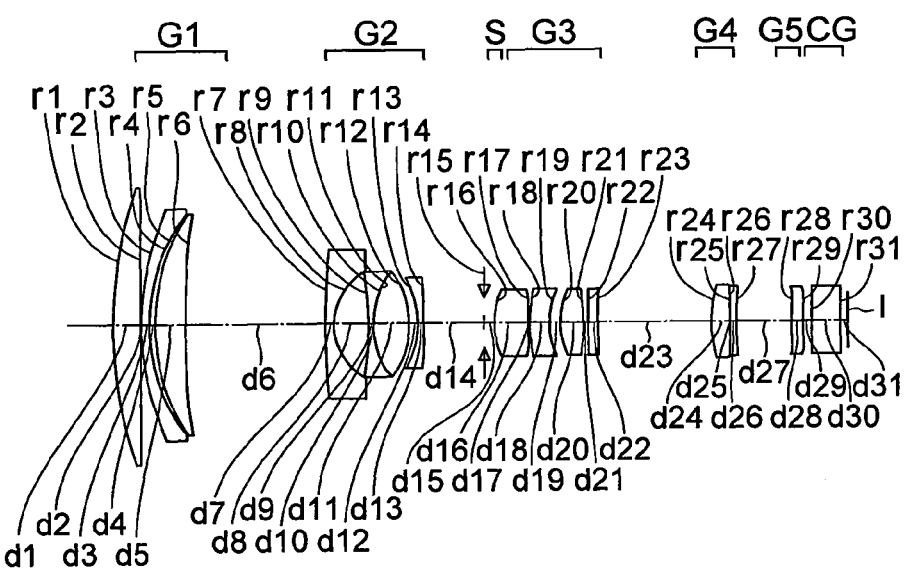
FIG. 21B is a cross sectional view along the optical axis, showing the optical configuration of the zoom lens according to embodiment 11 in the state in which the zoom lens is focused on an object point at infinity at an intermediate position.
Figure 21C:
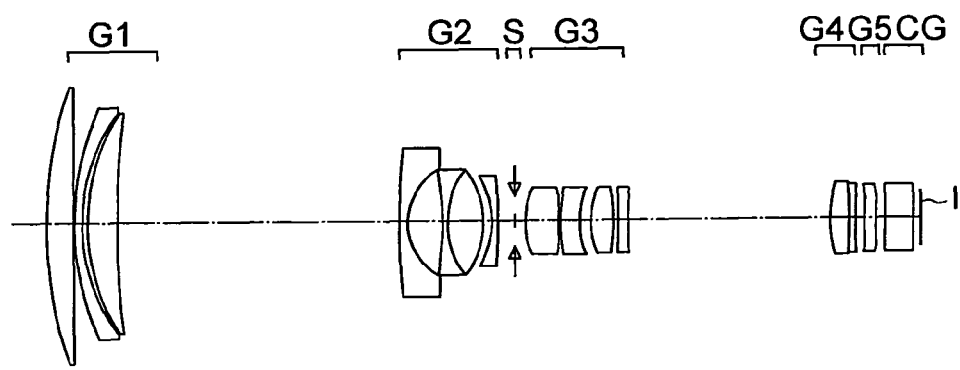
FIG. 21C is a cross sectional view along the optical axis, showing the optical configuration of the zoom lens according to embodiment 11 in the state in which the zoom lens is focused on an object point at infinity at the telephoto end.

Next, a zoom lens according to embodiment 11 of the present invention will be described. FIGS. 21A, 21B and 21C are cross sectional views along the optical axis, showing the optical configuration of the zoom lens according to embodiment 11 in the state in which the zoom lens is focused on an object point at infinity, where FIG. 21A is a cross sectional view at the wide angle end, FIG. 21B is a cross sectional view in an intermediate focal length state, and FIG. 21C is a cross sectional view at the telephoto end.

Figure 22A:
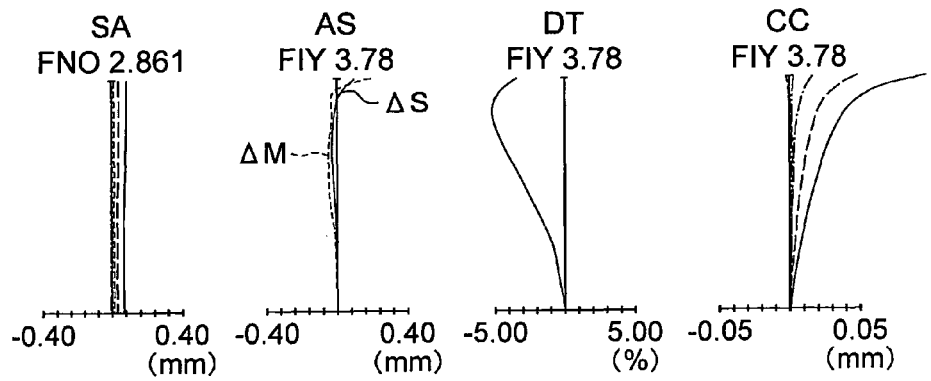
FIG. 22A is a diagram showing spherical aberration, astigmatism, distortion, and chromatic aberration of magnification of the zoom lens according to embodiment 11 in the state in which the zoom lens is focused on an object point at infinity at the wide angle end.
Figure 22B:
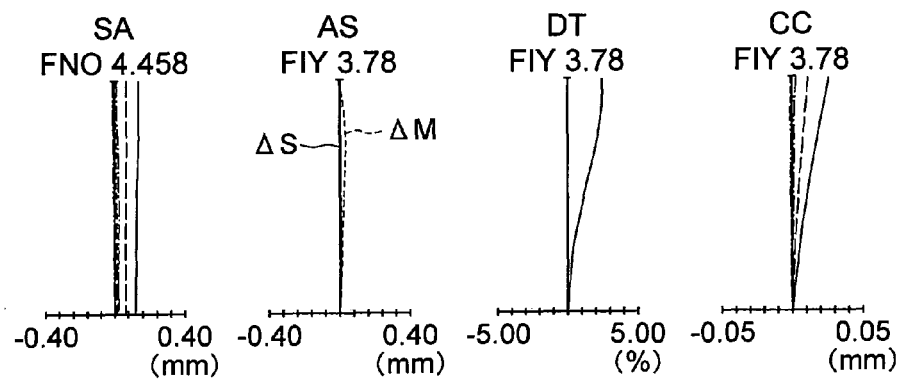
FIG. 22B is a diagram showing spherical aberration, astigmatism, distortion, and chromatic aberration of magnification of the zoom lens according to embodiment 11 in the state in which the zoom lens is focused on an object point at infinity at the intermediate position.
Figure 22C:
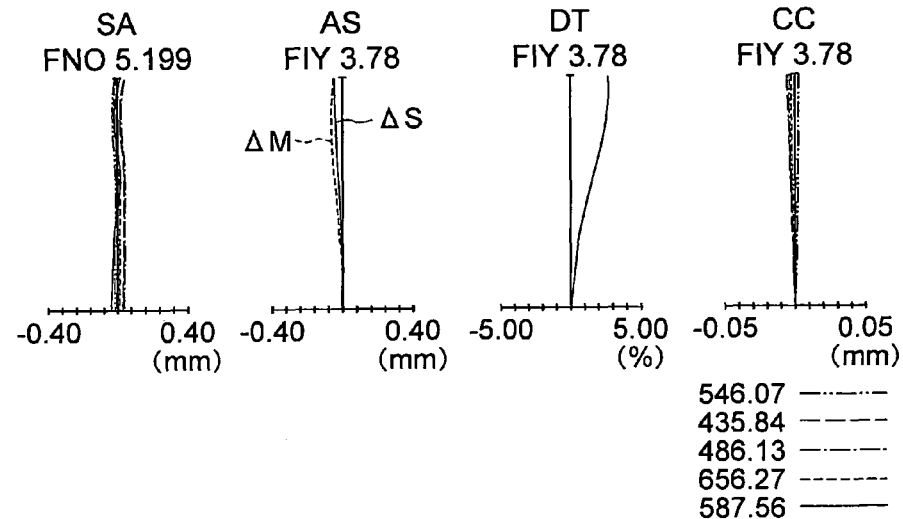
FIG. 22C is a diagram showing spherical aberration, astigmatism, distortion, and chromatic aberration of magnification of the zoom lens according to embodiment 11 in the state in which the zoom lens is focused on an object point at infinity at the telephoto end.

FIGS. 22A, 22B and 22C are diagrams showing spherical aberration, astigmatism, distortion, and chromatic aberration of magnification of the zoom lens according to embodiment 11 in the state in which the zoom lens is focused on an object point at infinity, where FIG. 22A shows those at the wide angle end, FIG. 22B shows those in the intermediate focal length state, and FIG. 22C shows those at the telephoto end.

As shown in FIGS. 21A, 21B, and 21C, the zoom lens according to embodiment 11 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.817.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L16 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Figure 23A:
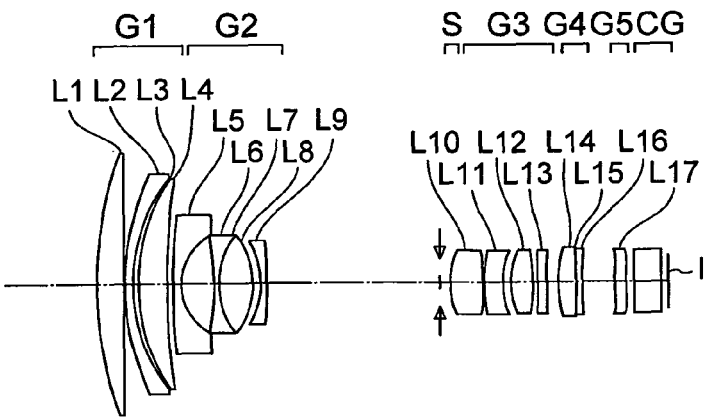
FIG. 23A is a cross sectional view along the optical axis, showing the optical configuration of a zoom lens according to embodiment 12 in the state in which the zoom lens is focused on an object point at infinity at the wide angle end.
Figure 23B:
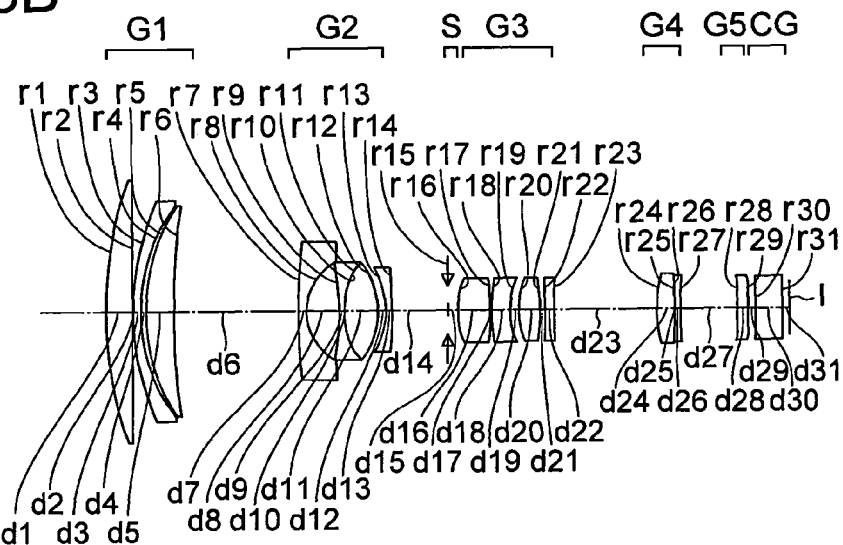
FIG. 23B is a cross sectional view along the optical axis, showing the optical configuration of the zoom lens according to embodiment 12 in the state in which the zoom lens is focused on an object point at infinity at an intermediate position.
Figure 23C:
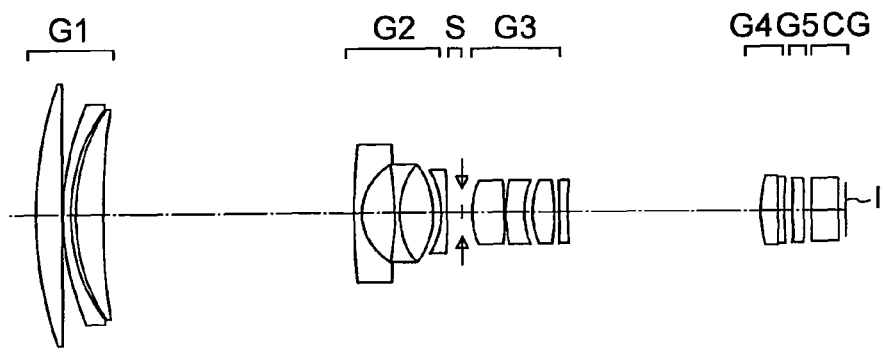
FIG. 23C is a cross sectional view along the optical axis, showing the optical configuration of the zoom lens according to embodiment 12 in the state in which the zoom lens is focused on an object point at infinity at the telephoto end.

Next, a zoom lens according to embodiment 12 of the present invention will be described. FIGS. 23A, 23B and 23C are cross sectional views along the optical axis, showing the optical configuration of the zoom lens according to embodiment 12 in the state in which the zoom lens is focused on an object point at infinity, where FIG. 23A is a cross sectional view at the wide angle end, FIG. 23B is a cross sectional view in an intermediate focal length state, and FIG. 23C is a cross sectional view at the telephoto end.

Figure 24A:
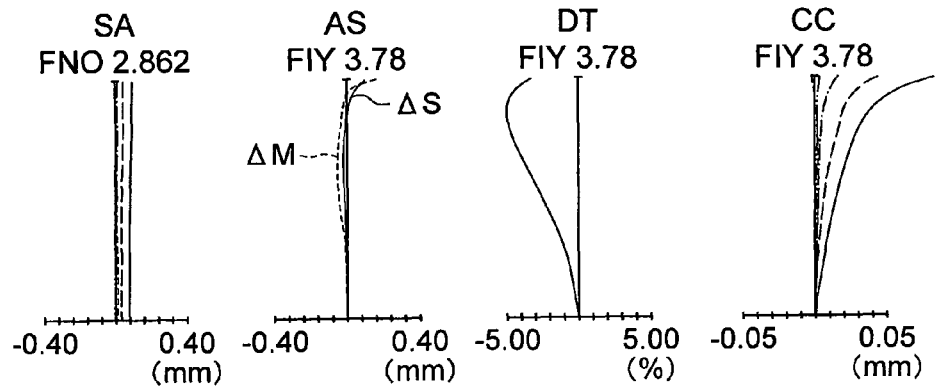
FIG. 24A is a diagram showing spherical aberration, astigmatism, distortion, and chromatic aberration of magnification of the zoom lens according to embodiment 12 in the state in which the zoom lens is focused on an object point at infinity at the wide angle end.
Figure 24B:
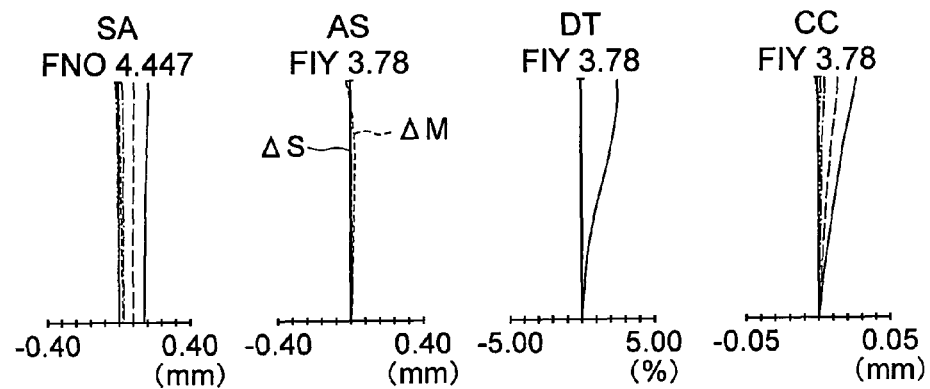
FIG. 24B is a diagram showing spherical aberration, astigmatism, distortion, and chromatic aberration of magnification of the zoom lens according to embodiment 12 in the state in which the zoom lens is focused on an object point at infinity at the intermediate position.
Figure 24C:
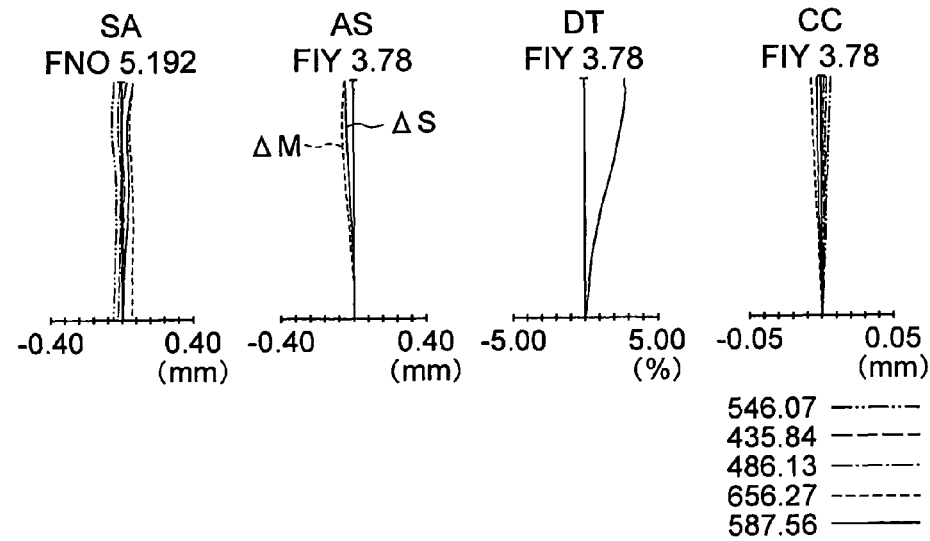
FIG. 24C is a diagram showing spherical aberration, astigmatism, distortion, and chromatic aberration of magnification of the zoom lens according to embodiment 12 in the state in which the zoom lens is focused on an object point at infinity at the telephoto end.

FIGS. 24A, 24B and 24C are diagrams showing spherical aberration, astigmatism, distortion, and chromatic aberration of magnification of the zoom lens according to embodiment 12 in the state in which the zoom lens is focused on an object point at infinity, where FIG. 24A shows those at the wide angle end, FIG. 24B shows those in the intermediate focal length state, and FIG. 24C shows those at the telephoto end.

As shown in FIGS. 23A, 23B, and 23C, the zoom lens according to embodiment 12 includes, in order from the object side thereof, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed, in order from the object side, of a positive meniscus lens L1 having a convex surface directed toward the object side, and a cemented lens made up of a negative meniscus lens L2 having a convex surface directed toward the object side, a positive meniscus lens L3 having a convex surface directed toward the object side and a positive meniscus lens L4 having a convex surface directed toward the object side. The first lens group G1, as a whole, has a positive refracting power. The relative partial dispersion θgF of the refractive optical element A in the cemented lens in the first lens group G1 is 0.817.

The second lens group G2 is composed, in order from the object side, of a negative meniscus lens L5 having a convex surface directed toward the object side, a cemented lens made up of a biconcave negative lens L6, a cementing layer L7 and a biconvex positive lens L8, and a negative meniscus lens L9 having a convex surface directed toward the image side. The second lens group G2, as a whole, has a negative refracting power.

The third lens group G3 is composed, in order from the object side, of a biconvex positive lens L10, a negative meniscus lens L11 having a convex surface directed toward the object side, a biconvex positive lens L12, and a negative meniscus lens L13 having a convex surface directed toward the object side. The third lens group G3, as a whole, has a positive refracting power.

The fourth lens group G4 is composed of a cemented lens made up of a biconvex positive lens L14, a cementing layer L15 and a biconcave negative lens L16 arranged in order from the object side. The fourth lens group G4, as a whole, has a positive refracting power.

The fifth lens group G5 is composed of a biconvex positive lens L17. The fifth lens group G5, as a whole, has a positive refracting power.

During zooming from the wide angle end to the telephoto end, the first lens group G1 moves toward the object side, the second group G2 moves toward the image side, the third lens group G3 moves toward the object side, the aperture stop S moves toward the object side together with the third lens group G3, the fourth lens group G4 moves toward the object side and thereafter toward the image side, and the fifth lens group G5 is fixed.

The following sixth surfaces are aspheric surfaces: the image side surface of the image side negative meniscus lens L9 in the second lens group G2, the object side surface of the object side biconvex positive lens L10 and both surfaces of the image side negative meniscus lens L13 in the third lens group G3, and both surfaces of the biconvex positive lens L17 in the fifth lens group G5.

Next, numerical data of each embodiment described above is shown below. In the numerical data of each embodiment, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens, $F_{NO}$ denotes an F number, f denotes a focal length of the entire zoom lens system, D0 denotes a distance from object to first surface. Also, * denotes an aspherical surface, STOP denotes an aperture, ER denotes an effective radius.

When z is let to be in an optical axis direction, y is let to be in a direction orthogonal to the optical axis, K denotes a conical coefficient, A4, A6, A8, and A10 denote aspherical surface coefficients, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}+A_{12}y^{12} \quad (I)$$

where E indicates '$10^{-n}$'. These reference signs are common in numeral data of after-mentioned each embodiment.

Example 1 unit mm

Surface data

| Surface no. | r | d | nd | vd | effective radius |
|---|---|---|---|---|---|
| Object plane | ∞ | ∞ | | | |
| 1 | 60.982 | 5.35 | 1.64850 | 53.02 | 24.00 |
| 2 | 495.744 | 0.19 | | | 23.38 |
| 3 | 31.172 | 1.28 | 1.92286 | 18.90 | 17.70 |
| 4 | 22.227 | 1.77 | 1.63387 | 23.38 | 16.35 |
| 5 | 26.877 | 5.23 | 1.49700 | 81.54 | 16.31 |
| 6 | 101.913 | Variable | | | 16.00 |
| 7 | 303.814 | 1.10 | 1.88300 | 40.76 | 9.68 |
| 8 | 8.312 | 4.79 | | | 6.82 |
| 9 | −46.254 | 0.80 | 1.88300 | 40.76 | 6.71 |
| 10 | 12.396 | 0.01 | 1.51400 | 42.83 | 6.69 |
| 11 | 12.396 | 4.87 | 1.78472 | 25.68 | 6.69 |
| 12 | −12.684 | 1.15 | | | 6.72 |
| 13 | −11.499 | 0.80 | 1.77250 | 49.60 | 5.72 |
| 14* | −230.432 | Variable | | | 5.72 |
| 15 (stop) | ∞ | 1.30 | | | 3.39 |
| 16* | 10.743 | 4.93 | 1.58913 | 61.14 | 3.96 |
| 17 | −78.051 | 0.10 | | | 4.06 |
| 18 | 28.041 | 2.77 | 1.84666 | 23.78 | 4.07 |
| 19 | 10.295 | 1.42 | | | 3.87 |
| 20 | 12.826 | 3.12 | 1.49700 | 81.54 | 4.21 |
| 21 | −36.985 | 0.64 | | | 4.29 |
| 22* | 39.207 | 1.36 | 1.53071 | 55.69 | 4.29 |
| 23* | 33.196 | Variable | | | 4.28 |
| 24 | 19.130 | 2.68 | 1.49700 | 81.54 | 4.60 |
| 25 | −119.090 | 0.01 | 1.51400 | 42.83 | 4.47 |
| 26 | −119.090 | 0.82 | 1.80400 | 46.57 | 4.47 |
| 27 | 76.031 | Variable | | | 4.41 |
| 28* | 147.374 | 1.63 | 1.53071 | 55.69 | 4.17 |
| 29* | −67.939 | 1.09 | | | 4.09 |
| 30 | ∞ | 4.00 | 1.51680 | 64.20 | 4.02 |
| 31 | ∞ | 1.05 | | | 3.85 |
| Image plane | ∞ | | | | |

Aspherical surface data

14th surface

K = 0.000, A2 = 0.0000E+00, A4 = −7.99095e−05, A6 = −9.37486e−07, A8 = 4.32991e−08, A10 = −1.00218e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 8.15873e−04, A6 = 4.82675e−06, A8 = −2.20386e−06, A10 = 4.10510e−08

29th surface

K = 0.000, A2 = 0.0000E+00, A4 = 1.26016e−03, A6 = 1.60282e−05, A8 = −3.90922e−06, A10 = 7.56282e−08 unit mm

Various data
Zoom ratio 17.36

| | Wide angle | Intermediate | Telephoto |
|---|---|---|---|
| Focal length | 4.86 | 20.12 | 84.44 |
| Fno. | 2.83 | 4.26 | 5.3e1 |
| Angle of field 2ω | 75.01 | 19.69 | 4.72 |
| Image height | 3.6 | 3.6 | 3.6 |
| Lens total length | 84.06 | 98.77 | 118.56 |
| BF | 4.78 | 4.67 | 4.67 |
| d6 | 1.00 | 16.79 | 33.06 |
| d14 | 24.28 | 7.94 | 2.30 |
| d23 | 1.62 | 13.90 | 29.38 |
| d27 | 4.26 | 7.36 | 1.04 |
| Entrance pupil position | 24.63 | 73.25 | 271.77 |
| Exit pupil position A | −31.43 | −104.20 | 3257.46 |
| Exit pupil position B | −36.21 | −108.87 | 3252.79 |
| Front side principal point position | 28.84 | 89.66 | 358.40 |
| Back side principal point position | −3.81 | −19.17 | −83.49 |

Single lens data

| Lens | Initial surface | Focal length |
|---|---|---|
| L1 | 1 | 106.71 |
| L2 | 3 | −90.15 |
| L3 | 4 | 176.57 |
| L4 | 5 | 71.79 |
| L5 | 7 | −9.69 |
| L6 | 9 | −11.00 |
| L7 | 10 | 8.81E+04 |
| L8 | 11 | 8.73 |
| L9 | 13 | −15.69 |
| L10 | 16 | 16.37 |
| L11 | 18 | −20.69 |
| L12 | 20 | 19.57 |
| L13 | 22 | −442.74 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 58.8815 | 13.8227 | −1.3148 | −9.6007 |
| G2 | 7 | −6.7026 | 13.5160 | 1.8901 | −6.9662 |
| G3 | 15 | 16.3471 | 15.6380 | 2.4850 | −9.1335 |
| G4 | 24 | 73.7783 | 3.5080 | −2.0985 | −4.2304 |
| G5 | 28 | 87.8520 | 6.7160 | 0.7294 | −4.0624 |

| Group | Initial surbace | Front side principal point | Back side principal point |
|---|---|---|---|
| G1 | 1 | −1.3148 | −9.6007 |
| G2 | 7 | 1.8901 | −6.9662 |
| G3 | 15 | 2.4850 | −9.1335 |
| G4 | 24 | −2.0985 | −4.2304 |
| G5 | 28 | 0.7294 | −4.0624 |

| Group | Initial surbace | wide angle Magnification | Intermediate Magnification | Telephoto Magnification |
|---|---|---|---|---|
| G1 | 1 | 0.0000 | 0.0000 | 0.0000 |
| G2 | 7 | −0.1689 | −0.2804 | −0.8784 |
| G3 | 15 | −0.6482 | −1.6981 | −2.0449 |
| G4 | 24 | 0.8014 | 0.7610 | 0.8466 |
| G5 | 28 | 0.9418 | 0.9430 | 0.9430 |

Example 2 unit mm

Surface data

| Surface no. | r | d | nd | vd | effective radius |
|---|---|---|---|---|---|
| Object plane | ∞ | ∞ | | | |
| 1 | 59.963 | 4.20 | 1.49700 | 81.54 | 18.60 |
| 2 | 2486.142 | 0.10 | | | 17.76 |
| 3 | 41.700 | 0.99 | 1.84666 | 23.78 | 15.50 |
| 4 | 25.367 | 0.72 | 1.63387 | 23.38 | 14.76 |
| 5 | 28.640 | 4.19 | 1.67790 | 55.34 | 14.74 |
| 6 | 111.334 | Variable | | | 14.50 |
| 7 | 110.422 | 1.10 | 1.88300 | 40.76 | 9.11 |
| 8 | 8.083 | 4.79 | | | 6.49 |
| 9 | −46.254 | 0.80 | 1.88300 | 40.76 | 6.24 |
| 10 | 12.396 | 0.01 | 1.51400 | 42.83 | 6.10 |
| 11 | 12.396 | 4.87 | 1.78472 | 25.68 | 6.11 |
| 12 | −12.684 | 1.15 | | | 6.07 |
| 13 | −11.499 | 0.80 | 1.77250 | 49.60 | 5.08 |
| 14* | −125.405 | Variable | | | 5.00 |
| 15 (stop) | ∞ | 1.30 | | | 3.48 |
| 16* | 10.743 | 4.93 | 1.58913 | 61.14 | 4.07 |
| 17 | −78.051 | 0.10 | | | 4.16 |
| 18 | 28.041 | 2.77 | 1.84666 | 23.78 | 4.16 |
| 19 | 10.469 | 1.42 | | | 3.94 |
| 20 | 13.611 | 3.12 | 1.49700 | 81.54 | 4.25 |
| 21 | −36.985 | 0.64 | | | 4.33 |
| 22* | 63.868 | 1.36 | 1.53071 | 55.69 | 4.33 |
| 23* | 48.855 | Variable | | | 4.34 |
| 24 | 19.130 | 2.68 | 1.49700 | 81.54 | 4.65 |
| 25 | −119.090 | 0.01 | 1.51400 | 42.83 | 4.51 |
| 26 | −119.090 | 0.82 | 1.80400 | 46.57 | 4.51 |
| 27 | 76.031 | Variable | | | 4.46 |
| 28* | 147.374 | 1.63 | 1.53071 | 55.69 | 4.21 |
| 29* | −67.939 | 1.09 | | | 4.18 |
| 30 | ∞ | 4.00 | 1.51680 | 64.20 | 4.09 |
| 31 | ∞ | 1.05 | | | 3.86 |
| Image plane | ∞ | | | | |

Aspherical surface data

14th surface

K = 0.000, A2 = 0.0000E+00, A4 = −8.14579e−05, A6 = −1.15665e−06, A8 = 6.76342e−08, A10 = −1.49231e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 6.47771e−04, A6 = −1.69732e−05, A8 = −9.26628e−07, A10 = 1.17663e−08

29th surface

K = 0.000, A2 = 0.0000E+00, A4 = 1.08506e−03, A6 = −2.70703e−05, A8 = −1.53201e−06, A10 = 3.10909e−08

Various data
Zoom ratio 17.81

| | Wide angle | Intermediate | Telephoto |
|---|---|---|---|
| Focal length | 4.69 | 19.67 | 83.55 |
| Fno. | 2.80 | 4.36 | 5.11 |
| Angle of field 2ω | 78.31 | 20.25 | 4.80 |

-continued unit mm

| | | | |
|---|---|---|---|
| Image height | 3.6 | 3.6 | 3.6 |
| Lens total length | 80.70 | 98.74 | 120.58 |
| BF | 4.78 | 4.68 | 4.76 |
| d6 | 1.00 | 18.72 | 39.47 |
| d14 | 24.31 | 7.57 | 2.30 |
| d23 | 1.61 | 16.43 | 28.30 |
| d27 | 4.52 | 6.85 | 1.26 |
| Entrance pupil position | 19.50 | 63.53 | 285.65 |
| Exit pupil position A | −31.80 | −132.93 | −3328.09 |
| Exit pupil position B | −36.58 | −137.61 | −3332.85 |
| Front side principal point position | 23.59 | 80.39 | 367.10 |
| Back side principal point position | −3.64 | −18.72 | −82.51 |

Single lens data

| Lens | Initial surface | Focal length |
|---|---|---|
| L1 | 1 | 123.56 |
| L2 | 3 | −78.69 |
| L3 | 4 | 322.68 |
| L4 | 5 | 55.74 |
| L5 | 7 | −9.93 |
| L6 | 9 | −11.00 |
| L7 | 10 | 8.81E+04 |
| L8 | 11 | 8.73 |
| L9 | 13 | −16.44 |
| L10 | 16 | 16.37 |
| L11 | 18 | −21.27 |
| L12 | 20 | 20.44 |
| L13 | 22 | −404.32 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 63.1420 | 10.1987 | −0.1462 | −6.3764 |
| G2 | 7 | −7.1131 | 13.5160 | 1.8043 | −7.2056 |
| G3 | 15 | 16.6070 | 15.6380 | 2.4030 | −9.2287 |
| G4 | 24 | 73.7783 | 3.5080 | −2.0985 | −4.2304 |
| G5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| G1 | 1 | 0.0000 | 0.0000 | 0.0000 |
| G2 | 7 | −0.1518 | −0.2442 | −0.8487 |
| G3 | 15 | −0.6511 | −1.7625 | −1.9650 |
| G4 | 24 | 0.7980 | 0.7677 | 0.8423 |
| G5 | 28 | 0.9418 | 0.9429 | 0.9420 |

Example 3 unit mm

Surface data

| Surface no. | r | d | nd | vd | effective radius |
|---|---|---|---|---|---|
| Object plane | ∞ | ∞ | | | |
| 1 | 60.578 | 3.83 | 1.49700 | 81.54 | 18.70 |
| 2 | 1959.863 | 0.10 | | | 18.64 |
| 3 | 44.600 | 1.01 | 1.82114 | 24.06 | 15.50 |
| 4 | 24.534 | 0.78 | 1.67000 | 20.00 | 14.71 |
| 5 | 27.767 | 4.49 | 1.69350 | 53.21 | 14.69 |

-continued unit mm

| | | | | | |
|---|---|---|---|---|---|
| 6 | 126.235 | Variable | | | 14.45 |
| 7 | 139.991 | 1.10 | 1.88300 | 40.76 | 9.75 |
| 8 | 8.467 | 4.79 | | | 6.96 |
| 9 | −46.254 | 0.80 | 1.88300 | 40.76 | 6.87 |
| 10 | 12.396 | 0.01 | 1.51400 | 42.83 | 6.85 |
| 11 | 12.396 | 4.87 | 1.78472 | 25.68 | 6.86 |
| 12 | −12.684 | 1.15 | | | 6.88 |
| 13 | −11.499 | 0.80 | 1.77250 | 49.60 | 5.80 |
| 14* | −133.624 | Variable | | | 5.79 |
| 15 (stop) | ∞ | 1.30 | | | 3.48 |
| 16* | 10.743 | 4.93 | 1.58913 | 61.14 | 4.03 |
| 17 | −78.051 | 0.10 | | | 4.09 |
| 18 | 28.041 | 2.77 | 1.84666 | 23.78 | 4.08 |
| 19 | 10.494 | 1.42 | | | 3.85 |
| 20 | 13.584 | 3.12 | 1.49700 | 81.54 | 4.13 |
| 21 | −36.985 | 0.64 | | | 4.19 |
| 22* | 90.159 | 1.36 | 1.53071 | 55.69 | 4.18 |
| 23* | 47.692 | Variable | | | 4.19 |
| 24 | 19.130 | 2.68 | 1.49700 | 81.54 | 4.65 |
| 25 | −119.090 | 0.01 | 1.51400 | 42.83 | 4.52 |
| 26 | −119.090 | 0.82 | 1.80400 | 46.57 | 4.52 |
| 27 | 76.031 | Variable | | | 4.47 |
| 28* | 147.374 | 1.63 | 1.53071 | 55.69 | 4.20 |
| 29* | −67.939 | 1.09 | | | 4.22 |
| 30 | ∞ | 4.00 | 1.51680 | 64.20 | 4.11 |
| 31 | ∞ | 0.97 | | | 3.87 |
| Image plane | ∞ | | | | |

Aspherical surface data

14th surface

K = 0.000, A2 = 0.0000E+00, A4 = −7.27292e−05, A6 = −1.76848e−06, A8 = 1.00411e−07, A10 = −1.83590e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22th surface

K = 0.000, A2 = 0.0000E+00, A4 = −2.17277e−04, A6 = 5.36299e−06, A8 = −5.28517e−07, A10 = 1.10330e−08, A12 = −1.37250e−10

23th surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 7.47669e−04, A6 = −3.76060e−05, A8 = −7.34892e−07, A10 = 1.04035e−08

29th surface

K = 0.000, A2 = 0.0000E+00, A4 = 1.22156e−03, A6 = −4.89870e−05, A8 = −1.82037e−06, A10 = 5.14864e−08

Various data
Zoom ratio 19.90

| | Wide angle | Intermediate | Telephoto |
|---|---|---|---|
| Focal length | 4.68 | 19.85 | 93.09 |
| Fno. | 2.85 | 4.45 | 5.18 |
| Angle of field 2ω | 78.27 | 20.06 | 4.31 |
| Image height | 3.6 | 3.6 | 3.6 |
| Lens total length | 82.56 | 99.88 | 120.82 |
| BF | 4.70 | 4.74 | 4.73 |
| d6 | 1.00 | 18.90 | 40.08 |
| d14 | 26.12 | 8.56 | 2.30 |
| d23 | 1.59 | 16.58 | 27.97 |
| d27 | 4.66 | 6.60 | 1.25 |
| Entrance pupil position | 19.80 | 65.20 | 312.38 |
| Exit pupil position A | −31.19 | −128.84 | −1443.88 |
| Exit pupil position B | −35.88 | −133.58 | −1448.62 |
| Front side principal point position | 23.87 | 82.10 | 399.49 |
| Back side principal point position | −3.71 | −18.83 | −92.08 |

-continued unit mm

Single lens data

| Lens | Initial surface | Focal length |
|---|---|---|
| L1 | 1 | 125.69 |
| L2 | 3 | −67.96 |
| L3 | 4 | 286.94 |
| L4 | 5 | 50.39 |
| L5 | 7 | −10.25 |
| L6 | 9 | −11.00 |
| L7 | 10 | 8.81E+04 |
| L8 | 11 | 8.73 |
| L9 | 13 | −16.33 |
| L10 | 16 | 16.37 |
| L11 | 18 | −21.35 |
| L12 | 20 | 20.41 |
| L13 | 22 | −192.93 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 62.9060 | 10.2044 | −0.1488 | −6.3375 |
| G2 | 7 | −7.2621 | 13.5160 | 1.8474 | −7.1149 |
| G3 | 15 | 16.9381 | 15.6380 | 2.0302 | −9.4078 |
| G4 | 24 | 73.7783 | 3.5080 | −2.0985 | −4.2304 |
| G5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| G1 | 1 | 0.0000 | 0.0000 | 0.0000 |
| G2 | 7 | −0.1563 | −0.2543 | −0.9836 |
| G3 | 15 | −0.6330 | −1.7097 | −1.8942 |
| G4 | 24 | 0.7973 | 0.7702 | 0.8429 |
| G5 | 28 | 0.9427 | 0.9422 | 0.9423 |

Example 4 unit mm

Surface data

| Surface no. | r | d | nd | vd | effective radius |
|---|---|---|---|---|---|
| Object plane | ∞ | ∞ | | | |
| 1 | 63.548 | 3.67 | 1.48749 | 70.23 | 18.70 |
| 2 | 2150.199 | 0.10 | | | 18.70 |
| 3 | 45.800 | 1.00 | 1.80810 | 22.76 | 15.50 |
| 4 | 24.015 | 0.81 | 1.70000 | 17.00 | 14.70 |
| 5 | 27.211 | 4.71 | 1.69350 | 53.21 | 14.68 |
| 6 | 145.055 | Variable | | | 14.44 |
| 7 | 155.509 | 1.10 | 1.88300 | 40.76 | 9.70 |
| 8 | 8.523 | 4.79 | | | 6.95 |
| 9 | −46.254 | 0.80 | 1.88300 | 40.76 | 6.85 |
| 10 | 12.396 | 0.01 | 1.51400 | 42.83 | 6.83 |
| 11 | 12.396 | 4.87 | 1.78472 | 25.68 | 6.84 |
| 12 | −12.684 | 1.15 | | | 6.86 |
| 13 | −11.499 | 0.80 | 1.77250 | 49.60 | 5.77 |
| 14* | −127.060 | Variable | | | 5.76 |
| 15 (stop) | ∞ | 1.30 | | | 3.48 |
| 16* | 10.743 | 4.93 | 1.58913 | 61.14 | 4.03 |

-continued unit mm

| | | | | | |
|---|---|---|---|---|---|
| 17 | −78.051 | 0.10 | | | 4.08 |
| 18 | 28.041 | 2.77 | 1.84666 | 23.78 | 4.08 |
| 19 | 10.476 | 1.42 | | | 3.84 |
| 20 | 13.473 | 3.12 | 1.49700 | 81.54 | 4.13 |
| 21 | −36.985 | 0.64 | | | 4.19 |
| 22* | 72.402 | 1.36 | 1.53071 | 55.69 | 4.17 |
| 23* | 40.707 | Variable | | | 4.17 |
| 24 | 19.130 | 2.68 | 1.49700 | 81.54 | 4.64 |
| 25 | −119.090 | 0.01 | 1.51400 | 42.83 | 4.51 |
| 26 | −119.090 | 0.82 | 1.80400 | 46.57 | 4.51 |
| 27 | 76.031 | Variable | | | 4.46 |
| 28* | 147.374 | 1.63 | 1.53071 | 55.69 | 4.19 |
| 29* | −67.939 | 1.09 | | | 4.22 |
| 30 | ∞ | 4.00 | 1.51680 | 64.20 | 4.11 |
| 31 | ∞ | 0.97 | | | 3.87 |
| Image plane | ∞ | | | | |

Aspherical surface data

14th surface $K = 0.000$, $A2 = 0.0000E+00$, $A4 = -7.11211e-05$, $A6 = -1.71900e-06$, $A8 = 9.29927e-08$, $A10 = -1.65953e-09$ 16th surface $K = 0.000$, $A2 = 0.0000E+00$, $A4 = -8.77784e-05$, $A6 = -1.01116e-06$, $A8 = 5.64180e-08$, $A10 = -2.23368e-09$, $A12 = 3.59187e-11$ 22nd surface $K = 0.000$, $A2 = 0.0000E+00$, $A4 = -2.17277e-04$, $A6 = 5.36299e-06$, $A8 = -5.28517e-07$, $A10 = 1.10330e-08$, $A12 = -1.37250e-10$ 23rd surface $K = 0.000$, $A2 = 0.0000E+00$, $A4 = -1.09771e-04$, $A6 = 5.91402e-06$, $A8 = -5.09130e-07$, $A10 = 8.38419e-09$, $A12 = -4.36735e-11$ 28th surface $K = 0.000$, $A2 = 0.0000E+00$, $A4 = 7.76388e-04$, $A6 = -4.12605e-05$, $A8 = -9.03164e-07$, $A10 = 1.71227e-08$ 29th surface $K = 0.000$, $A2 = 0.0000E+00$, $A4 = 1.29954e-03$, $A6 = -5.65919e-05$, $A8 = -1.92076e-06$, $A10 = 6.00276e-08$ Various data
Zoom ratio 19.88

| | Wide angle | Intermediate | Telephoto |
|---|---|---|---|
| Focal length | 4.68 | 19.77 | 92.94 |
| Fno. | 2.86 | 4.47 | 5.23 |
| Angle of field 2ω | 78.44 | 20.13 | 4.31 |
| Image height | 3.6 | 3.6 | 3.6 |
| Lens total length | 82.70 | 99.46 | 121.24 |
| BF | 4.69 | 4.69 | 4.70 |
| d6 | 1.00 | 18.53 | 40.18 |
| d14 | 26.21 | 8.33 | 2.30 |
| d23 | 1.59 | 15.72 | 28.23 |
| d27 | 4.63 | 7.60 | 1.25 |
| Entrance pupil position | 19.80 | 63.23 | 309.35 |
| Exit pupil position A | −30.95 | −121.82 | −1731.37 |
| Exit pupil position B | −35.64 | −126.51 | −1736.07 |
| Front side principal point position | 23.86 | 79.92 | 397.31 |
| Back side principal point position | −3.71 | −18.81 | −91.96 |

Single lens data

| Lens | Initial surface | Focal length |
|---|---|---|
| L1 | 1 | 134.25 |
| L2 | 3 | −63.79 |
| L3 | 4 | 264.47 |
| L4 | 5 | 47.52 |
| L5 | 7 | −10.25 |
| L6 | 9 | −11.00 |

-continued unit mm

| | | |
|---|---|---|
| L7 | 10 | 8.81E+04 |
| L8 | 11 | 8.73 |
| L9 | 13 | −16.42 |
| L10 | 16 | 16.37 |
| L11 | 18 | −21.29 |
| L12 | 20 | 20.29 |
| L13 | 22 | −177.86 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 63.0560 | 10.2897 | 0.0045 | −6.2513 |
| G2 | 7 | −7.2939 | 13.5160 | 1.8285 | −7.1781 |
| G3 | 15 | 16.9400 | 15.6380 | 1.9601 | −9.4241 |
| G4 | 24 | 73.7783 | 3.5080 | −2.0985 | −4.2304 |
| G5 | 28 | 87.8520 | 6.7160 | 0.7294 | −4.0624 |

| Group | Initial surface | wide angle Magnification | Intermediate Magnification | Telephoto Magnification |
|---|---|---|---|---|
| G1 | 1 | 0.0000 | 0.0000 | 0.0000 |
| G2 | 7 | −0.1562 | −0.2502 | −0.9719 |
| G3 | 15 | −0.6312 | −1.7553 | −1.9075 |
| G4 | 24 | 0.7976 | 0.7574 | 0.8434 |
| G5 | 28 | 0.9427 | 0.9427 | 0.9427 |

Example 5 unit mm
Surface data

| Surface no. | r | d | nd | νd | effective radius |
|---|---|---|---|---|---|
| Object plane | ∞ | ∞ | | | |
| 1 | 59.292 | 3.90 | 1.49700 | 81.54 | 18.70 |
| 2 | 2289.832 | 0.10 | | | 18.70 |
| 3 | 45.600 | 0.99 | 1.84666 | 23.78 | 15.50 |
| 4 | 24.423 | 0.79 | 1.70000 | 17.00 | 14.69 |
| 5 | 27.713 | 4.57 | 1.69100 | 54.82 | 14.68 |
| 6 | 138.214 | Variable | | | 14.44 |
| 7 | 170.683 | 1.10 | 1.88300 | 40.76 | 9.67 |
| 8 | 8.530 | 4.79 | | | 6.93 |
| 9 | −46.254 | 0.80 | 1.88300 | 40.76 | 6.82 |
| 10 | 12.396 | 0.01 | 1.51400 | 42.83 | 6.79 |
| 11 | 12.396 | 4.87 | 1.78472 | 25.68 | 6.80 |
| 12 | −12.684 | 1.15 | | | 6.82 |
| 13 | −11.499 | 0.80 | 1.77250 | 49.60 | 5.73 |
| 14* | −137.938 | Variable | | | 5.71 |
| 15 (stop) | ∞ | 1.30 | | | 3.48 |
| 16* | 10.743 | 4.93 | 1.58913 | 61.14 | 4.04 |
| 17 | −78.051 | 0.10 | | | 4.10 |
| 18 | 28.041 | 2.77 | 1.84666 | 23.78 | 4.09 |
| 19 | 10.412 | 1.42 | | | 3.86 |
| 20 | 13.217 | 3.12 | 1.49700 | 81.54 | 4.16 |
| 21 | −36.985 | 0.64 | | | 4.22 |
| 22* | 82.670 | 1.36 | 1.53071 | 55.69 | 4.20 |
| 23* | 45.251 | Variable | | | 4.21 |
| 24 | 19.130 | 2.68 | 1.49700 | 81.54 | 4.66 |
| 25 | −119.090 | 0.01 | 1.51400 | 42.83 | 4.52 |
| 26 | −119.090 | 0.82 | 1.80400 | 46.57 | 4.52 |
| 27 | 76.031 | Variable | | | 4.47 |
| 28* | 147.374 | 1.63 | 1.53071 | 55.69 | 4.19 |
| 29* | −67.939 | 1.09 | | | 4.26 |

-continued unit mm

| | | | | | |
|---|---|---|---|---|---|
| 30 | ∞ | 4.00 | 1.51680 | 64.20 | 4.14 |
| 31 | ∞ | 0.97 | | | 3.89 |
| Image plane | ∞ | | | | |

Aspherical surface data

14th surface

K = 0.000, A2 = 0.0000E+00, A4 = −7.04083e−05, A6 = −1.82904e−06, A8 = 9.77667e−08, A10 = −1.69705e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 6.47128e−04, A6 = −4.20407e−05, A8 = −9.04150e−07, A10 = 1.15427e−08

29th surface

K = 0.000, A2 = 0.0000E+00, A4 = 1.12050e−03, A6 = −5.77871e−05, A8 = −1.84279e−06, A10 = 5.68107e−08

Various data
Zoom ratio 19.82

| | Wide angle | Intermediate | Telephoto |
|---|---|---|---|
| Focal length | 4.68 | 19.82 | 92.70 |
| Fno. | 2.85 | 4.43 | 5.24 |
| Angle of field 2ω | 78.59 | 20.10 | 4.32 |
| Image height | 3.6 | 3.6 | 3.6 |
| Lens total length | 82.33 | 99.72 | 122.01 |
| BF | 4.69 | 4.74 | 4.75 |
| d6 | 1.00 | 18.94 | 40.45 |
| d14 | 25.73 | 8.18 | 2.30 |
| d23 | 1.59 | 15.44 | 28.63 |
| d27 | 4.67 | 7.78 | 1.24 |
| Entrance pupil position | 19.80 | 64.74 | 311.57 |
| Exit pupil position A | −31.27 | −120.45 | −3511.16 |
| Exit pupil position B | −35.96 | −125.19 | −3515.91 |
| Front side principal point position | 23.87 | 81.42 | 401.82 |
| Back side principal point position | −3.71 | −18.80 | −91.67 |

Single lens data

| Lens | Initial surface | Focal length |
|---|---|---|
| L1 | 1 | 122.40 |
| L2 | 3 | −63.48 |
| L3 | 4 | 267.47 |
| L4 | 5 | 49.33 |
| L5 | 7 | −10.20 |
| L6 | 9 | −11.00 |
| L7 | 10 | 8.81E+04 |
| L8 | 11 | 8.73 |
| L9 | 13 | −16.28 |
| L10 | 16 | 16.37 |
| L11 | 18 | −21.08 |
| L12 | 20 | 20.01 |
| L13 | 22 | −190.78 |
| L14 | 24 | 33.38 |
| L15 | 25 | 8.13E+06 |
| L16 | 26 | −57.61 |
| L17 | 28 | 87.85 |

-continued unit mm

Zoom lens group data

| Group | Initial surface | Focal length | Lens structure length | Front side principal point position | Back side principal point position |
|---|---|---|---|---|---|
| G1 | 1 | 63.5795 | 10.3496 | −0.1470 | −6.4207 |
| G2 | 7 | −7.2159 | 13.5160 | 1.8459 | −7.1345 |
| G3 | 15 | 16.8652 | 15.6380 | 2.0727 | −9.3759 |
| G4 | 24 | 73.7783 | 3.5080 | −2.0985 | −4.2304 |
| G5 | 28 | 87.8520 | 6.7160 | 0.7294 | −4.0624 |

| Group | Initial surface | wide angle Magnification | Intermediate Magnification | Telephoto Magnification |
|---|---|---|---|---|
| G1 | 1 | 0.0000 | 0.0000 | 0.0000 |
| G2 | 7 | −0.1532 | −0.2475 | −0.9440 |
| G3 | 15 | −0.6389 | −1.7718 | −1.9453 |
| G4 | 24 | 0.7972 | 0.7543 | 0.8427 |
| G5 | 28 | 0.9427 | 0.9422 | 0.9421 |

Example 6 unit mm

Surface data

| Surface no. | r | d | nd | vd | effective radius |
|---|---|---|---|---|---|
| Object plane | ∞ | ∞ | | | |
| 1 | 62.273 | 3.78 | 1.49700 | 81.54 | 18.70 |
| 2 | 2204.309 | 0.10 | | | 18.81 |
| 3 | 43.400 | 1.00 | 1.90680 | 21.15 | 15.50 |
| 4 | 24.822 | 0.83 | 1.73000 | 15.00 | 14.72 |
| 5 | 28.504 | 4.49 | 1.69100 | 54.82 | 14.71 |
| 6 | 158.244 | Variable | | | 14.48 |
| 7 | 179.385 | 1.10 | 1.88300 | 40.76 | 9.76 |
| 8 | 8.634 | 4.79 | | | 7.01 |
| 9 | −46.254 | 0.80 | 1.88300 | 40.76 | 6.91 |
| 10 | 12.396 | 0.01 | 1.51400 | 42.83 | 6.89 |
| 11 | 12.396 | 4.87 | 1.78472 | 25.68 | 6.89 |
| 12 | −12.684 | 1.15 | | | 6.91 |
| 13 | −11.499 | 0.80 | 1.77250 | 49.60 | 5.76 |
| 14* | −124.597 | Variable | | | 5.74 |
| 15 (stop) | ∞ | 1.30 | | | 3.48 |
| 16* | 10.743 | 4.93 | 1.58913 | 61.14 | 4.03 |
| 17 | −78.051 | 0.10 | | | 4.08 |
| 18 | 28.041 | 2.77 | 1.84666 | 23.78 | 4.08 |
| 19 | 10.545 | 1.42 | | | 3.85 |
| 20 | 13.646 | 3.12 | 1.49700 | 81.54 | 4.12 |
| 21 | −36.985 | 0.64 | | | 4.18 |
| 22* | 84.725 | 1.36 | 1.53071 | 55.69 | 4.17 |
| 23* | 42.613 | Variable | | | 4.17 |
| 24 | 19.130 | 2.68 | 1.49700 | 81.54 | 4.61 |
| 25 | −119.090 | 0.01 | 1.51400 | 42.83 | 4.48 |
| 26 | −119.090 | 0.82 | 1.80400 | 46.57 | 4.48 |
| 27 | 76.031 | Variable | | | 4.43 |
| 28* | 147.374 | 1.63 | 1.53071 | 55.69 | 4.18 |
| 29* | −67.939 | 1.09 | | | 4.26 |
| 30 | ∞ | 4.00 | 1.51680 | 64.20 | 4.13 |
| 31 | ∞ | 0.97 | | | 3.88 |
| Image plane | ∞ | | | | |

Aspherical surface data

14th surface

K = 0.000, A2 = 0.0000E+00, A4 = −6.87584e−05, A6 = −1.78351e−06, A8 = 9.24419e−08, A10 = −1.58208e−09

-continued unit mm

16th surface

K = 0.000, A2 = 0.0000E+00, A4 = −8.77784e−05, A6 = −1.01116e−06,
A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06,
A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06,
A8 = −5.09130e−07, A10 = 8.38419e−09, A12 = −4.36735e−11

28th surface

K = 0.000, A2 = 0.0000E+00, A4 = 6.11134e−04, A6 = −4.92865e−05,
A8 = −5.05949e−07, A10 = 2.19323e−09

29th surface

K = 0.000, A2 = 0.0000E+00, A4 = 1.09149e−03, A6 = −6.84436e−05,
A8 = −1.26590e−06, A10 = 4.63882e−08

Various data
Zoom ratio 19.80

|  | Wide angle | Intermediate | Telephoto |
|---|---|---|---|
| Focal length | 4.70 | 21.07 | 92.95 |
| Fno. | 2.87 | 4.50 | 5.22 |
| Angle of field 2ω | 77.84 | 18.91 | 4.31 |
| Image height | 3.6 | 3.6 | 3.6 |
| Lens total length | 82.94 | 100.13 | 120.10 |
| BF | 4.69 | 4.70 | 4.70 |
| d6 | 1.00 | 19.36 | 39.43 |
| d14 | 26.54 | 8.04 | 2.30 |
| d23 | 1.58 | 14.90 | 27.96 |
| d27 | 4.65 | 8.67 | 1.22 |
| Entrance pupil position | 19.80 | 67.28 | 303.89 |
| Exit pupil position A | −30.80 | −116.62 | −1286.31 |
| Exit pupil position B | −35.49 | −121.32 | −1291.01 |
| Front side principal point position | 23.87 | 84.69 | 390.16 |
| Back side principal point position | −3.73 | −20.10 | −91.98 |

Single lens data

| Lens | Initial surface | Focal length |
|---|---|---|
| L1 | 1 | 128.87 |
| L2 | 3 | −65.62 |
| L3 | 4 | 240.41 |
| L4 | 5 | 49.61 |
| L5 | 7 | −10.30 |
| L6 | 9 | −11.00 |
| L7 | 10 | 8.81E+04 |
| L8 | 11 | 8.73 |
| L9 | 13 | −16.45 |
| L10 | 16 | 16.37 |
| L11 | 18 | −21.52 |
| L12 | 20 | 20.48 |
| L13 | 22 | −163.38 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 62.0750 | 10.1939 | 0.0124 | −6.1538 |
| G2 | 7 | −7.3388 | 13.5160 | 1.8236 | −7.1887 |
| G3 | 15 | 17.0107 | 15.6380 | 1.8824 | −9.4664 |
| G4 | 24 | 73.7783 | 3.5080 | −2.0985 | −4.2304 |
| G5 | 28 | 87.8520 | 6.7160 | 0.7294 | −4.0624 |

| Group | Initial surface | wide angle Magnification | Intermediate Magnification | Telephoto Magnification |
|---|---|---|---|---|
| G1 | 1 | 0.0000 | 0.0000 | 0.0000 |
| G2 | 7 | −0.160 | −0.2678 | −1.0014 |
| G3 | 15 | −0.6274 | −1.8095 | −1.8801 |
| G4 | 24 | 0.7975 | 0.7430 | 0.8438 |
| G5 | 28 | 0.9427 | 0.9427 | 0.9427 |

Example 7 unit mm

Surface data

| Surface no. | r | d | nd | vd | effective radius |
|---|---|---|---|---|---|
| Object plane | ∞ | ∞ | | | |
| 1 | 59.200 | 3.83 | 1.49700 | 81.54 | 18.70 |
| 2 | 2576.346 | 0.10 | | | 18.48 |
| 3 | 38.400 | 0.96 | 1.90680 | 21.15 | 15.50 |
| 4 | 23.902 | 0.77 | 1.70010 | 17.01 | 14.69 |
| 5 | 27.142 | 4.40 | 1.69400 | 56.30 | 14.68 |
| 6 | 112.392 | Variable | | | 14.44 |
| 7 | 124.140 | 1.10 | 1.88300 | 40.76 | 9.63 |
| 8 | 8.143 | 4.79 | | | 6.79 |
| 9 | −46.254 | 0.80 | 1.88300 | 40.76 | 6.71 |
| 10 | 12.396 | 0.01 | 1.51400 | 42.83 | 6.70 |
| 11 | 12.396 | 4.87 | 1.78472 | 25.68 | 6.70 |
| 12 | −12.684 | 1.15 | | | 6.74 |
| 13 | −11.499 | 0.80 | 1.77250 | 49.60 | 5.81 |
| 14* | −141.904 | Variable | | | 5.83 |
| 15 (stop) | ∞ | 1.30 | | | 3.48 |
| 16* | 10.743 | 4.93 | 1.58913 | 61.14 | 4.03 |
| 17 | −78.051 | 0.10 | | | 4.09 |
| 18 | 28.041 | 2.77 | 1.84666 | 23.78 | 4.09 |
| 19 | 10.545 | 1.42 | | | 3.85 |
| 20 | 13.731 | 3.12 | 1.49700 | 81.54 | 4.14 |
| 21 | −36.985 | 0.64 | | | 4.20 |
| 22* | 81.603 | 1.36 | 1.53071 | 55.69 | 4.19 |
| 23* | 44.028 | Variable | | | 4.19 |
| 24 | 19.130 | 2.68 | 1.49700 | 81.54 | 4.62 |
| 25 | −119.090 | 0.01 | 1.51400 | 42.83 | 4.50 |
| 26 | −119.090 | 0.82 | 1.80400 | 46.57 | 4.50 |
| 27 | 76.031 | Variable | | | 4.45 |
| 28* | 147.374 | 1.63 | 1.53071 | 55.69 | 4.18 |
| 29* | −67.939 | 1.09 | | | 4.22 |
| 30 | ∞ | 4.00 | 1.51680 | 64.20 | 4.11 |
| 31 | ∞ | 1.00 | | | 3.87 |
| Image plane | ∞ | | | | |

Aspherical surface data

14th surface

K = 0.000, A2 = 0.0000E+00, A4 = −8.03282e−05, A6 = −9.82748e−07,
A8 = 4.48510e−08, A10 = −9.57444e−10

16th surface

K = 0.000, A2 = 0.0000E+00, A4 = −8.77784e−05, A6 = −1.01116e−06,
A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06,
A8 = −5.28517e−07, A10 = 1.10330e−08, A12 = −1.37250e−10

-continued unit mm

23rd surface

K = 0.000, A2 = 0.0000E+00, A4 = −1.09771e−04, A6 = 5.91402e−06,
A8 = −5.09130e−07, A10 = 8.38419e−09, A12 = −4.36735e−11

28th surface

K = 0.000, A2 = 0.0000E+00, A4 = 1.07507e−03, A6 = −8.98397e−05,
A8 = 3.30252e−06, A10 = −1.03838e−07

29th surface

K = 0.000, A2 = 0.0000E+00, A4 = 1.64800e−03, A6 = −1.03700e−04,
A8 = 1.95605e−06, A10 = −5.18968e−08

Various data
Zoom ratio 19.40

| | Wide angle | Intermediate | Telephoto |
|---|---|---|---|
| Focal length | 4.75 | 21.05 | 92.07 |
| Fno. | 2.88 | 4.49 | 5.39 |
| Angle of field 2ω | 76.84 | 18.92 | 4.35 |
| Image height | 3.6 | 3.6 | 3.6 |
| Lens total length | 82.20 | 98.86 | 118.20 |
| BF | 4.72 | 4.70 | 4.70 |
| d6 | 1.00 | 18.05 | 35.85 |
| d14 | 25.71 | 8.05 | 2.30 |
| d23 | 1.57 | 14.67 | 29.76 |
| d27 | 4.85 | 9.04 | 1.25 |
| Entrance pupil position | 19.80 | 66.10 | 277.19 |
| Exit pupil position A | −31.32 | −116.75 | 3184.27 |
| Exit pupil position B | −36.05 | −121.45 | 3179.56 |
| Front side principal point position | 23.92 | 83.50 | 371.92 |
| Back side principal point position | −3.75 | −20.07 | −91.09 |

Single lens data

| Lens | Initial surface | Focal length |
|---|---|---|
| L1 | 1 | 121.85 |
| L2 | 3 | −72.08 |
| L3 | 4 | 260.52 |
| L4 | 5 | 50.49 |
| L5 | 7 | −9.91 |
| L6 | 9 | −11.00 |
| L7 | 10 | 8.81E+04 |
| L8 | 11 | 8.73 |
| L9 | 13 | −16.24 |
| L10 | 16 | 16.37 |
| L11 | 18 | −21.52 |
| L12 | 20 | 20.57 |
| L13 | 22 | −182.46 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 57.9678 | 10.0525 | −0.1804 | −6.2322 |
| G2 | 7 | −7.0320 | 13.5160 | 1.8345 | −7.1369 |
| G3 | 15 | 16.9660 | 15.6380 | 1.9601 | −9.4347 |
| G4 | 24 | 73.7783 | 3.5080 | −2.0985 | −4.2304 |
| G5 | 28 | 87.8520 | 6.7160 | 0.7294 | −4.0624 |

| Group | Initial surface | wide angle Magnification | Intermediate Magnification | Telephoto Magnification |
|---|---|---|---|---|
| G1 | 1 | 0.0000 | 0.0000 | 0.0000 |
| G2 | 7 | −0.1680 | −0.2833 | −1.0020 |
| G3 | 15 | −0.6511 | −1.8427 | −1.9939 |
| G4 | 24 | 0.7943 | 0.7378 | 0.8434 |
| G5 | 28 | 0.9424 | 0.9427 | 0.9426 |

Example 8 unit mm

Surface data

| Surface no. | r | d | nd | vd | effective radius |
|---|---|---|---|---|---|
| Object plane | ∞ | ∞ | | | |
| 1 | 59.081 | 3.88 | 1.49700 | 81.54 | 18.70 |
| 2 | 2581.534 | 0.10 | | | 18.70 |
| 3 | 40.200 | 1.18 | 1.92286 | 20.88 | 15.50 |
| 4 | 24.773 | 0.76 | 1.69952 | 16.99 | 14.68 |
| 5 | 28.005 | 4.39 | 1.69350 | 53.21 | 14.66 |
| 6 | 114.485 | Variable | | | 14.40 |
| 7 | 107.468 | 1.10 | 1.88300 | 40.76 | 9.47 |
| 8 | 8.050 | 4.79 | | | 6.69 |
| 9 | −46.254 | 0.80 | 1.88300 | 40.76 | 6.57 |
| 10 | 12.396 | 0.01 | 1.51400 | 42.83 | 6.52 |
| 11 | 12.396 | 4.87 | 1.78472 | 25.68 | 6.53 |
| 12 | −12.684 | 1.15 | | | 6.55 |
| 13 | −11.499 | 0.80 | 1.77250 | 49.60 | 5.60 |
| 14* | −152.233 | Variable | | | 5.58 |
| 15 (stop) | ∞ | 1.30 | | | 3.48 |
| 16* | 10.743 | 4.93 | 1.58913 | 61.14 | 4.05 |
| 17 | −78.051 | 0.10 | | | 4.11 |
| 18 | 28.041 | 2.77 | 1.84666 | 23.78 | 4.11 |
| 19 | 10.583 | 1.42 | | | 3.88 |
| 20 | 13.859 | 3.12 | 1.49700 | 81.54 | 4.17 |
| 21 | −36.985 | 0.64 | | | 4.24 |
| 22* | 81.752 | 1.36 | 1.53071 | 55.69 | 4.23 |
| 23* | 49.209 | Variable | | | 4.24 |
| 24 | 19.130 | 2.68 | 1.49700 | 81.54 | 4.65 |
| 25 | −119.090 | 0.01 | 1.51400 | 42.83 | 4.52 |
| 26 | −119.090 | 0.82 | 1.80400 | 46.57 | 4.52 |
| 27 | 76.031 | Variable | | | 4.47 |
| 28* | 147.374 | 1.63 | 1.53071 | 55.69 | 4.19 |
| 29* | −67.939 | 1.09 | | | 4.23 |
| 30 | ∞ | 4.00 | 1.51680 | 64.20 | 4.12 |
| 31 | ∞ | 1.01 | | | 3.88 |
| Image plane | ∞ | | | | |

Aspherical surface data

14th surface

K = 0.000, A2 = 0.0000E+00, A4 = −7.82039e−05, A6 = −1.47014e−06,
A8 = 7.30170e−08, A10 = −1.40458e−09

16th surface

K = 0.000, A2 = 0.0000E+00, A4 = −8.77784e−05, A6 = −1.01116e−06,
A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06,
A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06,
A8 = −5.09130e−07, A10 = 8.38419e−09, A12 = −4.36735e−11

28th surface

K = 0.000, A2 = 0.0000E+00, A4 = 7.25151e−04, A6 = −2.44213e−05,
A8 = −1.96813e−06, A10 = 3.62753e−08

29th surface

K = 0.000, A2 = 0.0000E+00, A4 = 1.19272e−03, A6 = −2.99570e−05,
A8 = −3.63456e−06, A10 = 9.36181e−08

-continued unit mm

Various data
Zoom ratio 19.64

| | Wide angle | Intermediate | Telephoto |
|---|---|---|---|
| Focal length | 4.71 | 20.70 | 92.59 |
| Fno. | 2.85 | 4.42 | 5.32 |
| Angle of field 2ω | 77.22 | 19.25 | 4.33 |
| Image height | 3.6 | 3.6 | 3.6 |
| Lens total length | 81.74 | 99.65 | 120.68 |
| BF | 4.74 | 4.75 | 4.69 |
| d6 | 1.00 | 19.07 | 38.16 |
| d14 | 25.05 | 7.83 | 2.30 |
| d23 | 1.56 | 14.40 | 29.67 |
| d27 | 4.80 | 9.00 | 1.25 |
| Entrance pupil position | 19.80 | 68.17 | 297.78 |
| Exit pupil position A | −31.62 | −115.19 | 2783.11 |
| Exit pupil position B | −36.36 | −119.94 | 2778.42 |
| Front side principal point position | 23.90 | 85.30 | 393.45 |
| Back side principal point position | −3.70 | −19.67 | −91.62 |

Single lens data

| Lens | Initial surface | Focal length |
|---|---|---|
| L1 | 1 | 121.60 |
| L2 | 3 | −72.62 |
| L3 | 4 | 279.74 |
| L4 | 5 | 52.37 |
| L5 | 7 | −9.91 |
| L6 | 9 | −11.00 |
| L7 | 10 | 8.81E+04 |
| L8 | 11 | 8.73 |
| L9 | 13 | −16.14 |
| L10 | 16 | 16.37 |
| L11 | 18 | −21.65 |
| L12 | 20 | 20.71 |
| L13 | 22 | −236.36 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 60.9351 | 10.3100 | −0.4001 | −6.5698 |
| G2 | 7 | −6.9924 | 13.5160 | 1.8581 | −7.0963 |
| G3 | 15 | 16.8154 | 15.6380 | 2.1454 | −9.3540 |
| G4 | 24 | 73.7783 | 3.5080 | −2.0985 | −4.2304 |
| G5 | 28 | 87.8520 | 6.7160 | 0.7294 | −4.0624 |

| Group | Initial surface | wide angle Magnification | Intermediate Magnification | Telephoto Magnification |
|---|---|---|---|---|
| G1 | 1 | 0.0000 | 0.0000 | 0.0000 |
| G2 | 7 | −0.1571 | −0.2645 | −0.9505 |
| G3 | 15 | −0.6578 | −1.8479 | −2.0102 |
| G4 | 24 | 0.7947 | 0.7377 | 0.8435 |
| G5 | 28 | 0.9422 | 0.9421 | 0.9427 |

Example 9 unit mm

Surface data

| Surface no. | r | d | nd | vd | effective radius |
|---|---|---|---|---|---|
| Object plane | ∞ | ∞ | | | |
| 1 | 59.899 | 3.94 | 1.49700 | 81.54 | 18.70 |
| 2 | 2332.852 | 0.10 | | | 18.88 |
| 3 | 41.600 | 1.18 | 1.92286 | 20.88 | 15.50 |
| 4 | 25.054 | 0.77 | 1.69952 | 16.99 | 14.69 |
| 5 | 28.453 | 4.22 | 1.74100 | 52.64 | 14.67 |
| 6 | 109.173 | Variable | | | 14.42 |
| 7 | 114.264 | 1.10 | 1.88300 | 40.76 | 9.66 |
| 8 | 8.255 | 4.79 | | | 6.83 |
| 9 | −46.254 | 0.80 | 1.88300 | 40.76 | 6.72 |
| 10 | 12.396 | 0.01 | 1.51400 | 42.83 | 6.68 |
| 11 | 12.396 | 4.87 | 1.78472 | 25.68 | 6.68 |
| 12 | −12.684 | 1.15 | | | 6.70 |
| 13 | −11.499 | 0.80 | 1.77250 | 49.60 | 5.62 |
| 14* | −162.457 | Variable | | | 5.58 |
| 15 (stop) | ∞ | 1.30 | | | 3.48 |
| 16* | 10.743 | 4.93 | 1.58913 | 61.14 | 4.04 |
| 17 | −78.051 | 0.10 | | | 4.09 |
| 18 | 28.041 | 2.77 | 1.84666 | 23.78 | 4.09 |
| 19 | 10.482 | 1.42 | | | 3.86 |
| 20 | 13.530 | 3.12 | 1.49700 | 81.54 | 4.15 |
| 21 | −36.985 | 0.64 | | | 4.21 |
| 22* | 76.180 | 1.36 | 1.53071 | 55.69 | 4.20 |
| 23* | 44.700 | Variable | | | 4.20 |
| 24 | 19.130 | 2.68 | 1.49700 | 81.54 | 4.65 |
| 25 | −119.090 | 0.01 | 1.51400 | 42.83 | 4.51 |
| 26 | −119.090 | 0.82 | 1.80400 | 46.57 | 4.51 |
| 27 | 76.031 | Variable | | | 4.46 |
| 28* | 147.374 | 1.63 | 1.53071 | 55.69 | 4.21 |
| 29* | −67.939 | 1.09 | | | 4.24 |
| 30 | ∞ | 4.00 | 1.51680 | 64.20 | 4.12 |
| 31 | ∞ | 1.00 | | | 3.88 |
| Image plane | ∞ | | | | |

Aspherical surface data

14th surface

K = 0.000, A2 = 0.0000E+00, A4 = −7.59751e−05, A6 = −1.83539e−06, A8 = 1.03693e−07, A10 = −1.94189e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 4.80805e−04, A6 = −8.72841e−06, A8 = −2.09389e−06, A10 = 3.65491e−08

29th surface

K = 0.000, A2 = 0.0000E+00, A4 = 8.48293e−04, A6 = −1.20671e−05, A8 = −3.42396e−06, A10 = 7.97393e−08

Various data
Zoom ratio 19.89

| | Wide angle | Intermediate | Telephoto |
|---|---|---|---|
| Focal length | 4.68 | 20.84 | 93.08 |
| Fno. | 2.85 | 4.44 | 5.17 |
| Angle of field 2ω | 77.73 | 19.14 | 4.32 |

-continued unit mm

| | | | |
|---|---|---|---|
| Image height | 3.6 | 3.6 | 3.6 |
| Lens total length | 82.26 | 100.65 | 118.93 |
| BF | 4.73 | 4.75 | 4.74 |
| d6 | 1.00 | 19.61 | 38.16 |
| d14 | 25.79 | 8.67 | 2.30 |
| d23 | 1.56 | 17.23 | 28.01 |
| d27 | 4.68 | 5.88 | 1.22 |
| Entrance pupil position | 19.80 | 71.16 | 303.98 |
| Exit pupil position A | −31.23 | −134.82 | −1533.69 |
| Exit pupil position B | −35.96 | −139.57 | −1538.43 |
| Front side principal point position | 23.87 | 88.88 | 391.43 |
| Back side principal point position | −3.68 | −19.81 | −92.07 |

Single lens data

| Lens | Initial surface | Focal length |
|---|---|---|
| L1 | 1 | 123.63 |
| L2 | 3 | −70.68 |
| L3 | 4 | 274.13 |
| L4 | 5 | 50.80 |
| L5 | 7 | −10.13 |
| L6 | 9 | −11.00 |
| L7 | 10 | 8.81E+04 |
| L8 | 11 | 8.73 |
| L9 | 13 | −16.06 |
| L10 | 16 | 16.37 |
| L11 | 18 | −21.31 |
| L12 | 20 | 20.35 |
| L13 | 22 | −206.92 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 60.4846 | 10.2153 | −0.3195 | −6.3735 |
| G2 | 7 | −7.0876 | 13.5160 | 1.8947 | −7.0465 |
| G3 | 15 | 16.8658 | 15.6380 | 2.0791 | −9.3765 |
| G4 | 24 | 73.7783 | 3.5080 | −2.0985 | −4.2304 |
| G5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| G1 | 1 | 0.0000 | 0.0000 | 0.0000 |
| G2 | 7 | −0.1606 | −0.2777 | −1.0165 |
| G3 | 15 | −0.6419 | −1.6883 | −1.9053 |
| G4 | 24 | 0.7964 | 0.7798 | 0.8432 |
| G5 | 28 | 0.9423 | 0.9421 | 0.9423 |

Example 10 unit mm

Surface data

| Surface no. | r | d | nd | vd | effective radius |
|---|---|---|---|---|---|
| Object plane | ∞ | ∞ | | | |
| 1 | 60.430 | 4.03 | 1.49700 | 81.54 | 18.70 |
| 2 | 3560.059 | 0.10 | | | 19.11 |
| 3 | 37.900 | 1.14 | 1.94595 | 17.98 | 15.50 |
| 4 | 24.736 | 0.73 | 1.69952 | 16.99 | 14.71 |
| 5 | 27.816 | 4.15 | 1.72000 | 43.69 | 14.69 |
| 6 | 93.987 | Variable | | | 14.43 |
| 7 | 96.799 | 1.10 | 1.88300 | 40.76 | 9.61 |
| 8 | 8.027 | 4.79 | | | 6.69 |
| 9 | −46.254 | 0.80 | 1.88300 | 40.76 | 6.54 |
| 10 | 12.396 | 0.01 | 1.51400 | 42.83 | 6.47 |
| 11 | 12.396 | 4.87 | 1.78472 | 25.68 | 6.47 |
| 12 | −12.684 | 1.15 | | | 6.48 |
| 13 | −11.499 | 0.80 | 1.77250 | 49.60 | 5.45 |
| 14* | −173.275 | Variable | | | 5.40 |
| 15 (stop) | ∞ | 1.30 | | | 3.48 |
| 16* | 10.743 | 4.93 | 1.58913 | 61.14 | 4.04 |
| 17 | −78.051 | 0.10 | | | 4.10 |
| 18 | 28.041 | 2.77 | 1.84666 | 23.78 | 4.10 |
| 19 | 10.392 | 1.42 | | | 3.87 |
| 20 | 13.283 | 3.12 | 1.49700 | 81.54 | 4.16 |
| 21 | −36.985 | 0.64 | | | 4.23 |
| 22* | 77.099 | 1.36 | 1.53071 | 55.69 | 4.22 |
| 23* | 46.336 | Variable | | | 4.22 |
| 24 | 19.130 | 2.68 | 1.49700 | 81.54 | 4.67 |
| 25 | −119.090 | 0.01 | 1.51400 | 42.83 | 4.54 |
| 26 | −119.090 | 0.82 | 1.80400 | 46.57 | 4.54 |
| 27 | 76.031 | Variable | | | 4.49 |
| 28* | 147.374 | 1.63 | 1.53071 | 55.69 | 4.23 |
| 29* | −67.939 | 1.09 | | | 4.23 |
| 30 | ∞ | 4.00 | 1.51680 | 64.20 | 4.12 |
| 31 | ∞ | 1.03 | | | 3.88 |
| Image plane | ∞ | | | | |

Aspherical surface data

14th surface

K = 0.000, A2 = 0.0000E+00, A4 = −8.03513e−05, A6 = −1.67633e−06, A8 = 9.30749e−08, A10 = −1.83760e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 6.78553e−04, A6 = −1.66161e−05, A8 = −1.54939e−06, A10 = 2.20507e−08

29th surface

K = 0.000, A2 = 0.0000E+00, A4 = 1.05976e−03, A6 = −1.53037e−05, A8 = −3.28541e−06, A10 = 7.26883e−08

Various data
Zoom ratio 19.92

| | Wide angle | Intermediate | Telephoto |
|---|---|---|---|
| Focal length | 4.67 | 20.84 | 93.13 |
| Fno. | 2.85 | 4.40 | 5.15 |
| Angle of field 2ω | 77.78 | 19.19 | 4.33 |
| Image height | 3.6 | 3.6 | 3.6 |
| Lens total length | 81.99 | 100.29 | 118.08 |
| BF | 4.76 | 4.75 | 4.75 |
| d6 | 1.00 | 19.61 | 37.43 |
| d14 | 25.51 | 8.65 | 2.30 |
| d23 | 1.67 | 16.59 | 27.97 |
| d27 | 4.63 | 6.26 | 1.20 |
| Entrance pupil position | 19.80 | 72.63 | 304.09 |
| Exit pupil position A | −31.58 | −128.41 | −1571.95 |
| Exit pupil position B | −36.34 | −133.16 | −1576.70 |

-continued unit mm

|  | | | |
|---|---|---|---|
| Front side principal point position | 23.87 | 90.21 | 391.72 |
| Back side principal point position | −3.64 | −19.82 | −92.11 |

Single lens data

| Lens | Initial surface | Focal length |
|---|---|---|
| L1 | 1 | 123.64 |
| L2 | 3 | −78.59 |
| L3 | 4 | 291.02 |
| L4 | 5 | 53.47 |
| L5 | 7 | −9.97 |
| L6 | 9 | −11.00 |
| L7 | 10 | 8.81E+04 |
| L8 | 11 | 8.73 |
| L9 | 13 | −15.98 |
| L10 | 16 | 16.37 |
| L11 | 18 | −21.01 |
| L12 | 20 | 20.08 |
| L13 | 22 | −222.23 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 59.5217 | 10.1420 | −0.4561 | −6.4724 |
| G2 | 7 | −6.9701 | 13.5160 | 1.9002 | −7.0261 |
| G3 | 15 | 16.8268 | 15.6380 | 2.1560 | −9.3421 |
| G4 | 24 | 73.7783 | 3.5080 | −2.0985 | −4.2304 |
| G5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| G1 | 1 | 0.0000 | 0.0000 | 0.0000 |
| G2 | 7 | −0.1614 | −0.2837 | −1.0326 |
| G3 | 15 | −0.6482 | −1.6910 | −1.9072 |
| G4 | 24 | 0.7967 | 0.7748 | 0.8434 |
| G5 | 28 | 0.9420 | 0.9421 | 0.9421 |

Example 11 unit mm

Surface data

| Surface no. | r | d | nd | vd | effective radius |
|---|---|---|---|---|---|
| Object plane | ∞ | ∞ | | | |
| 1 | 59.751 | 3.90 | 1.49700 | 81.54 | 18.70 |
| 2 | 2203.377 | 0.10 | | | 18.75 |
| 3 | 41.900 | 1.11 | 1.90680 | 21.15 | 15.50 |
| 4 | 25.678 | 0.80 | 1.63336 | 23.36 | 14.74 |
| 5 | 29.121 | 4.20 | 1.72000 | 46.02 | 14.71 |
| 6 | 119.744 | Variable | | | 14.47 |
| 7 | 129.746 | 1.10 | 1.88300 | 40.76 | 9.78 |
| 8 | 8.421 | 4.79 | | | 6.95 |
| 9 | −46.254 | 0.80 | 1.88300 | 40.76 | 6.86 |
| 10 | 12.396 | 0.01 | 1.51400 | 42.83 | 6.84 |
| 11 | 12.396 | 4.87 | 1.78472 | 25.68 | 6.84 |
| 12 | −12.684 | 1.15 | | | 6.86 |
| 13 | −11.499 | 0.80 | 1.77250 | 49.60 | 5.75 |

-continued unit mm

| | | | | | |
|---|---|---|---|---|---|
| 14* | −149.795 | Variable | | | 5.72 |
| 15 (stop) | ∞ | 1.30 | | | 3.48 |
| 16* | 10.743 | 4.93 | 1.58913 | 61.14 | 4.03 |
| 17 | −78.051 | 0.10 | | | 4.08 |
| 18 | 28.041 | 2.77 | 1.84666 | 23.78 | 4.08 |
| 19 | 10.386 | 1.42 | | | 3.85 |
| 20 | 13.158 | 3.12 | 1.49700 | 81.54 | 4.14 |
| 21 | −36.985 | 0.64 | | | 4.20 |
| 22* | 87.274 | 1.36 | 1.53071 | 55.69 | 4.18 |
| 23* | 44.424 | Variable | | | 4.18 |
| 24 | 19.130 | 2.68 | 1.49700 | 81.54 | 4.63 |
| 25 | −119.090 | 0.01 | 1.51400 | 42.83 | 4.49 |
| 26 | −119.090 | 0.82 | 1.80400 | 46.57 | 4.49 |
| 27 | 76.031 | Variable | | | 4.44 |
| 28* | 147.374 | 1.63 | 1.53071 | 55.69 | 4.19 |
| 29* | −67.939 | 1.09 | | | 4.25 |
| 30 | ∞ | 4.00 | 1.51680 | 64.20 | 4.12 |
| 31 | ∞ | 0.97 | | | 3.88 |
| Image plane | ∞ | | | | |

Aspherical surface data

14th surface

K = 0.000, A2 = 0.0000E+00, A4 = −7.22699e−05, A6 = −1.91912e−06, A8 = 1.03329e−07, A10 = −1.85098e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 3.76463e−04, A6 = −9.67102e−06, A8 = −2.04606e−06, A10 = 2.89575e−08

29th surface

K = 0.000, A2 = 0.0000E+00, A4 = 7.08578e−04, A6 = −8.97430e−06, A8 = −3.63292e−06, A10 = 8.09720e−08

Various data
Zoom ratio 19.87

|  | Wide angle | Intermediate | Telephoto |
|---|---|---|---|
| Focal length | 4.69 | 20.78 | 93.18 |
| Fno. | 2.86 | 4.46 | 5.20 |
| Angle of field 2ω | 77.60 | 19.19 | 4.31 |
| Image height | 3.6 | 3.6 | 3.6 |
| Lens total length | 82.58 | 99.94 | 119.10 |
| BF | 4.70 | 4.69 | 4.70 |
| d6 | 1.00 | 19.14 | 38.41 |
| d14 | 26.21 | 8.39 | 2.30 |
| d23 | 1.59 | 15.72 | 28.02 |
| d27 | 4.68 | 7.59 | 1.26 |
| Entrance pupil position | 19.80 | 68.12 | 301.49 |
| Exit pupil position A | −31.13 | −122.17 | −1463.63 |
| Exit pupil position B | −35.83 | −126.86 | −1468.33 |
| Front side principal point position | 23.88 | 85.50 | 388.75 |
| Back side principal point position | −3.72 | −19.81 | −92.20 |

Single lens data

| Lens | Initial surface | Focal length |
|---|---|---|
| L1 | 1 | 123.50 |
| L2 | 3 | −75.60 |
| L3 | 4 | 314.63 |

-continued unit mm

| | | |
|---|---|---|
| L4 | 5 | 52.42 |
| L5 | 7 | −10.24 |
| L6 | 9 | −11.00 |
| L7 | 10 | 8.81E+04 |
| L8 | 11 | 8.73 |
| L9 | 13 | −16.16 |
| L10 | 16 | 16.37 |
| L11 | 18 | −20.99 |
| L12 | 20 | 19.94 |
| L13 | 22 | −172.39 |
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 60.7680 | 10.1128 | −0.1334 | −6.2114 |
| G2 | 7 | −7.1956 | 13.5160 | 1.8818 | −7.0797 |
| G3 | 15 | 16.9487 | 15.6380 | 1.9918 | −9.4149 |
| G4 | 24 | 73.7783 | 3.5080 | −2.0985 | −4.2304 |
| G5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| G1 | 1 | 0.0000 | 0.0000 | 0.0000 |
| G2 | 7 | −0.1618 | −0.2732 | −1.0183 |
| G3 | 15 | −0.6350 | −1.7527 | −1.8946 |
| G4 | 24 | 0.7969 | 0.7575 | 0.8432 |
| G5 | 28 | 0.9427 | 0.9427 | 0.9426 |

Example 12 unit mm

Surface data

| Surface no. | r | d | nd | vd | effective radius |
|---|---|---|---|---|---|
| Object plane | ∞ | ∞ | | | |
| 1 | 58.997 | 3.97 | 1.49700 | 81.54 | 18.70 |
| 2 | 2670.495 | 0.10 | | | 18.78 |
| 3 | 39.600 | 1.10 | 1.92286 | 18.90 | 15.50 |
| 4 | 25.219 | 0.82 | 1.63336 | 23.36 | 14.73 |
| 5 | 28.974 | 4.08 | 1.73077 | 40.51 | 14.71 |
| 6 | 107.166 | Variable | | | 14.46 |
| 7 | 124.410 | 1.10 | 1.88300 | 40.76 | 9.69 |
| 8 | 8.265 | 4.79 | | | 6.85 |
| 9 | −46.254 | 0.80 | 1.88300 | 40.76 | 6.75 |
| 10 | 12.396 | 0.01 | 1.51400 | 42.83 | 6.71 |
| 11 | 12.396 | 4.87 | 1.78472 | 25.68 | 6.71 |
| 12 | −12.684 | 1.15 | | | 6.73 |
| 13 | −11.499 | 0.80 | 1.77250 | 49.60 | 5.67 |
| 14* | −171.588 | Variable | | | 5.65 |
| 15 (stop) | ∞ | 1.30 | | | 3.48 |
| 16* | 10.743 | 4.93 | 1.58913 | 61.14 | 4.04 |
| 17 | −78.051 | 0.10 | | | 4.09 |
| 18 | 28.041 | 2.77 | 1.84666 | 23.78 | 4.09 |
| 19 | 10.358 | 1.42 | | | 3.86 |
| 20 | 13.095 | 3.12 | 1.49700 | 81.54 | 4.16 |
| 21 | −36.985 | 0.64 | | | 4.22 |
| 22* | 83.838 | 1.36 | 1.53071 | 55.69 | 4.20 |
| 23* | 44.687 | Variable | | | 4.20 |
| 24 | 19.130 | 2.68 | 1.49700 | 81.54 | 4.64 |
| 25 | −119.090 | 0.01 | 1.51400 | 42.83 | 4.50 |
| 26 | −119.090 | 0.82 | 1.80400 | 46.57 | 4.50 |
| 27 | 76.031 | Variable | | | 4.45 |
| 28* | 147.374 | 1.63 | 1.53071 | 55.69 | 4.19 |
| 29* | −67.939 | 1.09 | | | 4.21 |
| 30 | ∞ | 4.00 | 1.51680 | 64.20 | 4.10 |
| 31 | ∞ | 0.99 | | | 3.87 |
| Image plane | ∞ | | | | |

Aspherical surface data

14th surface

K = 0.000, A2 = 0.0000E+00, A4 = −7.58786e−05, A6 = −1.78626e−06, A8 = 9.59291e−08, A10 = −1.79213e−09

16th surface

K = 0.000, A2 = 0.0000E+00, A4 = −8.77784e−05, A6 = −1.01116e−06, A8 = 5.64180e−08, A10 = −2.23368e−09, A12 = 3.59187e−11

22nd surface

K = 0.000, A2 = 0.0000E+00, A4 = −2.17277e−04, A6 = 5.36299e−06, A8 = −5.28517e−07, A10 = 1.10330e−08, A12 = −1.37250e−10

23rd surface

K = 0.000, A2 = 0.0000E+00, A4 = −1.09771e−04, A6 = 5.91402e−06, A8 = −5.09130e−07, A10 = 8.38419e−09, A12 = −4.36735e−11

28th surface

K = 0.000, A2 = 0.0000E+00, A4 = 5.50788e−04, A6 = −2.06039e−05, A8 = −1.13573e−06, A10 = 9.85482e−09

29th surface

K = 0.000, A2 = 0.0000E+00, A4 = 9.20668e−04, A6 = −1.96459e−05, A8 = −2.71973e−06, A10 = 5.81147e−08

Various data
Zoom ratio 19.83

| | Wide angle | Intermediate | Telephoto |
|---|---|---|---|
| Focal length | 4.69 | 20.74 | 93.03 |
| Fno. | 2.86 | 4.45 | 5.19 |
| Angle of field 2ω | 77.50 | 19.21 | 4.31 |
| Image height | 3.6 | 3.6 | 3.6 |
| Lens total length | 82.30 | 99.06 | 117.44 |
| BF | 4.72 | 4.69 | 4.70 |
| d6 | 1.00 | 18.31 | 36.70 |
| d14 | 25.88 | 8.28 | 2.30 |
| d23 | 1.59 | 15.17 | 28.07 |
| d27 | 4.74 | 8.24 | 1.29 |
| Entrance pupil position | 19.80 | 66.75 | 293.82 |
| Exit pupil position A | −31.34 | −119.23 | −1607.25 |
| Exit pupil position B | −36.06 | −123.92 | −1611.95 |
| Front side principal point position | 23.88 | 84.02 | 381.49 |
| Back side principal point position | −3.70 | −19.77 | −92.06 |

Single lens data

| Lens | Initial surface | Focal length |
|---|---|---|
| L1 | 1 | 121.33 |
| L2 | 3 | −78.13 |
| L3 | 4 | 283.17 |
| L4 | 5 | 53.17 |
| L5 | 7 | −10.07 |
| L6 | 9 | −11.00 |
| L7 | 10 | 8.81E+04 |
| L8 | 11 | 8.73 |
| L9 | 13 | −15.99 |
| L10 | 16 | 16.37 |
| L11 | 18 | −20.90 |
| L12 | 20 | 19.87 |
| L13 | 22 | −182.51 |

-continued unit mm

| | | |
|---|---|---|
| L14 | 24 | 33.38 |
| L15 | 25 | 8.13E+06 |
| L16 | 26 | −57.61 |
| L17 | 28 | 87.85 |

Zoom lens group data

| Group | Initial surface | Focal length | Lens structure length | Front side principal point position | Back side principal point position |
|---|---|---|---|---|---|
| G1 | 1 | 58.5129 | 10.0830 | −0.1551 | −6.1890 |
| G2 | 7 | −7.0309 | 13.5160 | 1.8981 | −7.0286 |
| G3 | 15 | 16.9109 | 15.6380 | 2.0434 | −9.3905 |
| G4 | 24 | 73.7783 | 3.5080 | −2.0985 | −4.2304 |
| G5 | 28 | 87.8520 | 6.7160 | 0.7294 | −4.0624 |

| Group | Initial surbace | wide angle Magnification | Intermediate Magnification | Telephoto Magnification |
|---|---|---|---|---|
| G1 | 1 | 0.0000 | 0.0000 | 0.0000 |
| G2 | 7 | −0.1658 | −0.2803 | −1.0507 |
| G3 | 15 | −0.6445 | −1.7917 | −1.9045 |
| G4 | 24 | 0.7958 | 0.7488 | 0.8429 |
| G5 | 28 | 0.9425 | 0.9427 | 0.9426 |

Next, values of each of the embodiments of the conditional expressions are shown below:

| | |
|---|---|
| $\|G1/G2\| > 6.4$ | (2) |
| $0 < (Zb(3.3a) - Za(3.3a))/(Zb(2.5a) - Za(2.5a)) < 0.895$ | (3-2) |
| $0.4 < \theta gFn < 0.9$ | (4-3) |
| $0.20 < (Tnglw(0.7)/Tbasw(0.7))/(Tngl(0)/Tbas(0)) < 0.65$ | (5a) |
| $0.10 < (Tnglw(0.9)/Tbasw(0.9))/(Tngl(0)/Tbas(0)) < 0.45$ | (5b) |
| $0.4 < \theta hg < 1.2$ | (6) |

| conditional expression | (2) | (3-2) | (4-3) | (5a) | (5b) | (6) |
|---|---|---|---|---|---|---|
| Example 1 | −8.78 | 0.8273 | 0.721 | 0.511 | 0.320 | 0.647 |
| Example 2 | −8.88 | 0.7060 | 0.828 | 0.485 | 0.290 | 0.647 |
| Example 3 | −8.66 | 0.6693 | 0.855 | 0.434 | 0.245 | 0.654 |
| Example 4 | −8.65 | 0.6709 | 0.797 | 0.413 | 0.228 | 0.695 |
| Example 5 | −8.81 | 0.6660 | 0.697 | 0.424 | 0.237 | 0.695 |
| Example 6 | −8.46 | 0.6663 | 0.687 | 0.441 | 0.247 | 0.726 |
| Example 7 | −8.24 | 0.6621 | 0.631 | 0.454 | 0.262 | 0.812 |
| Example 8 | −8.71 | 0.6846 | 0.584 | 0.505 | 0.303 | 0.900 |
| Example 9 | −8.53 | 0.6717 | 0.592 | 0.495 | 0.293 | 0.900 |
| Example 10 | −8.54 | 0.6675 | 0.684 | 0.512 | 0.307 | 0.900 |
| Example 11 | −8.45 | 0.7065 | 0.658 | 0.503 | 0.305 | 0.900 |
| Example 12 | −8.32 | 0.6720 | 0.785 | 0.503 | 0.301 | 0.900 |

| | |
|---|---|
| $\|F_B/F_A\| > 0.15$ | (7) |
| $0 < \theta gFB - \theta gF_{BA} < 0.15$ | (8) |
| $2.0 < f_A/G1 < 7.0$ | (9) |
| $-26 < (Ra + Rb)/(Ra - Rb) < -0.5$ | (10) |

| conditional expression | (7) | (8) | (9) | (10) |
|---|---|---|---|---|
| Example 1 | −0.5105 | 0.0130 | 3.00 | −10.56 |
| Example 2 | −0.2439 | 0.0157 | 5.11 | −16.50 |
| Example 3 | −0.2368 | 0.0264 | 4.56 | −16.18 |
| Example 4 | −0.2412 | 0.0414 | 4.19 | −16.03 |
| Example 5 | −0.2373 | 0.0482 | 4.21 | −15.84 |
| Example 6 | −0.2730 | 0.0600 | 3.87 | −14.48 |
| Example 7 | −0.2767 | 0.0684 | 4.49 | −15.61 |
| Example 8 | −0.2596 | 0.0835 | 4.59 | −16.33 |
| Example 9 | −0.2578 | 0.0827 | 4.53 | −15.74 |
| Example 10 | −0.2701 | 0.0651 | 4.89 | −17.06 |
| Example 11 | −0.2403 | 0.0519 | 5.18 | −15.92 |
| Example 12 | −0.2759 | 0.0482 | 4.84 | −14.43 |

| | |
|---|---|
| $0.4 < Tngl(0)/Tbas(0) < 2.4$ | (11-1a) |
| $0.2 < Tnglt(0.7)/Tbast(0.7) < 1.5$ | (11-1b) |
| $0.1 < Tnglt(0.9)/Tbast(0.9) < 1.1$ | (11-1c) |
| $0.2 < (Tnglt(0.7)/Tbast(0.7))/(Tngl(0)/Tbas(0)) < 0.85$ | (11-2a) |
| $0.2 < (Tnglt(0.9)/Tbast(0.9))/(Tngl(0)/Tbas(0)) < 0.75$ | (11-2b) |

| conditional expression | (11-1a) | (11-1b) | (11-1c) | (11-2a) | (11-2b) |
|---|---|---|---|---|---|
| Example 1 | 1.379 | 0.940 | 0.740 | 0.682 | 0.537 |
| Example 2 | 0.721 | 0.370 | 0.243 | 0.513 | 0.337 |
| Example 3 | 0.766 | 0.381 | 0.249 | 0.497 | 0.325 |
| Example 4 | 0.813 | 0.394 | 0.256 | 0.484 | 0.315 |
| Example 5 | 0.795 | 0.385 | 0.248 | 0.484 | 0.313 |
| Example 6 | 0.826 | 0.429 | 0.286 | 0.520 | 0.346 |
| Example 7 | 0.804 | 0.465 | 0.331 | 0.578 | 0.412 |
| Example 8 | 0.646 | 0.378 | 0.268 | 0.586 | 0.415 |
| Example 9 | 0.655 | 0.373 | 0.260 | 0.570 | 0.397 |
| Example 10 | 0.641 | 0.375 | 0.264 | 0.585 | 0.412 |
| Example 11 | 0.721 | 0.420 | 0.299 | 0.582 | 0.414 |
| Example 12 | 0.747 | 0.445 | 0.319 | 0.596 | 0.428 |

| | |
|---|---|
| $0.5 < (Tnglw(0.7)/(Tngl(0)) < 0.9$ | (12a) |
| $0.3 < (Tnglw(0.9)/(Tngl(0)) < 0.8$ | (12b) |
| $0.5 < (Tnglt(0.7)/(Tngl(0)) < 0.95$ | (13a) |
| $0.4 < (Tnglt(0.9)/(Tngl(0)) < 0.93$ | (13b) |
| $0.4 < Tngl(0)/Tbas(0) < 2.4$ | (14-1a) |
| $0.2 < Tnglw(0.7)/Tbasw(0.7) < 0.9$ | (14-1b) |
| $0.1 < Tnglw(0.9)/Tbasw(0.9) < 0.65$ | (14-1c) |

| conditional expression | (12a) | (12b) | (13a) | (13b) | (14-1a) | (14-1b) | (14-1c) |
|---|---|---|---|---|---|---|---|
| Example 1 | 0.739 | 0.561 | 0.851 | 0.755 | 1.379 | 0.705 | 0.441 |
| Example 2 | 0.753 | 0.570 | 0.765 | 0.610 | 0.721 | 0.350 | 0.209 |
| Example 3 | 0.736 | 0.541 | 0.776 | 0.627 | 0.766 | 0.333 | 0.188 |
| Example 4 | 0.731 | 0.535 | 0.781 | 0.634 | 0.813 | 0.336 | 0.185 |
| Example 5 | 0.734 | 0.539 | 0.774 | 0.623 | 0.795 | 0.337 | 0.188 |
| Example 6 | 0.730 | 0.530 | 0.783 | 0.638 | 0.826 | 0.365 | 0.204 |
| Example 7 | 0.727 | 0.527 | 0.811 | 0.686 | 0.804 | 0.365 | 0.210 |
| Example 8 | 0.745 | 0.555 | 0.797 | 0.663 | 0.646 | 0.326 | 0.195 |
| Example 9 | 0.742 | 0.548 | 0.789 | 0.650 | 0.655 | 0.324 | 0.192 |
| Example 10 | 0.741 | 0.547 | 0.789 | 0.649 | 0.641 | 0.328 | 0.197 |
| Example 11 | 0.758 | 0.576 | 0.806 | 0.678 | 0.721 | 0.362 | 0.220 |
| Example 12 | 0.744 | 0.552 | 0.802 | .673 | 0.747 | 0.376 | 0.225 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below. Incidentally, the optical systems shown below are examples of the optical systems used generally. A photographic apparatus having the image forming optical system of the present invention could be made by replacing the optical system with the image forming optical system in above-described embodiment.

Figure 25:
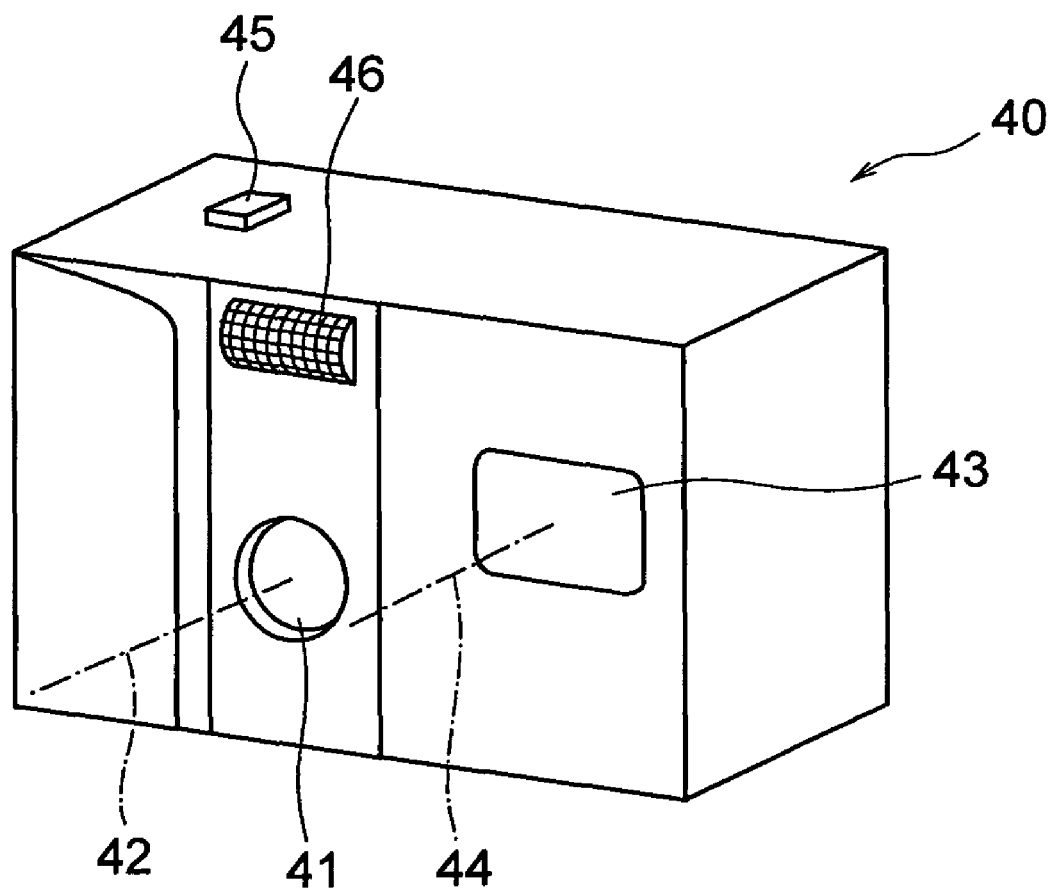
FIG. 25 is a front perspective view showing an outer appearance of a digital camera 40 equipped with a zoom lens according to the present invention.
Figure 26:
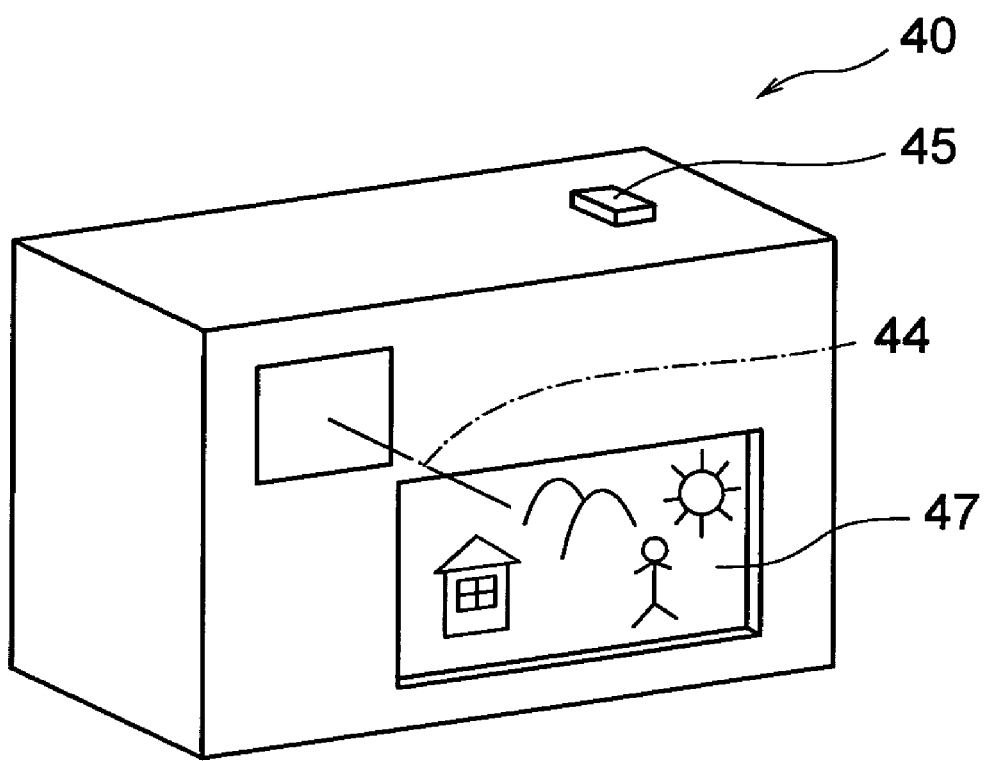
FIG. 26 is a rear perspective view of the digital camera 40.
Figure 27:
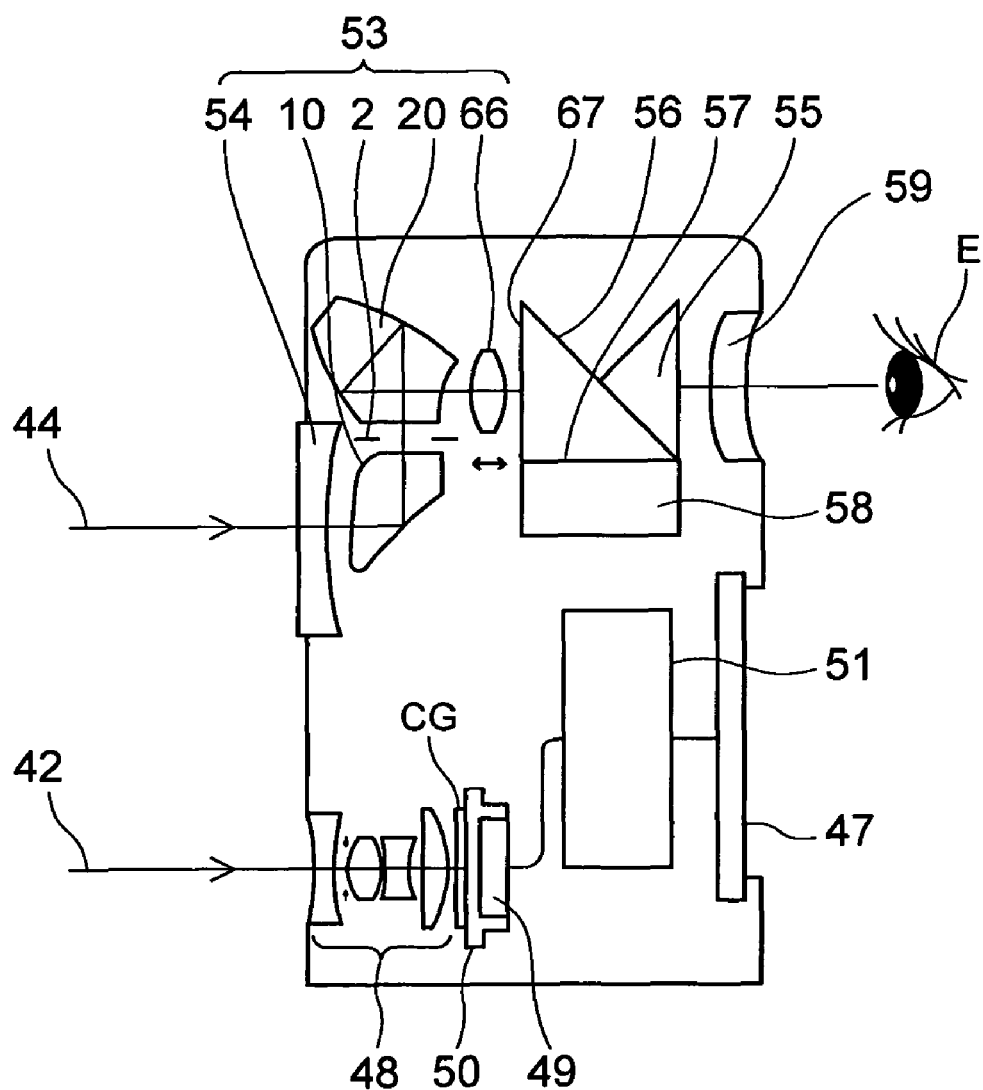
FIG. 27 is a cross sectional view showing the optical construction of the digital camera 40.

In FIG. 25 to FIG. 27 show conceptual diagrams of structures in which the image forming optical system according to the present invention is incorporated in a photographic optical system 41 of a digital camera. FIG. 25 is a frontward perspective view showing an appearance of a digital camera 40, FIG. 26 is a rearward perspective view of the same, and FIG. 27 is a cross-sectional view showing an optical arrangement of the digital camera 40.

The digital camera 40, in a case of this example, includes the photographic optical system 41 having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

Figure 28:
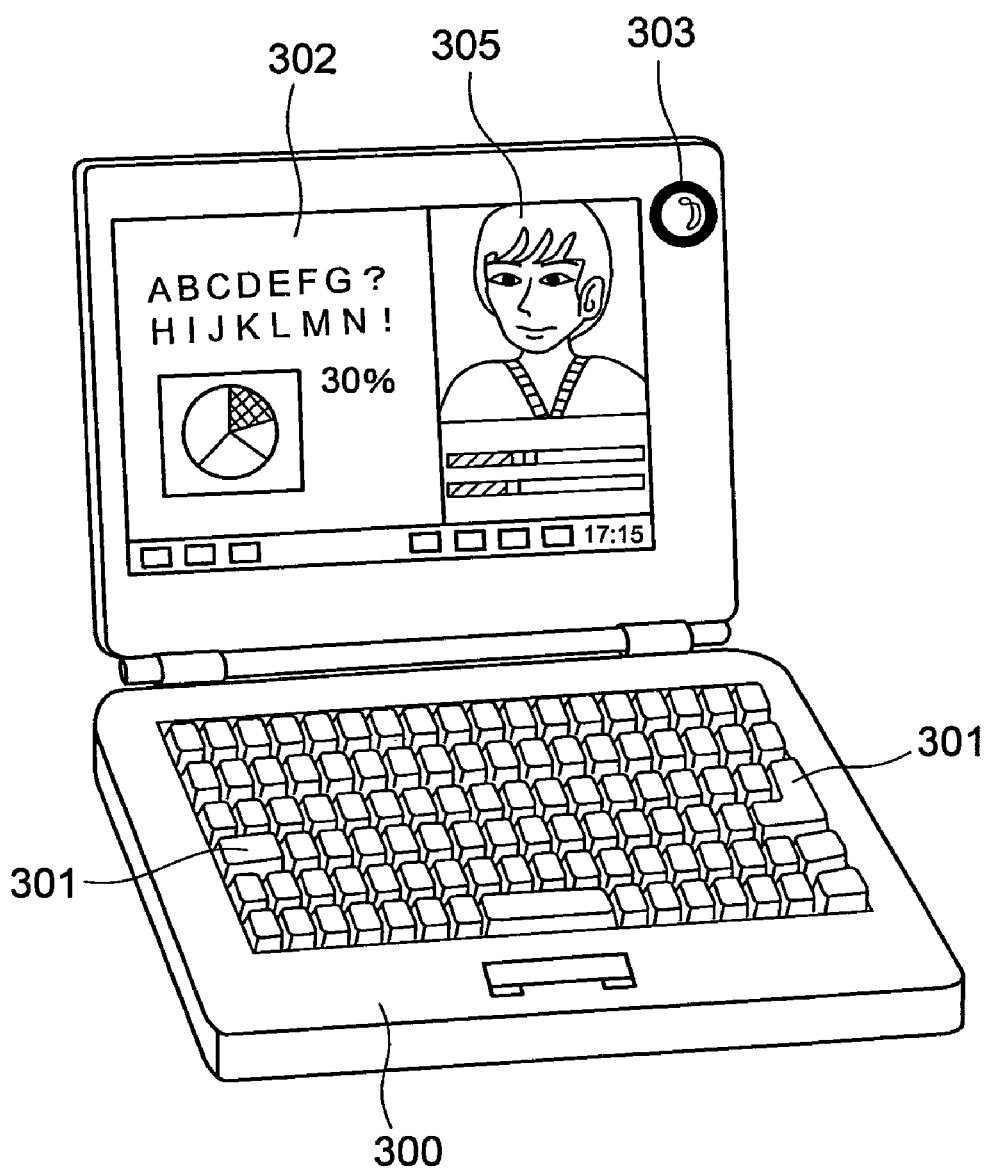
FIG. 28 a front perspective view showing a personal computer 300 as an example of an information processing apparatus in which a zoom lens according to the present invention is provided as an objective optical system, in a state in which the cover is open.
Figure 29:
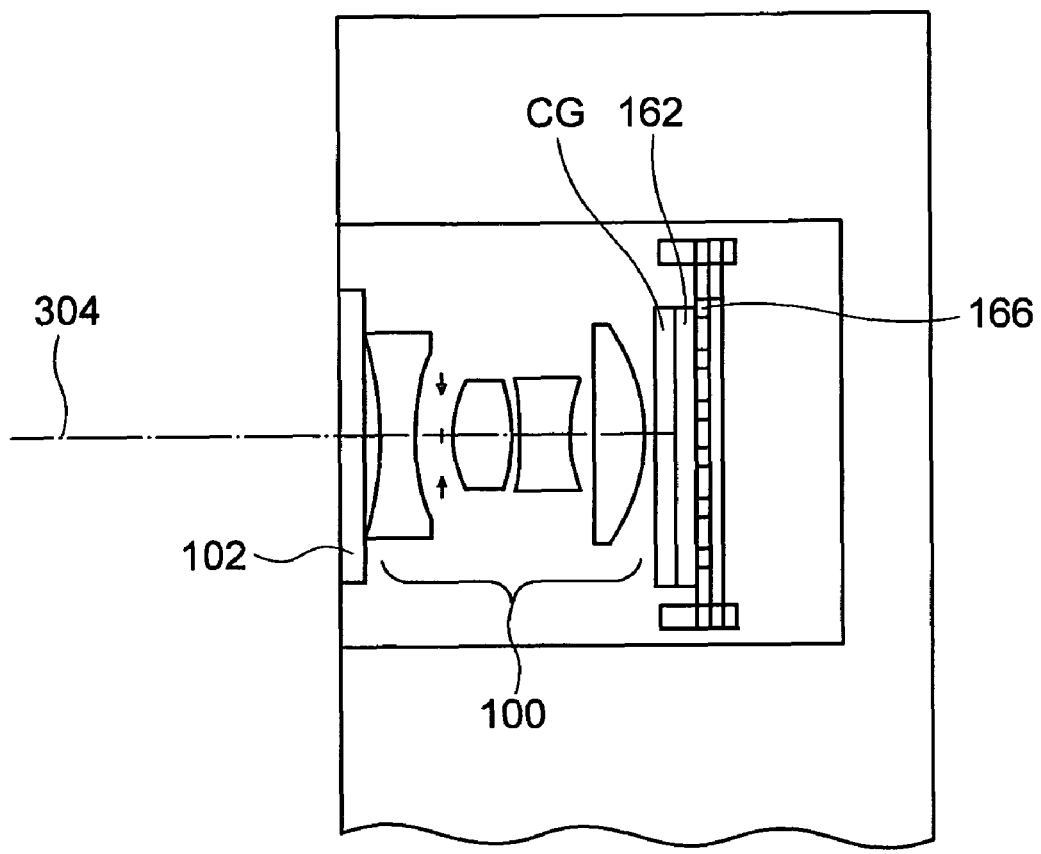
FIG. 29 is a cross sectional view of an image taking optical system 303 of the personal computer 300.
Figure 30:
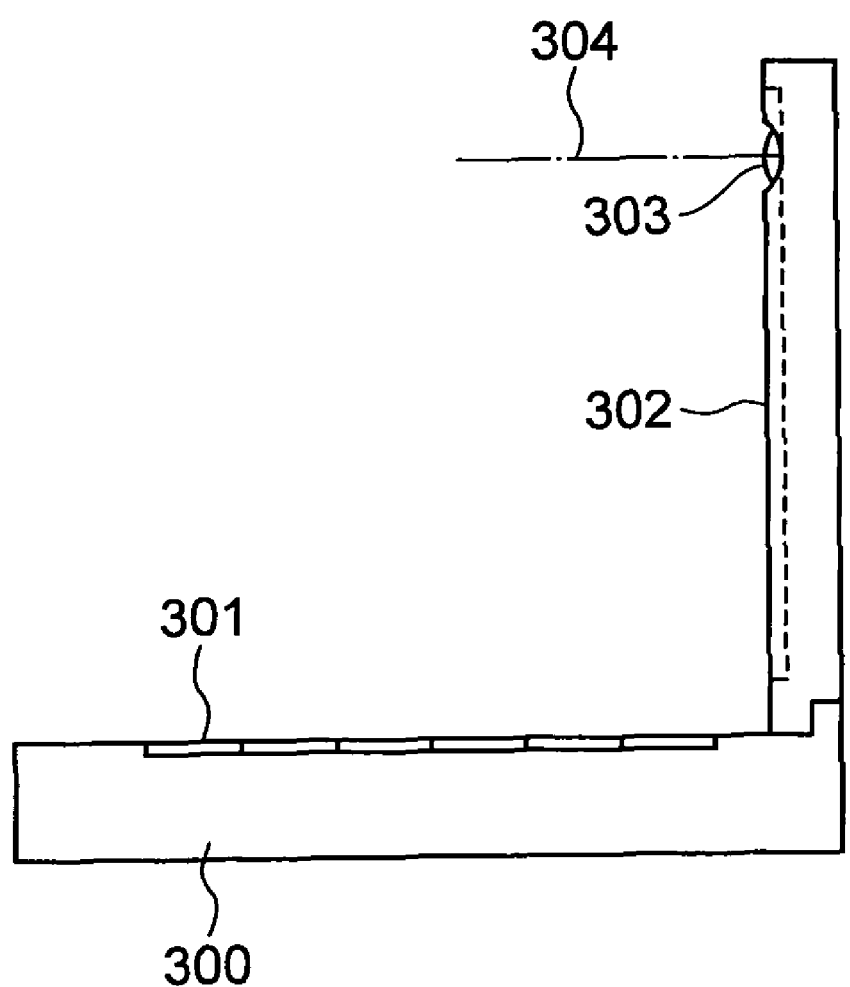
FIG. 30 is a side view of the personal computer 300.

By the digital camera 40 structured in such manner, it is possible to realize an optical image pickup apparatus having a zoom lens with a reduced size and thickness, in which the number of structural components is reduced. Incidentally, the present invention could be applied to a bending type digital camera having a bending optical system, in addition to the above-mentioned collapsible type digital camera. Next, a personal computer which is an example of an information processing apparatus with a built-in image forming system as an objective optical system is shown in FIG. 28 to FIG. 30. FIG. 28 is a frontward perspective view of a personal computer 300 with its cover opened, FIG. 29 is a cross-sectional view of a photographic optical system 303 of the personal computer 300, and FIG. 30 is a side view of FIG. 28. As it is shown in FIG. 80 to FIG. 82, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 28, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 31A:
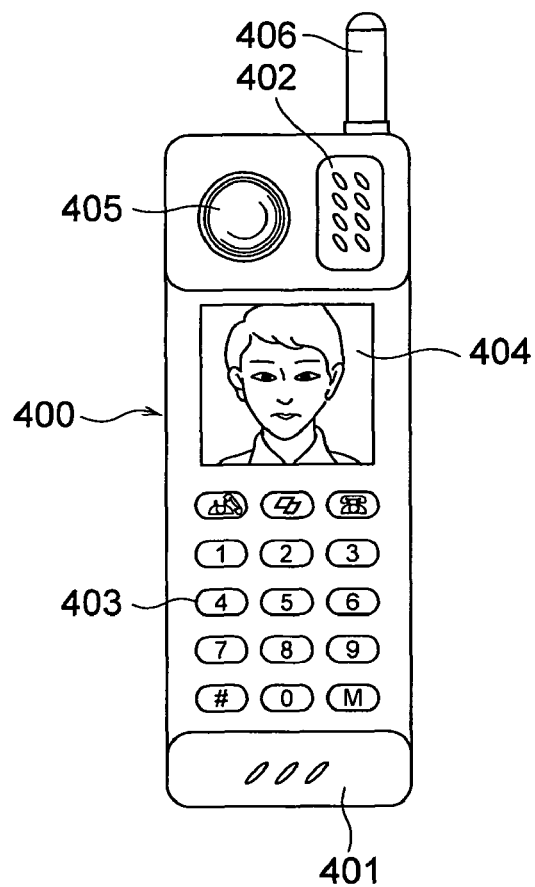
FIG. 31A is a front view showing a cellular phone 400 as an example of an information processing apparatus in which a zoom lens according to the present invention is provided as an image taking optical system.
Figure 31B:
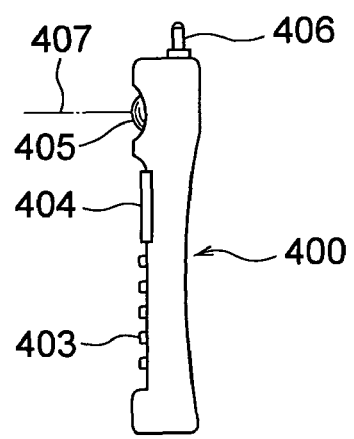
FIG. 31B is a side view showing the cellular phone 400 as an example of an information processing apparatus in which a zoom lens according to the present invention is provided as an image taking optical system.
Figure 31C:
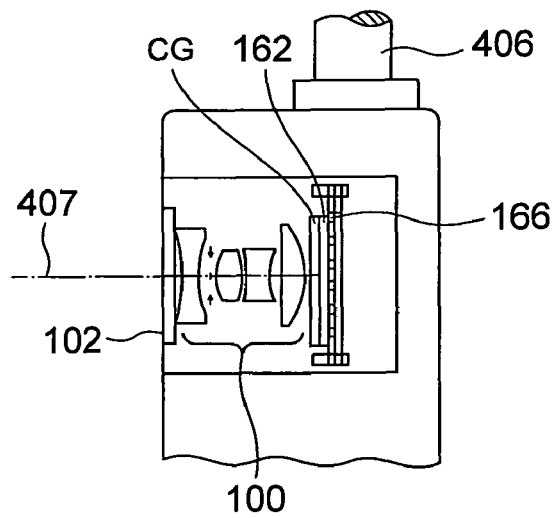
FIG. 31C is a cross sectional view showing of the image taking optical system 405 of the cellular phone 400 as an example of an information processing apparatus in which a zoom lens according to the present invention is provided as the image taking optical system.

Next, a telephone which is an example of an information processing apparatus in which the image forming optical system of the present invention is built-in as a photographic optical system, particularly a portable telephone which is easy to carry is shown in FIG. 31A, FIG. 31B, and FIG. 31C. FIG. 31A is a front view of a portable telephone 400, FIG. 31B is a side view of the portable telephone 400, and FIG. 31C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted. Various modifications can be made to the present invention without departing from its essence.

The present invention is useful for an image forming optical system having a wide angle of view and a high zoom ratio in which second order spectrum is reduced.

In the image forming optical system and the electronic image pickup apparatus according to the present invention, second order spectrum is reduced throughout the entire zoom range, so an image forming optical system having a wide angle of view at the wide angle end and a high zoom ratio and an image pickup apparatus (electronic image pickup apparatus equipped with the same can be provided.

What is claimed is:

1. An image forming optical system comprising, in order from the object side to the image side, a first lens group having a positive refracting power, a second lens group having a negative refracting power, and an image side lens group having a positive refracting power, wherein the distance between the first lens group and the second lens group changes during zooming, characterized in that:
   a cemented optical element D is provided in the first lens group,
   the cemented optical element D is made up of an optical element B disposed on the object side, an optical element C disposed on the image side, and a refractive optical element A having a positive refracting power disposed between the optical element B and the optical element C,
   there is at least one optical element having a positive refracting power located closer to the object side than the cemented optical element D, and
   the image forming optical system satisfies the following conditional expressions (4-1), (4-2), and (4-3):

$$vd_A < 30 \quad (4\text{-}1)$$

$$0.54 < \theta gF_A < 0.9 \quad (4\text{-}2)$$

$$0.4 < \theta gFn < 0.9 \quad (4\text{-}3)$$

where $nd_A$, $nC_A$, $nF_A$, and $ng_A$ are the refractive indices of the refractive optical element A for the d-line, the C-line, the F-line, and the g-line respectively, $nd_B$, $nC_B$, $nF_B$, and $ng_B$ are the refractive indices of the optical element B for the d-line, the C-line, the F-line, and the g-line respectively, $nd_C$, $nC_C$, $nF_C$, and $ng_C$ are the refractive indices of the optical element C for the d-line, the C-line, the F-line, and the g-line respectively, $vd_A$ is the Abbe number $(nd_A-1)/(nF_A-nC_A)$ of the refractive optical element A, $vd_B$ is the Abbe number $(nd_B-1)/(nF_B-nC_B)$ of the optical element B, $vd_C$ is the Abbe number $(nd_C-1)/(nF_C-nC_C)$ of the optical element C, $vd_{BA}$ is the Abbe number of the refractive optical element A and the optical element B regarded as a single optical element, $\theta gF_A$ is the relative partial dispersion $(ng_A-nF_A)/(nF_A-nC_A)$ of the refractive optical element A, $\theta gF_B$ is the relative partial dispersion $(ng_B-nF_B)/(nF_B-nC_B)$ of the refractive optical element B, $\theta gF_C$ is the relative partial dispersion $(ng_C-nF_C)/(nF_C-nC_C)$ of the refractive optical element C, $\theta gF_{BA}$ is the effective relative partial dispersion of the refractive optical element A and the optical element B regarded as a single optical element, $f_A$ is the focal length of the refractive optical element A, $f_B$ is the focal length of the optical element B, $f_C$ is the focal length of the optical element C, $f_{BA}$ is the composite focal length of the optical element B and the refractive optical element A, $f_t$ is the composite focal length of the refractive optical element A, the optical element B, and the optical element C, and $\theta gFn$ is the effective relative partial dispersion $f_t \times vefn \times (\theta gF_{BA} \times \phi_{BA}/v_{BA} + \theta gF_C \times \phi_C/v_c)$ of the cemented optical element D, wherein $$vefn = 1/(f_t \times (\phi_{BA}/v_{BA} + \phi_C/v_c))$$

$$\theta gF_{BA} = f_{BA} \times v_{BA} \times (\theta gF_A \times \phi_A/vd_A + \theta gF_B \times \phi_B/v_B),$$

$$v_{BA} = 1/(f_{BA} \times (\phi_A/vd_A \phi_B/v_B)),$$

$$1/f_{BA} = 1/f_A + 1/f_B,$$

$$\phi_A = 1/f_A,$$

$$\phi_B = 1/f_B,$$

$$\phi_C = 1/f_C, \text{ and}$$

$$\phi_{BA} = 1/f_{BA}.$$

2. The image forming optical system according to claim 1, characterized by satisfying the following conditional expression (2):

$$|G1/G2| > 6.4 \quad (2),$$

where G1 is the focal length of the first lens group, and G2 is the focal length of the second lens group.

3. An image pickup apparatus comprising an image forming optical system and an image pickup element, characterized in that the image forming optical system is an image forming optical system according to claim 1, and the apparatus satisfies the following conditional expression (3-2):

$$0 < (Zb(3.3a) - Za(3.3a))/(Zb(2.5a) - Za(2.5a)) < 0.895 \quad (3\text{-}2),$$

where fw is the focal length of the image forming optical system at the wide angle end, ft is the focal length of the image forming optical system at the telephoto end, IH is the maximum image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a = (IH^2 \times \log_{10}(ft/fw))/fw \quad (3\text{-}1).$$

4. An image forming optical system comprising, in order from the object side to the image side, a first lens group having a positive refracting power, a second lens group having a negative refracting power, and an image side lens group having a positive refracting power, wherein the distance between the first lens group and the second lens group changes during zooming, characterized in that:
   a refractive optical element A having a positive refracting power is provided in the first lens group, and
   the image forming optical system satisfies the following conditional expressions (4-1), (4-2), and (2):

$$vd_A < 30 \quad (4\text{-}1)$$

$$0.54 < \theta gF_A < 0.9 \quad (4\text{-}2)$$

$$|G1/G2| > 6.4 \quad (2)$$

where $nd_A$, $nC_A$, $nF_A$, and $ng_A$ are the refractive indices of the refractive optical element A for the d-line, the C-line, the F-line, and the g-line respectively, $vd_A$ is the Abbe number $(nd_A-1)/(nF_A-nC_A)$ of the refractive optical element A, $\theta gF_A$ is the relative partial dispersion $(ng_A-nF_A)/(nF_A-nC_A)$ of the refractive optical element A, G1 is the focal length of the first lens group, and G2 is the focal length of the second lens group.

5. An image pickup apparatus comprising an image forming optical system and an image pickup element, characterized in that the image forming optical system is an image forming optical system according to claim 4, and the apparatus satisfies the following conditional expression (3-2):

$$0 < (Zb(3.3a) - Za(3.3a))/(Zb(2.5a) - Za(2.5a)) < 0.895 \quad (3\text{-}2),$$

where fw is the focal length of the image forming optical system at the wide angle end, ft is the focal length of the image forming optical system at the telephoto end, IH is the maximum image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a=(\mathrm{IH}^2 \times \log_{10}(ft/fw))/fw \qquad (3\text{-}1).$$

6. The image pickup apparatus according to claim 5 characterized by satisfying the following conditional expression (5a) or (5b):

$$0.20 < (Tnglw(0.7)/Tbasw(0.7))/(Tngl(0)/Tbas(0)) < 0.65 \qquad (5a),$$

$$0.10 < (Tnglw(0.9)/Tbasw(0.9))/(Tngl(0)/Tbas(0)) < 0.45 \qquad (5b),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, Tnglw(0.9) is the distance over which a principal ray having a ray height of 90% of the maximum image height on the image pickup element at the wide angle end travels inside the refractive optical element A, Tbas (0) is the thickness of the optical element B on the optical axis, Tbasw(0.7) is the distance over which a principal ray having a ray height of 70% of the maximum image height on the image pickup element at the wide angle end travels inside the optical element B, and Tbasw(0.9) is the distance over which a principal ray having a ray height of 90% of the maximum image height on the image pickup element at the wide angle end travels inside the optical element B.

7. The image pickup apparatus according to claim 5 characterized by satisfying any one of the following conditional expressions (11-1a), (11-1b), (11-1c), (11-2a), and (11-2b):

$$0.4 < Tngl(0)/Tbas(0) < 2.4 \qquad (11\text{-}1a),$$

$$0.2 < Tnglt(0.7)/Tbast(0.7) < 1.5 \qquad (11\text{-}1b),$$

$$0.1 < Tnglt(0.9)/Tbast(0.9) < 1.1 \qquad (11\text{-}1c),$$

$$0.2 < (Tnglt(0.7)/Tbast(0.7))/(Tngl(0)/Tbas(0)) < 0.85 \qquad (11\text{-}2a),$$

$$0.2 < (Tnglt(0.9)/Tbast(0.9))/(Tngl(0)/Tbas(0)) < 0.75 \qquad (11\text{-}2b),$$

where Tngl(0) is the thickness of the refractive optical element A on the optical axis, Tnglt(0.7) is the distance over which a principal ray having a ray height of 70% of the maximum image height on the image pickup element at the telephoto end travels inside the refractive optical element A, Tnglt(0.9) is the distance over which a principal ray having a ray height of 90% of the maximum image height on the image pickup element at the telephoto end travels inside the refractive optical element A, Tbas (0) is the thickness of the optical element B on the optical axis, Tbast(0.7) is the distance over which a principal ray having a ray height of 70% of the maximum image height on the image pickup element at the telephoto end travels inside the optical element B, and Tbast (0.9) is the distance over which a principal ray having a ray height of 90% of the maximum image height on the image pickup element at the telephoto end travels inside the optical element B.

8. The image pickup apparatus according to claim 5 characterized by satisfying the following conditional expression (12a) or (12b):

$$0.5 < Tnglw(0.7)/Tngl(0) < 0.9 \qquad (12a),$$

$$0.3 < Tnglw(0.9)/Tngl(0) < 0.8 \qquad (12b),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, and Tnglw(0.9) is the distance over which a principal ray having a ray height of 90% of the maximum image height on the image pickup element at the wide angle end travels inside the refractive optical element A.

9. The image pickup apparatus according to claim 5 characterized by satisfying the following conditional expression (13a) or (13b):

$$0.5 < Tnglt(0.7)/Tngl(0) < 0.95 \qquad (13a),$$

$$0.4 < Tnglt(0.9)/Tngl(0) < 0.93 \qquad (13b),$$

where Tngl(0) is the thickness of the refractive optical element A on the optical axis, Tnglt(0.7) is the distance over which a principal ray having a ray height of 70% of the maximum image height on the image pickup element at the telephoto end travels inside the refractive optical element A, and Tnglt(0.9) is the distance over which a principal ray having a ray height of 90% of the maximum image height on the image pickup element at the telephoto end travels inside the refractive optical element A.

10. The image pickup apparatus according to claim 5 characterized by satisfying any one of the following conditional expressions (14-1a), (14-1b), and (14-1c):

$$0.4 < Tngl(0)/Tbas(0) < 2.4 \qquad (14\text{-}1a),$$

$$0.2 < Tnglw(0.7)/Tbasw(0.7) < 0.9 \qquad (14\text{-}1b),$$

$$0.1 < Tnglw(0.9)/Tbasw(0.9) < 0.65 \qquad (14\text{-}1c),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, Tnglw(0.9) is the distance over which a principal ray having a ray height of 90% of the maximum image height on the image pickup element at the wide angle end travels inside the refractive optical element A, Tbas (0) is the thickness of the optical element B on the optical axis, Tbasw(0.7) is the distance over which a principal ray having a ray height of 70% of the maximum image height on the image pickup element at the wide angle end travels inside the optical element B, and Tbasw(0.9) is the distance over which a principal ray having a ray height of 90% of the maximum image height on the image pickup element at the wide angle end travels inside the optical element B.

11. The image forming optical system according to claim 1 or claim 4, characterized by satisfying the following conditional expression (6):

$$0.4 < \theta hg_A < 1.2 \qquad (6),$$

where $\theta hg_A$ is the relative partial dispersion $(nh_A - ng_A)/(nF_A - nC_A)$ of the refractive optical element A for the h-line, and $nh_A$ is the refractive index of the refractive optical element A for the h-line.

12. The image forming optical system according to claim 1 or claim 4, characterized by comprising a stop arranged between the second lens group and the third lens group, a fourth lens group having a positive refracting power and a fifth lens group having a positive refracting power that are arranged subsequently to the third lens group having a positive refracting power, wherein zooming is performed by changing the distances between adjacent lens groups in such a way that, among the distances between the lens groups, the distance between the first lens group and the second lens group is larger, the distance between the second lens group and the third lens group is smaller, the distance between the third lens group and the fourth lens group is larger, and the distance between the fourth lens group and the fifth lens group is smaller, at the telephoto end than at the wide angle end.

13. The image forming optical system according to claim 1 or claim 4, characterized by satisfying the following conditional expression (7):

$$|f_B/f_A|>0.15 \quad (7).$$

14. The image forming optical system according to claim 1 or claim 4, characterized by satisfying the following conditional expression (8):

$$0<\theta gF_B-\theta gF_{BA}<0.15 \quad (8).$$

15. The image forming optical system according to claim 1 or claim 4, characterized by satisfying the following conditional expression (9):

$$2.0<f_A/G1<7.0 \quad (9),$$

where G1 is the focal length of the first lens group.

16. The image forming optical system according to claim 1 or claim 4, characterized by satisfying the following conditional expression (10):

$$-26<(Ra+Rb)/(Ra-Rb)<-0.5 \quad (10),$$

where Ra is the radius of curvature on the object side surface of the refractive optical element A, and Rb is the radius of curvature on the image plane side surface of the refractive optical element A.

17. An image pickup apparatus comprising an image forming optical system and an image pickup element, characterized in that the image forming optical system comprises, in order from the object side to the image side, a first lens group having a positive refracting power, a second lens group having a negative refracting power, and an image side lens group having a positive refracting power, the distance between the first lens group and the second lens group changes during zooming, a refractive optical element A having a positive refracting power is provided in the first lens group, and the refractive optical element A satisfies the following conditional expression (3-2):

$$0<(Zb(3.3a)-Za(3.3a))/(Zb(2.5a)-Za(2.5a))<0.895 \quad (3-2),$$

where fw is the focal length of the image forming optical system at the wide angle end, ft is the focal length of the image forming optical system at the telephoto end, IH is the maximum image height on the image pickup element, Za(h) is the distance along the optical axis between the object side surface vertex of the refractive optical element A on the optical axis and a point on the object side surface of the refractive optical element A at height h, Zb(h) is the distance along the optical axis between the object side surface vertex of the refractive optical element A on the optical axis and a point on the image plane side surface of the refractive optical element A at height h, and a is a value defined by the following equation (3-1):

$$a=(IH^2 \times \log_{10}(ft/fw))/fw \quad (3-1).$$

18. The image pickup apparatus according to claim 17 characterized by satisfying the following conditional expression (5a) or (5b):

$$0.20<(Tnglw(0.7)/Tbasw(0.7))/(Tngl(0)/Tbas(0))<0.65 \quad (5a),$$

$$0.10<(Tnglw(0.9)/Tbasw(0.9))/(Tngl(0)/Tbas(0))<0.45 \quad (5b),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, Tnglw(0.9) is the distance over which a principal ray having a ray height of 90% of the maximum image height on the image pickup element at the wide angle end travels inside the refractive optical element A, Tbas (0) is the thickness of the optical element B on the optical axis, Tbasw(0.7) is the distance over which a principal ray having a ray height of 70% of the maximum image height on the image pickup element at the wide angle end travels inside the optical element B, and Tbasw(0.9) is the distance over which a principal ray having a ray height of 90% of the maximum image height on the image pickup element at the wide angle end travels inside the optical element B.

19. The image pickup apparatus according to claim 17 characterized by satisfying any one of the following conditional expressions (11-1a), (11-1b), (11-1c), (11-2a), and (11-2b):

$$0.4<Tngl(0)/Tbas(0)<2.4 \quad (11\text{-}1a),$$

$$0.2<Tnglt(0.7)/Tbast(0.7)<1.5 \quad (11\text{-}1b),$$

$$0.1<Tnglt(0.9)/Tbast(0.9)<1.1 \quad (11\text{-}1c),$$

$$0.2<(Tnglt(0.7)/Tbast(0.7))/(Tngl(0)/Tbas(0))<0.85 \quad (11\text{-}2a),$$

$$0.2<(Tnglt(0.9)/Tbast(0.9))/(Tngl(0)/Tbas(0))<0.75 \quad (11\text{-}2b),$$

where Tngl(0) is the thickness of the refractive optical element A on the optical axis, Tnglt(0.7) is the distance over which a principal ray having a ray height of 70% of the maximum image height on the image pickup element at the telephoto end travels inside the refractive optical element A, Tnglt(0.9) is the distance over which a principal ray having a ray height of 90% of the maximum image height on the image pickup element at the telephoto end travels inside the refractive optical element A, Tbas (0) is the thickness of the optical element B on the optical axis, Tbast(0.7) is the distance over which a principal ray having a ray height of 70% of the maximum image height on the image pickup element at the telephoto end travels inside the optical element B, and Tbast (0.9) is the distance over which a principal ray having a ray height of 90% of the maximum image height on the image pickup element at the telephoto end travels inside the optical element B.

20. The image pickup apparatus according to claim 17 characterized by satisfying the following conditional expression (12a) or (12b):

$$0.5<Tnglw(0.7)/Tngl(0)<0.9 \quad (12a),$$

$$0.3<Tnglw(0.9)/Tngl(0)<0.8 \quad (12b),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, and Tnglw(0.9) is the distance over which a principal ray having a ray height of 90% of the maximum image height on the image pickup element at the wide angle end travels inside the refractive optical element A.

21. The image pickup apparatus according to claim 17 characterized by satisfying the following conditional expression (13a) or (13b):

$$0.5 < Tnglt(0.7)/Tngl(0) < 0.95 \quad (13a),$$

$$0.4 < Tnglt(0.9)/Tngl(0) < 0.93 \quad (13b),$$

where Tngl(0) is the thickness of the refractive optical element A on the optical axis, Tnglt(0.7) is the distance over which a principal ray having a ray height of 70% of the maximum image height on the image pickup element at the telephoto end travels inside the refractive optical element A, and Tnglt(0.9) is the distance over which a principal ray having a ray height of 90% of the maximum image height on the image pickup element at the telephoto end travels inside the refractive optical element A.

22. The image pickup apparatus according to claim 17 characterized by satisfying any one of the following conditional expressions (14-1a), (14-1b), and (14-1c):

$$0.4 < Tngl(0)/Tbas(0) < 2.4 \quad (14\text{-}1a),$$

$$0.2 < Tnglw(0.7)/Tbasw(0.7) < 0.9 \quad (14\text{-}1b),$$

$$0.1 < Tnglw(0.9)/Tbasw(0.9) < 0.65 \quad (14\text{-}1c),$$

where Tngl(0) is the thickness of the refractive optical element A on the optical axis, Tnglw(0.7) is the distance over which a principal ray having a ray height of 70% of the maximum image height on the image pickup element at the wide angle end travels inside the refractive optical element A, Tnglw(0.9) is the distance over which a principal ray having a ray height of 90% of the maximum image height on the image pickup element at the wide angle end travels inside the refractive optical element A, Tbas (0) is the thickness of the optical element B on the optical axis, Tbasw(0.7) is the distance over which a principal ray having a ray height of 70% of the maximum image height on the image pickup element at the wide angle end travels inside the optical element B, and Tbasw(0.9) is the distance over which a principal ray having a ray height of 90% of the maximum image height on the image pickup element at the wide angle end travels inside the optical element B.

* * * * *